United States Patent
Collins et al.

(10) Patent No.: US 12,402,764 B2
(45) Date of Patent: Sep. 2, 2025

(54) VENTILATION AND PARTICULATE MATTER REMOVAL SYSTEM

(71) Applicant: Synergetics Pty. Ltd., West Melbourne (AU)

(72) Inventors: David Collins, Parkville (AU); James Brett, West Melbourne (AU); James Forsyth, Cheltenham (AU); Callum Maltby, West Melbourne (AU)

(73) Assignee: Synergetics Pty. Ltd., West Melbourne (AU)

(*) Notice: Subject to any disclaimer, the term of this patent is extended or adjusted under 35 U.S.C. 154(b) by 389 days.

(21) Appl. No.: 17/612,884

(22) PCT Filed: May 21, 2020

(86) PCT No.: PCT/IB2020/054843
§ 371 (c)(1),
(2) Date: Nov. 19, 2021

(87) PCT Pub. No.: WO2020/234825
PCT Pub. Date: Nov. 26, 2020

(65) Prior Publication Data
US 2022/0211230 A1    Jul. 7, 2022

(30) Foreign Application Priority Data

May 21, 2019  (AU) ............................... 2019901732
Jul. 5, 2019   (AU) ............................... 2019902397
(Continued)

(51) Int. Cl.
*A47L 5/14*    (2006.01)
*A47L 9/02*    (2006.01)
(Continued)

(52) U.S. Cl.
CPC .................. *A47L 5/14* (2013.01); *A47L 9/02* (2013.01); *A47L 9/12* (2013.01); *A47L 9/281* (2013.01);
(Continued)

(58) Field of Classification Search
CPC ..... A47L 5/14; A47L 9/02; A47L 9/12; A47L 9/281; A47L 9/2857; A47L 9/2889;
(Continued)

(56) References Cited

U.S. PATENT DOCUMENTS 4,242,114 A * 12/1980 Deacon .................. B01D 46/04
                                                          55/304
5,460,193 A * 10/1995 Levallois .............. B08B 9/0936
                                                         134/167 R
(Continued)

FOREIGN PATENT DOCUMENTS

AU       2019201437        9/2019
AU       2019201437 A1 *   9/2019
(Continued)

OTHER PUBLICATIONS

CN-205628781-U Written Description (Year: 2016).*
(Continued)

*Primary Examiner* — Eric W Golightly
(74) *Attorney, Agent, or Firm* — Anderson Gorecki LLP

(57) ABSTRACT

Apparatus and a method for removing particulate matter from an enclosure having an internal space and an opening into the internal space. The apparatus includes: a cover positionable over the opening; an inlet conduit that extends through the cover and is adapted to direct gas from a gas source to a gas outlet within the internal space so that particulate matter within the internal space is dislodged. Gas and entrained particulate matter is drawn from the internal space firstly through an outlet conduit and the particular matter is separated. Concentration of particulate matter in (Continued)

gas leaving the enclosed space is sensed and its value displayed to an operator so that operation can continue until a satisfactory value of the concentration is achieved. The gas outlet may be comprised in an elongate lance that is passed through the cover and can be manipulated by a user. The lance may display data.

24 Claims, 54 Drawing Sheets

(30) Foreign Application Priority Data

| Jul. 16, 2019 | (AU) | ................................ | 2019902513 |
| Jul. 28, 2019 | (AU) | ................................ | 2019902685 |
| Dec. 2, 2019 | (AU) | ................................ | 2019904558 |

(51) Int. Cl.
| *A47L 9/12* | (2006.01) |
| *A47L 9/28* | (2006.01) |
| *B01D 50/20* | (2022.01) |
| *B05B 13/04* | (2006.01) |
| *B60S 3/00* | (2006.01) |
| *H02G 3/08* | (2006.01) |

(52) U.S. Cl.
CPC ........... *A47L 9/2857* (2013.01); *A47L 9/2889* (2013.01); *A47L 9/2894* (2013.01); *B01D 50/20* (2022.01); *B05B 13/0405* (2013.01); *B60S 3/008* (2013.01); *H02G 3/088* (2013.01)

(58) Field of Classification Search
CPC ........ A47L 9/2894; A47L 7/0095; A47L 9/16; A47L 9/19; A47L 9/2815; A47L 9/2821; A47L 9/2831; A47L 9/30; B01D 50/20; B05B 13/0405; B05B 1/005; B60S 3/008; H02G 3/088; B08B 5/04; B08B 9/00; B08B 15/04; B08B 5/02; B08B 13/00; H02B 1/28; H02K 15/14
See application file for complete search history.

(56) References Cited

U.S. PATENT DOCUMENTS

| 6,256,832 | B1* | 7/2001 | Dyson ....................... A47L 5/30 |
| | | | 15/337 |
| 6,766,558 | B1* | 7/2004 | Matsumoto ........... A47L 9/2821 |
| | | | 15/353 |
| 2005/0086762 | A1* | 4/2005 | Paris ......................... A47L 5/36 |
| | | | 15/327.5 |
| 2008/0289141 | A1* | 11/2008 | Oh ........................ A47L 9/0488 |
| | | | 15/354 |
| 2011/0225765 | A1* | 9/2011 | Liu ....................... A47L 9/1666 |
| | | | 15/347 |
| 2016/0100724 | A1* | 4/2016 | Valentini ............... A47L 9/2836 |
| | | | 15/319 |
| 2017/0028333 | A1* | 2/2017 | Takei ....................... F24F 11/64 |

FOREIGN PATENT DOCUMENTS

| CN | 205429520 | | 8/2016 | |
| CN | 205628781 | | 10/2016 | |
| CN | 205628781 | U * | 10/2016 | |
| CN | 106269712 | A * | 1/2017 | ............. B08B 1/002 |
| CN | 105057276 | | 4/2017 | |
| CN | 10732711 | | 11/2017 | |
| CN | 207183892 | | 4/2018 | |
| DE | 19811738 | A1 * | 9/1999 | ............... A47L 9/02 |
| EP | 0367276 | A1 * | 5/1990 | |
| WO | WO 1992018260 | A1 * | 10/1992 | |

OTHER PUBLICATIONS

CN-106269712-A Written Description (Year: 2017).*
EP 0367276 A1 Written Description (Year: 1990).*
DE-19811738-A1 Written Description (Year: 1999).*
International Search Report from PCT/IB2020/054843, dated Aug. 24, 2020 (6 pages).
Written Opinion from PCT/ IB2020/054843, dated Aug. 24, 2020 (9 pages).

* cited by examiner

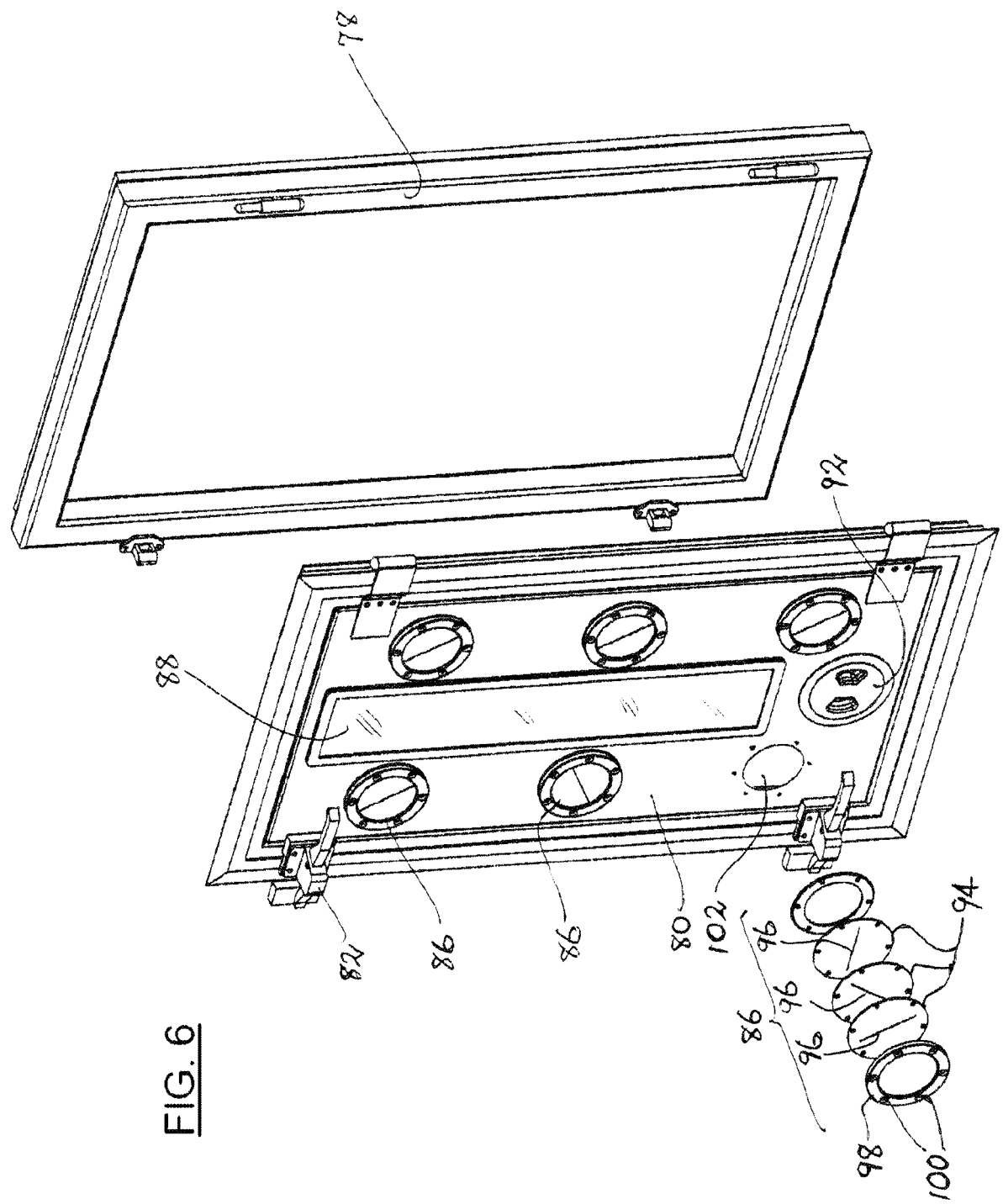

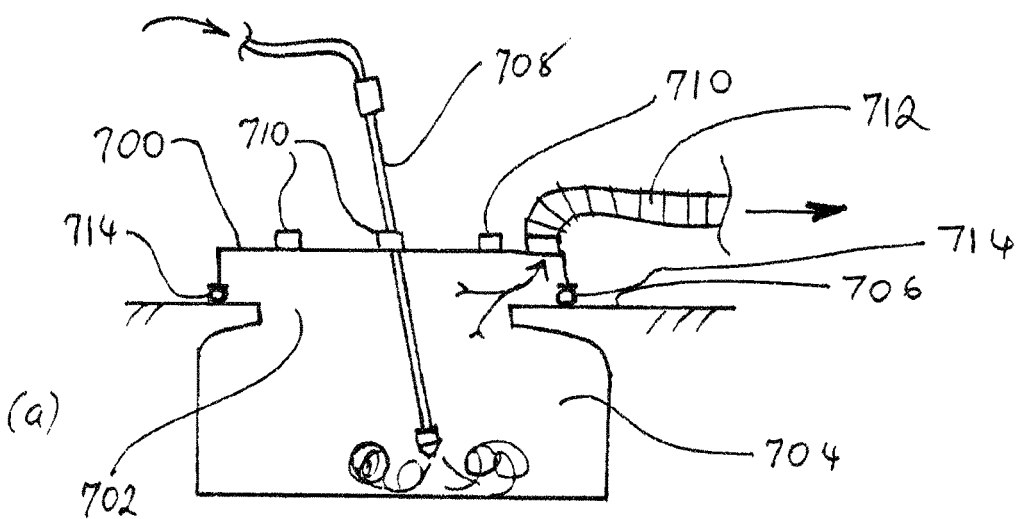
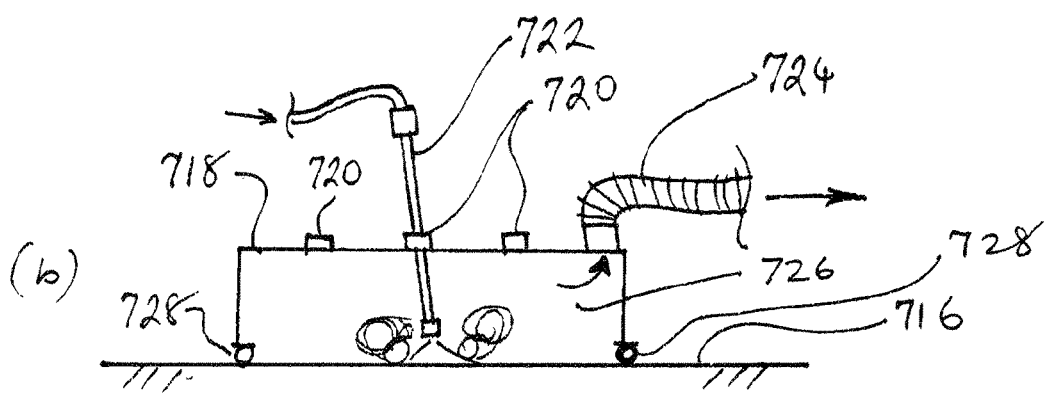
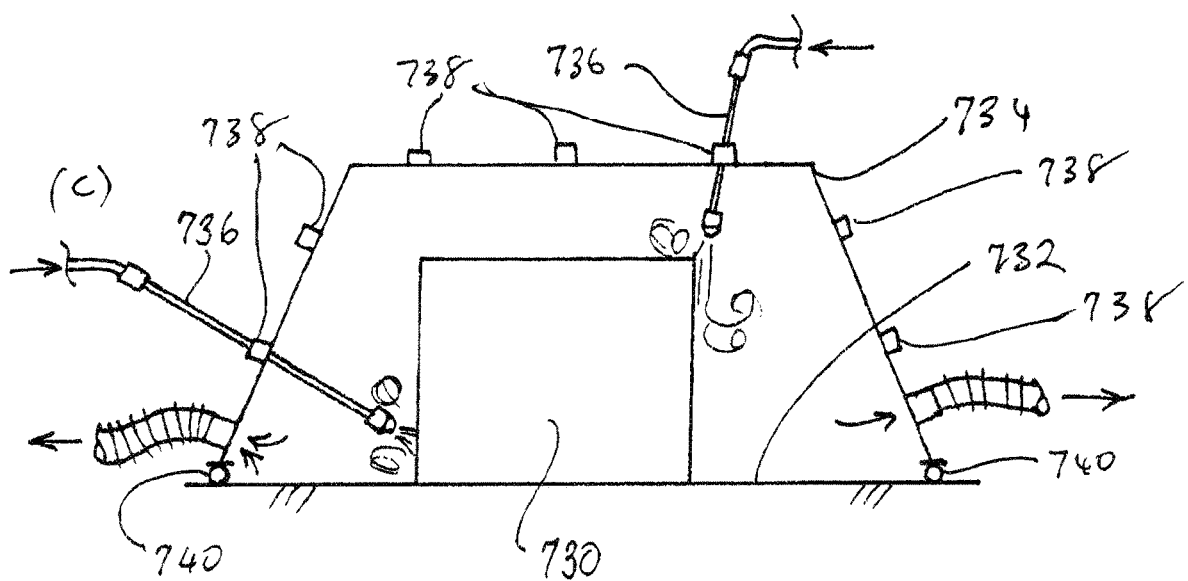
FIG. 28

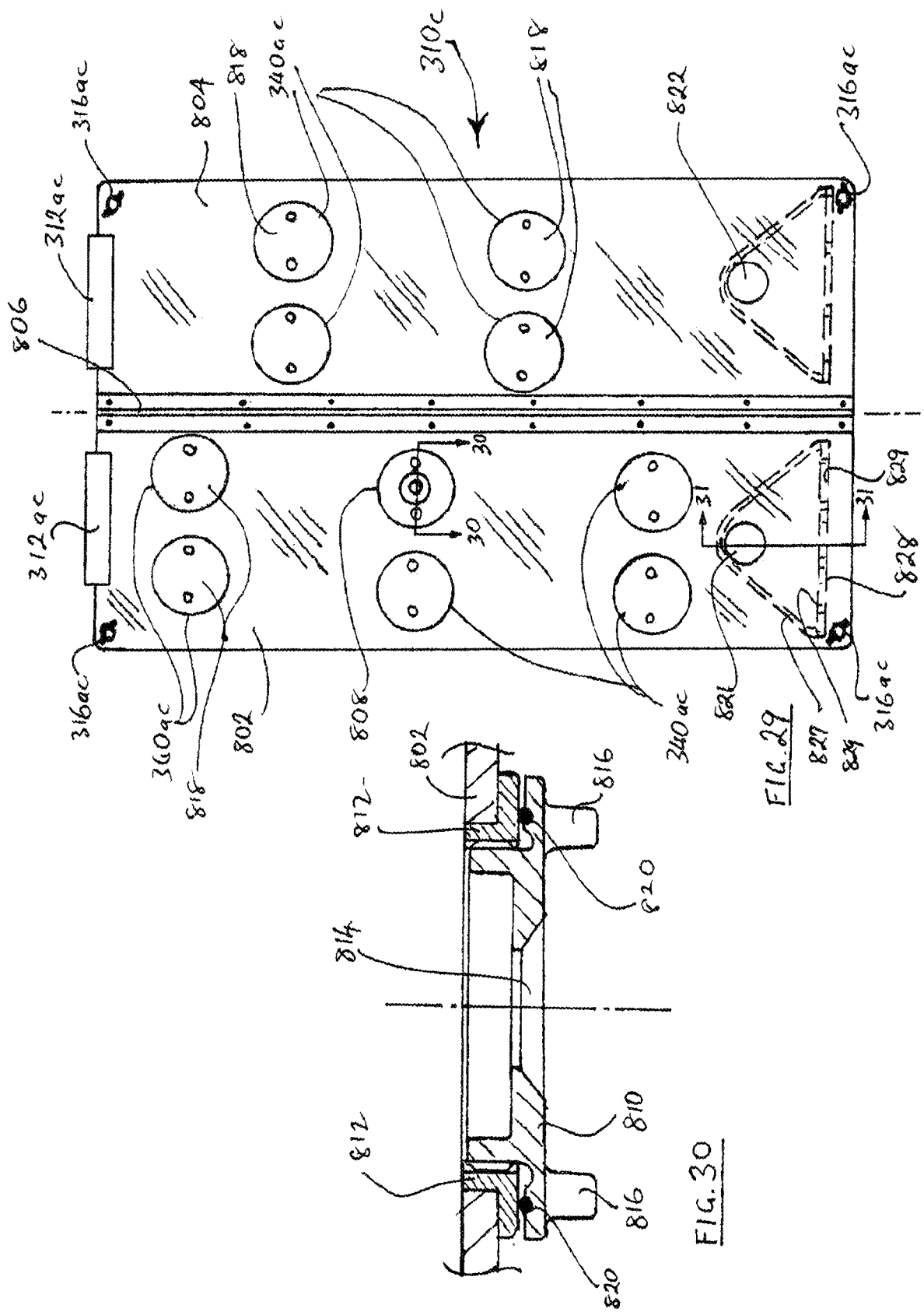

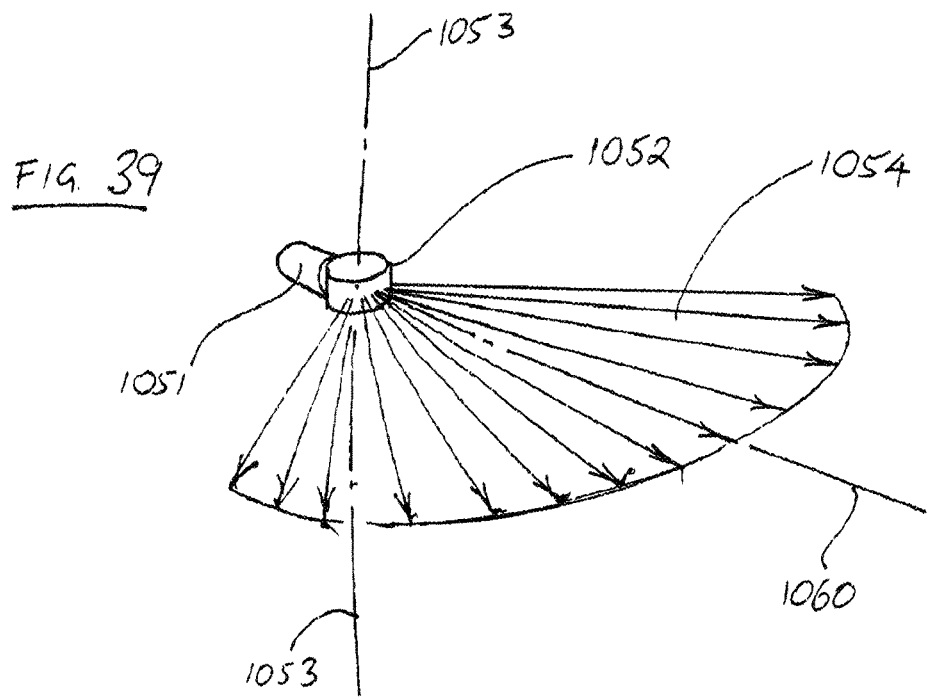
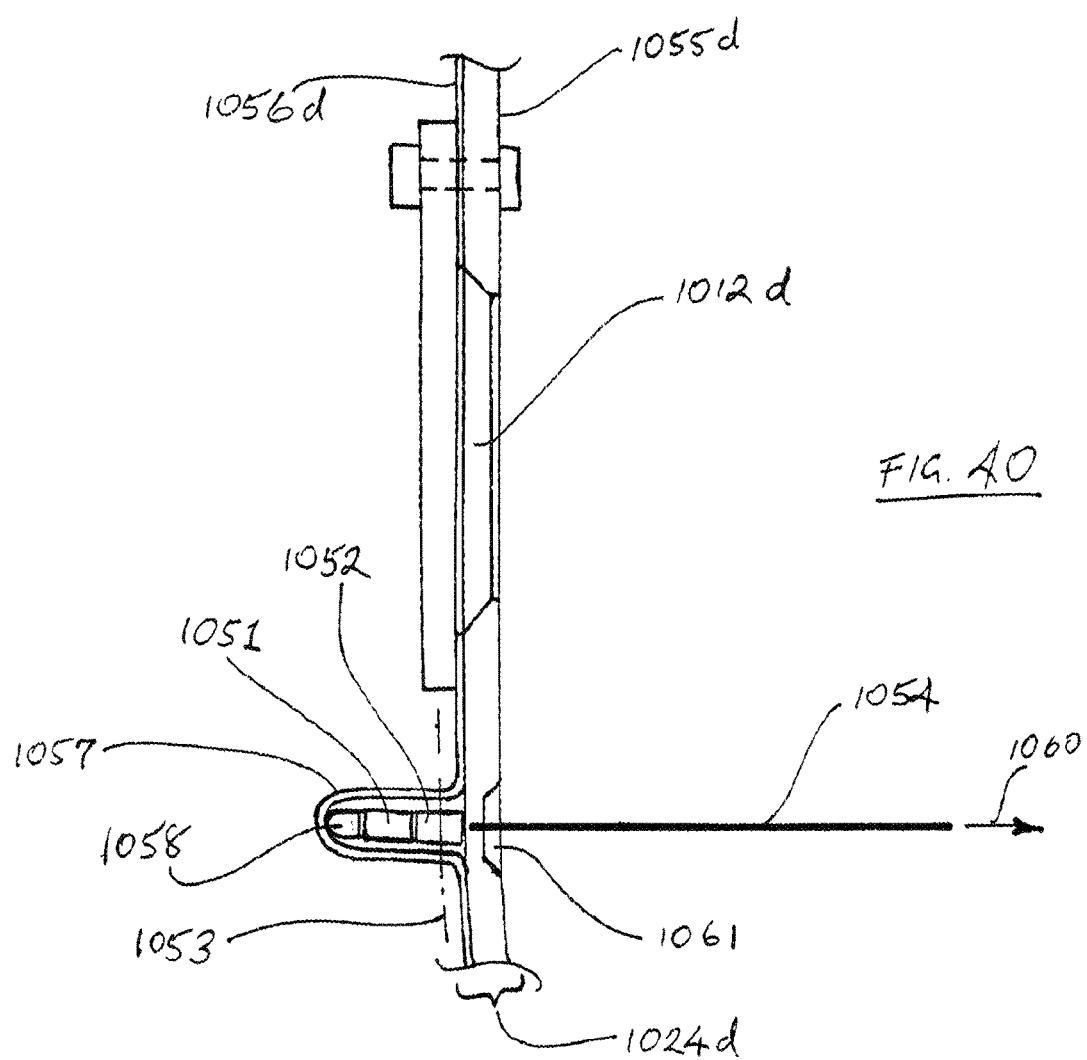

VENTILATION AND PARTICULATE MATTER REMOVAL SYSTEM

FIELD

Apparatus systems and methods are disclosed for removal of particulate matter from enclosed spaces and enclosures, with particular reference to removal of dust, dirt and the like from enclosed cabinets containing electrical components.

BACKGROUND

In many industries, electrical, electronic and other sensitive equipment is housed in enclosures designed to provide a safe and clean operating environment for that equipment and to prevent unauthorized or inadvertent access. This can be the case in both fixed industrial installations and mobile equipment.

Although such enclosures are generally designed and maintained to prevent or limit ingress of particulate matter, for example dust and dirt, it has been found in some applications that enclosures do sometimes need to be cleaned out of such particulate matter. Failure to do so in these applications can eventually threaten proper operation of the electrical or electronic equipment.

For example, in the mining industry, haul trucks with diesel-electric drives have enclosures (cabinets) for electrical components which are sometimes found to accumulate significant quantities of particulate matter, even when carefully maintained, but particularly with ageing and when maintenance is imperfect. Other mobile equipment used in the surface mining industry, eg electric blasthole drills, shovels and draglines may have enclosures that are similarly affected.

Cleaning out of particulate matter from such enclosures to a suitable standard of cleanliness can itself be difficult and time consuming. Water cleaning is unsuitable for cleaning electrical and electronic equipment. Vacuum cleaning is often ineffective in removing particulate matter from spaces within and between components. The use of compressed air can create occupational, environmental and ecological exposure risks from airborne particulate matter.

It is believed that there are other areas of activity including for example underground mining, and certain above-ground industrial/manufacturing installations in which the above problems occur. In some of these, the particulate matter in question may be considered toxic either inherently because of its chemistry or because of factors such as particle size or shape or even the expected sensitivity of persons likely to be exposed to the matter.

Disclosed herein are equipment, systems and methods for addressing the problem of cleaning particulate matter from enclosed spaces.

In this specification, no reference to prior art or to what is known, is to be taken as a concession that anything is a part of the common general knowledge in Australia or elsewhere.

DISCLOSURE OF THE INVENTION

The invention provides in a first aspect a cleaning and ventilation system.

More particularly there is provided apparatus for removing particulate matter from an enclosure having an internal space and an opening into the internal space, comprising:
  a cover positionable adjacent the opening so that the cover covers the opening;
  a gas source external to the internal space;
  an inlet conduit that in use extends through the cover and is adapted to direct gas from the gas source to at least one gas outlet within the internal space whereby particulate matter within the internal space is dislodged and entrained in gas within the internal space;
  a source of partial vacuum adapted to maintain a partial vacuum within the internal space and to draw gas and particulate matter entrained therein from the internal space firstly through an outlet conduit and then through a particulate matter separation means comprising at least one filter;
  a sensor for sensing concentration of particulate matter in gas leaving the enclosed space;
  a display adapted to provide to a user information on concentration of particulate matter leaving the internal space so that the operator can continue use of gas from the gas source to dislodge particulate matter in the internal space until a satisfactory value of the concentration is achieved.

Preferably the apparatus further comprises means for storing data obtained from the sensor.

Preferably also, the apparatus further comprises means for transmitting data obtained from the sensor to a location remote from the apparatus.

The outlet conduit is preferably in use secured to the cover and draws gas through an opening in the cover.

Preferably the or at least one gas outlet is movable relative to the cover among multiple positions within the internal space.

In a preferred embodiment the gas outlet is at an end of an elongate lance comprised in the inlet conduit, the lance in use extending though a port in the cover so that a portion of its length is in the internal space and the user can manually move the lance to cause the gas outlet to take up any of the said multiple positions within the internal space.

It is particularly preferred that the elongate lance comprises a display adapted to display data sensed by the sensor.

Gas flow to the gas outlet may be able to be interrupted periodically so that the flow of gas leaving the elongate lance within the internal space pulsates.

The port in the cover may be one of a plurality of ports in the cover so positioned that the user can withdraw the lance from one port and enter the lance into another port as required to access multiple parts of the internal space.

Desirably, each of the plurality of ports is adapted to prevent or limit escape of particulates therethrough when the port does not have the lance extending through it.

The cover may comprise a sheet of flexible transparent material so that a user may see through the cover when using the elongate lance.

The invention further provides a method for removing particulate matter from an enclosure having an internal space and an opening into the internal space, comprising the steps of:
  positioning a cover adjacent the opening so that the cover covers the opening;
  providing a gas source external to the internal space;
  providing an inlet conduit that in use extends through the cover and is adapted to direct gas from the gas source to at least one gas outlet within the internal space whereby particulate matter within the internal space is dislodged and entrained in gas within the internal space;
  providing a source of partial vacuum adapted to maintain a partial vacuum within the enclosed space and to draw gas and particulate matter entrained therein from the internal space firstly through an outlet conduit and then through a particulate matter separation means comprising at least one filter;

providing a sensor for sensing concentration of particulate matter in gas leaving the enclosed space;

using the sensor to derive and provide to a user information on concentration of particulate matter leaving the internal space;

the user using gas from the gas source to dislodge particulate matter in the internal space until a satisfactory value of the concentration is achieved.

The method may further comprise the steps of:

repeatedly sensing concentration of particulate matter in gas leaving the internal space during cleaning thereof and storing digital records thereof.

The method may include the step of transmitting the digital records to a remote location. This enable analysis at the remote location, which may be done for validation that cleaning is satisfactory and for regulatory approval purposes.

The method therefore may include the step of receiving transmitted the digital records and analysing the effectiveness of cleaning on the basis of the digital records.

There is also provided a system for instrumentation and control of a mechanical ventilation system where both equipment-related sensors and workspace- and/or user-related sensors are provided, and wherein signals from specific ones of the sensors (workplace-, user-, or equipment-related) are used to provide any or all of alarms (or warnings), display the parameter value(s) of concern and if desired or necessary shut down or otherwise control either the ventilation system or the equipment being ventilated.

Some industrial processes require different levels of ventilation according to how a the process is being carried out or the stage it has reached, and it is desirable to be able to adjust ventilation to suit—either to provide adequate ventilation or to limit wastage of energy when a particular level of ventilation is not required. Therefore, instead of, or in addition to, alarms, warnings and shutdown commands, the system may provide for automatic control of the ventilation system to maintain effectiveness and save energy in a range of conditions.

The systems and embodiments described above amount to examples of the further inventive concept introduced in the previous paragraph. Further examples of potential application areas include grinding equipment and saws (eg for cutting stone kitchen benchtops, a known area of particulate problems). Both mobile and fixed types of equipment can provide other potential applications.

Further embodiments and additional features and inventive concepts are described in the following detailed description, based on the attached drawings.

Everywhere in this specification, the word "comprise" and derivatives thereof including "comprising", "comprised" and the like, when used in relation to items, elements or steps, are to be taken as indicating presence of those items elements or steps, but not as precluding the possible presence of other items, elements or steps.

Everywhere in this specification, the terms "particulate" and "particulates" are to be understood as short and convenient terms for particulate matter. It is further to be understood that the particulate matter described will in some applications comprise particles with a range of sizes. Except where otherwise stated, the terms "sealingly" and "gas-sealingly", where used in this specification in relation to two parts or elements, are to be taken to mean that gas and particulate matter entrained in that gas are wholly or substantially or at least to a useful degree prevented from leaking or passing between the two parts or elements.

BRIEF DESCRIPTIONS OF THE DRAWINGS

FIG. 1(*a*) is a cross-sectional view of the enclosure shown in FIG. 1(*b*) being cleaned;

FIG. 6 is a perspective partially exploded view of an assembly comprising a frame and door of the cabinet shown in FIG. 4;

FIG. 28 is a set of three schematic diagrams showing different ways in which the apparatus and methods described herein may be applied;

FIG. 29 is an elevation of an exterior side of a further enclosure cover according to the invention;

FIG. 30 is a partial cross-section taken at station "30-30" in FIG. 29;

FIG. 39 is a perspective schematic view of a light source for use in the cover assembly of FIG. 38;

FIG. 40 is a cross sectional view on a vertical plane through one port of the cover assembly shown in FIG. 38;

DETAILED DESCRIPTION OF PREFERRED EMBODIMENTS

Figure 1B:
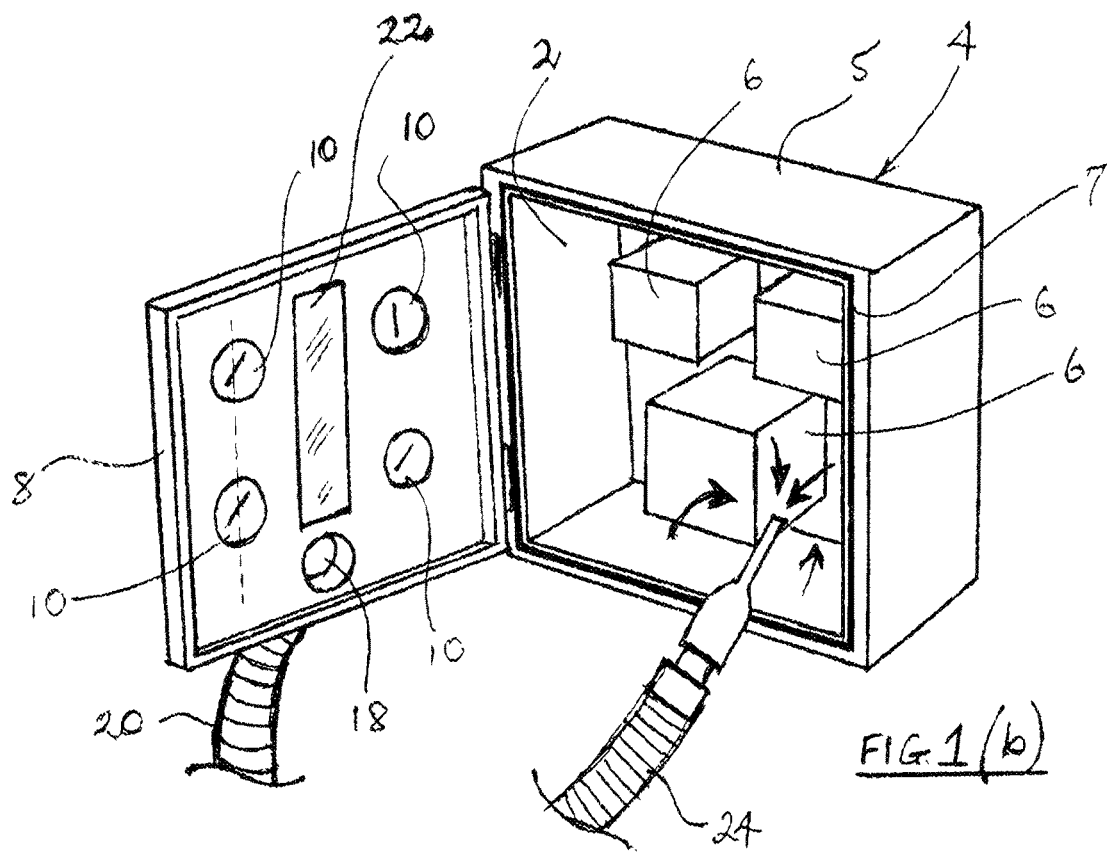
FIG. 1(*b*) is a perspective view of an enclosure being cleaned.
Figure 1A:
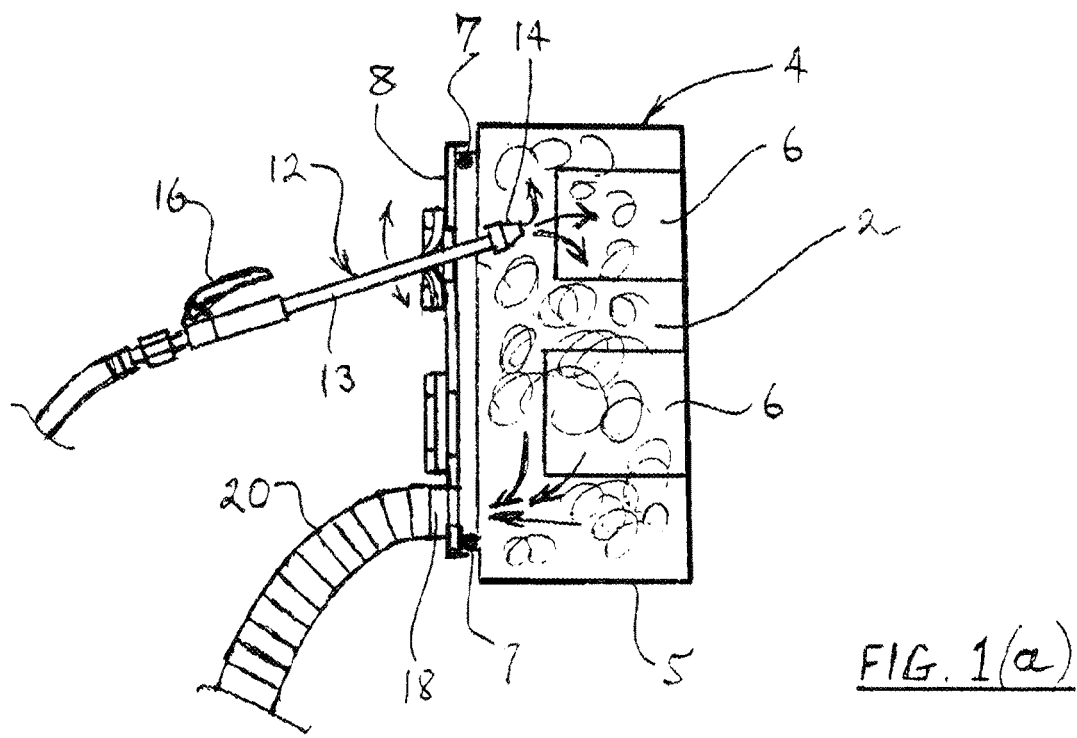
Figure 2:
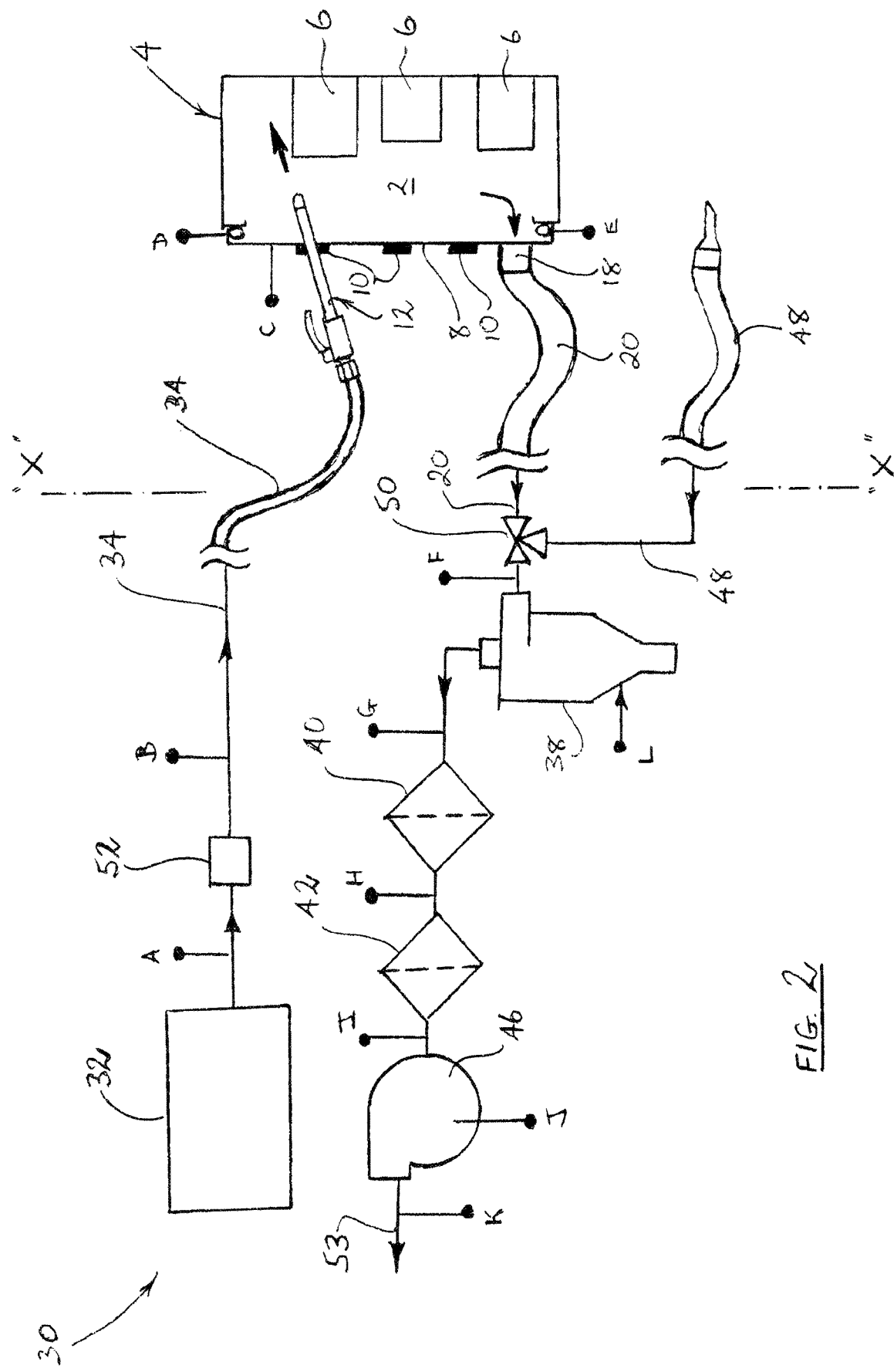
FIG. 2 is a schematic diagram showing components of a cleaning system according to an aspect of the invention and connections between those components.
Figure 3:
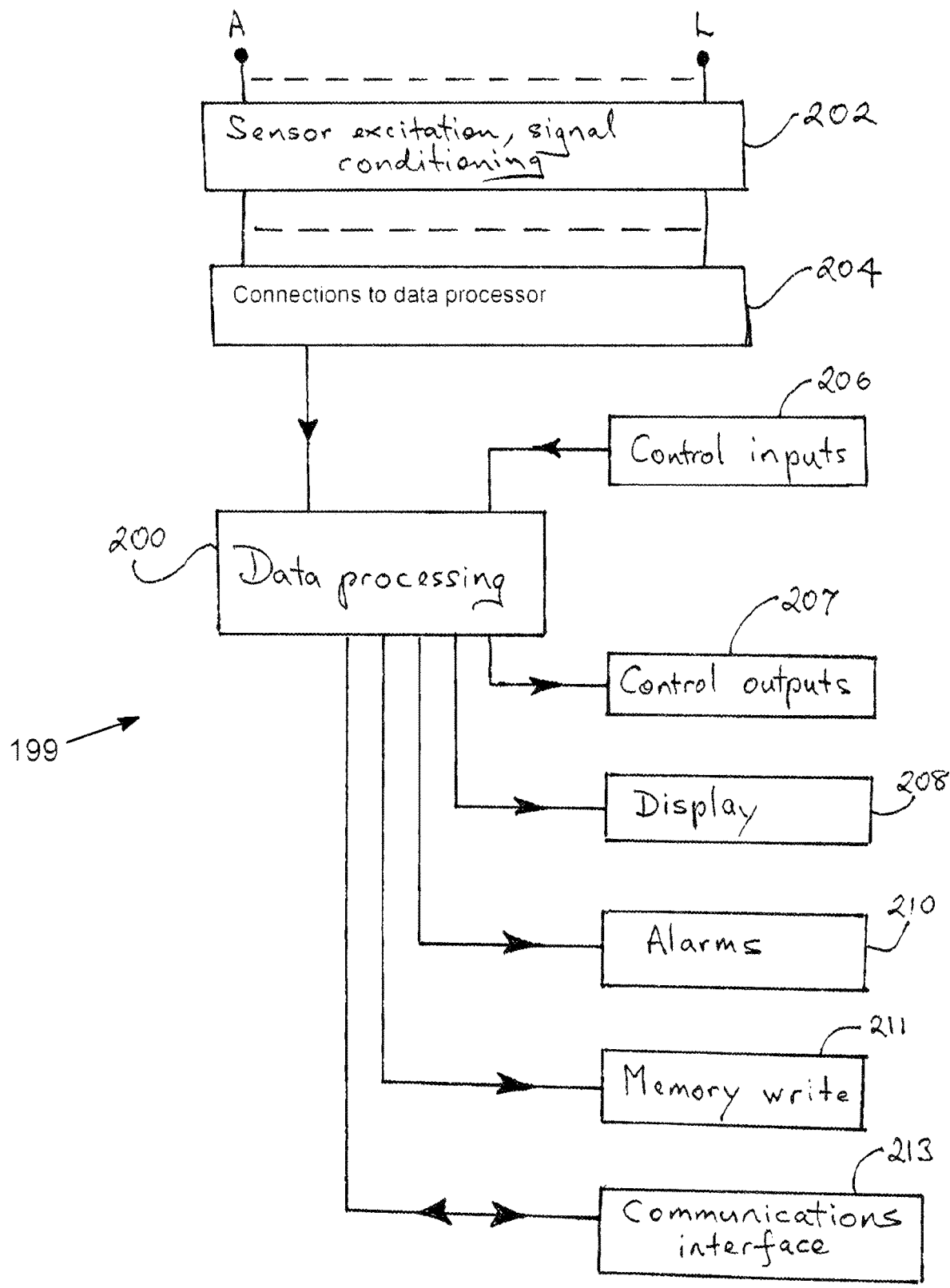
FIG. 3 is a block diagram of instrumentation and control components.
Figure 4:
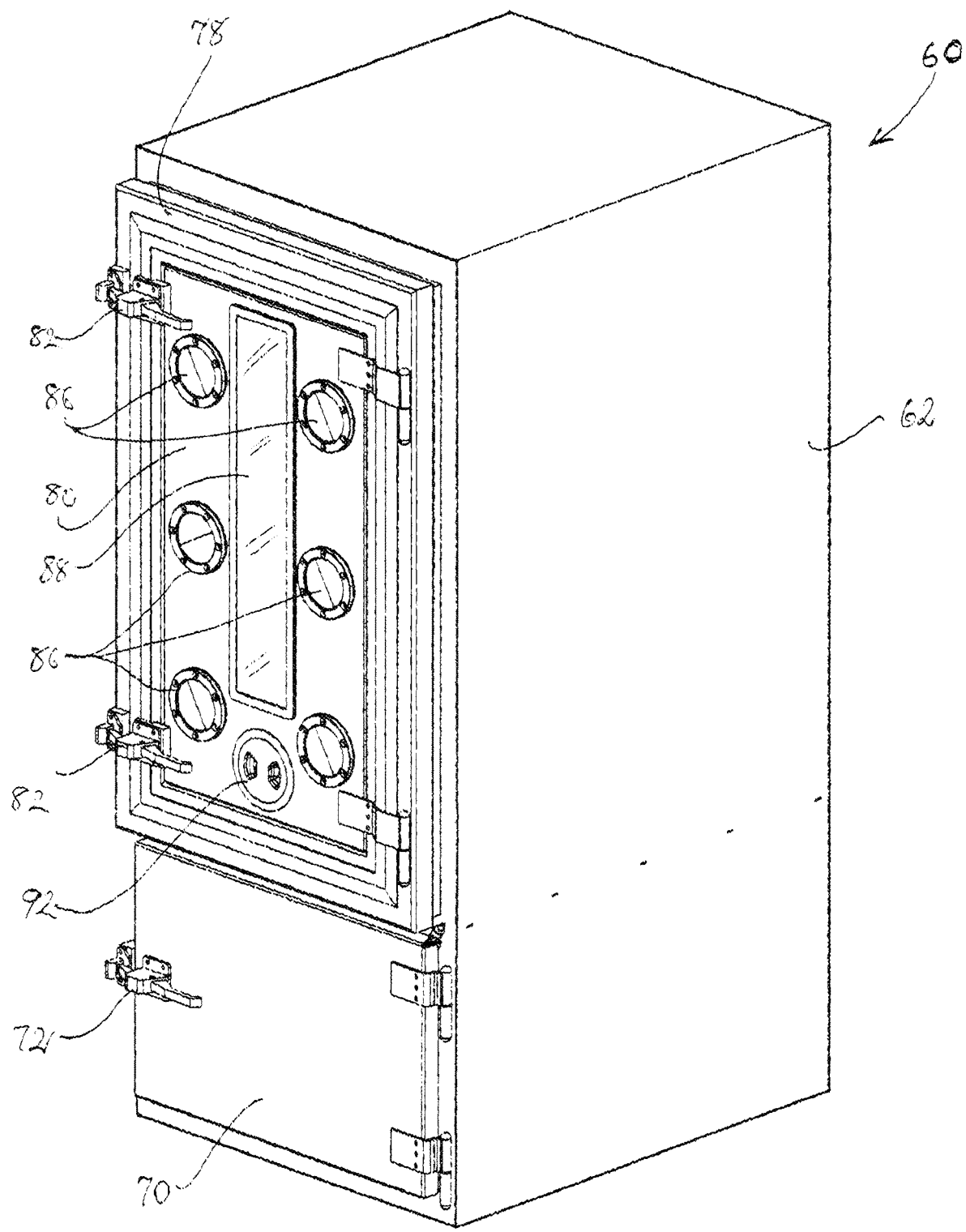
FIG. 4 is a perspective view of a cabinet for electrical components partially modified to implement the invention.
Figure 5:
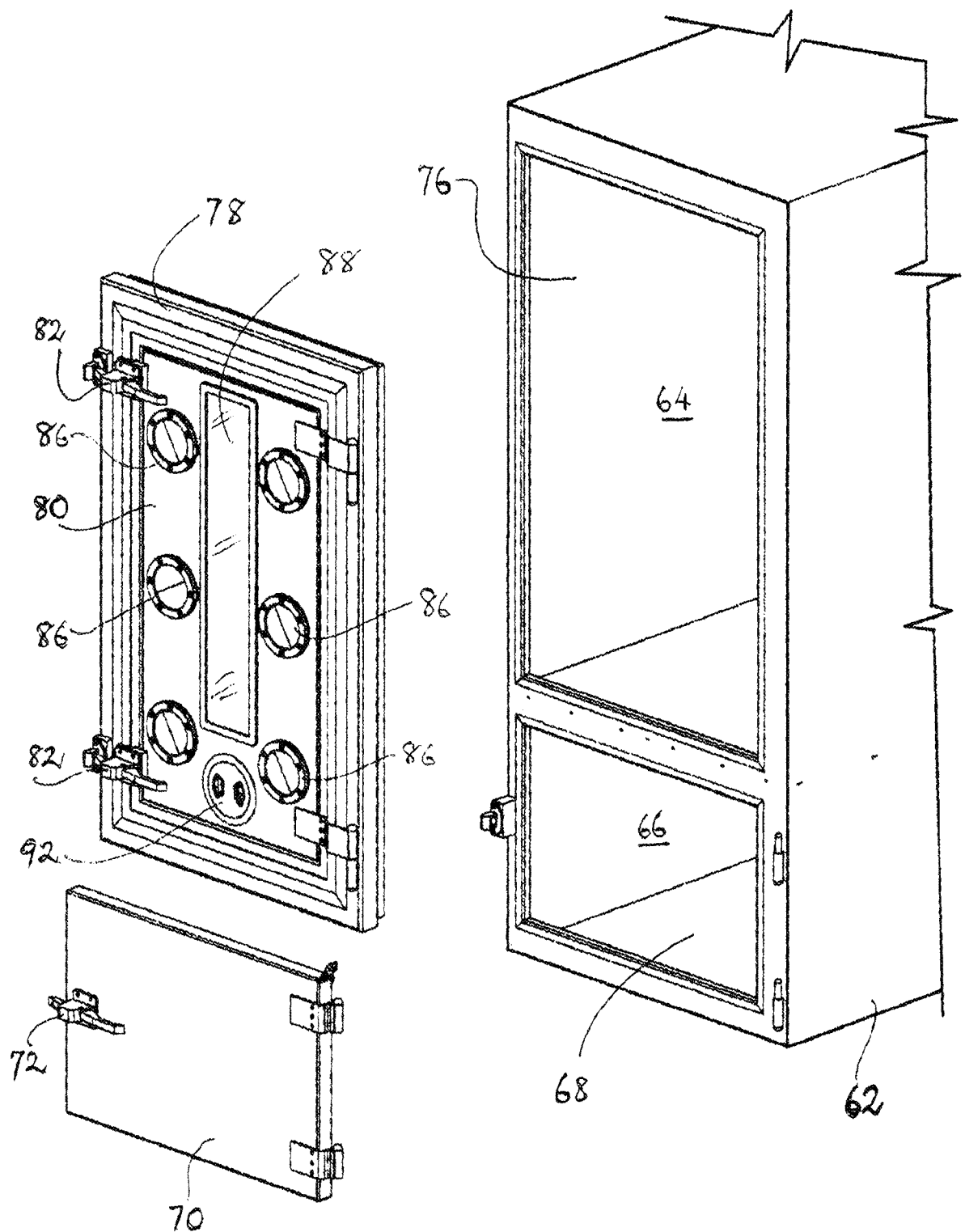
FIG. 5 is a partial exploded perspective view of the cabinet shown in FIG. 4.
Figure 8:
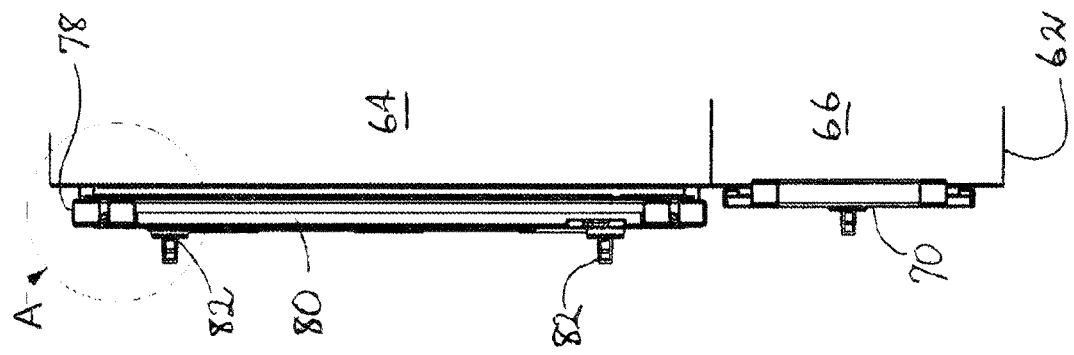
FIG. 8 is a partial section of the cabinet of FIG. 7, the section being taken at station BB in FIG. 7.
Figure 7:
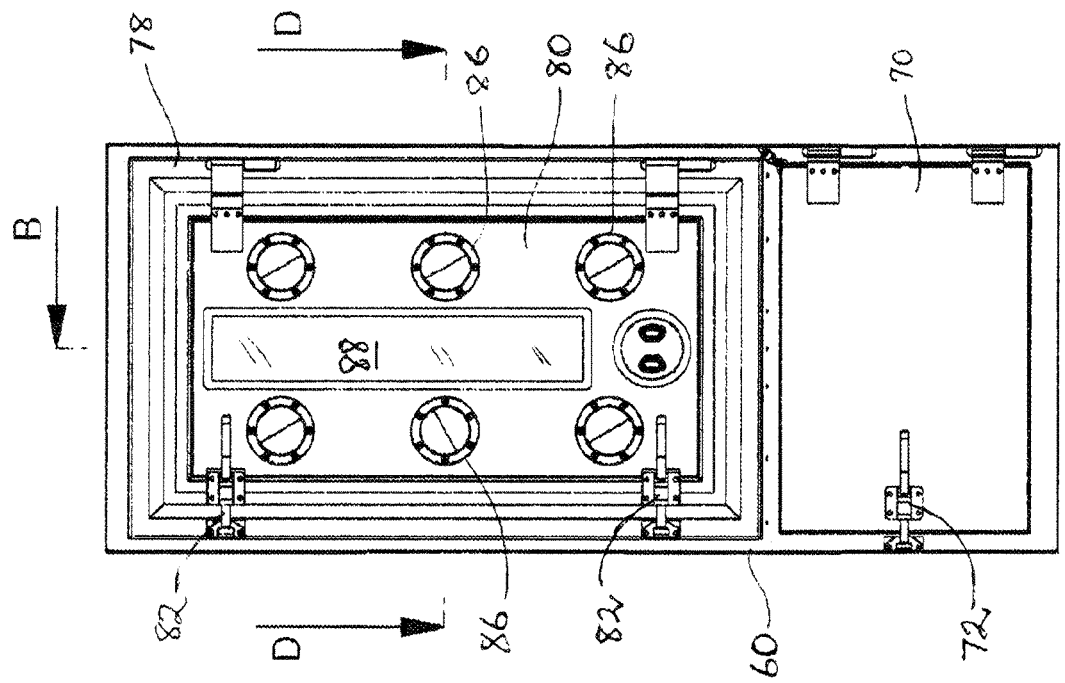
FIG. 7 is a front elevation of the cabinet shown in FIG. 4.

The following description, based on FIGS. 1-3, is based for convenience on arrangements and methods for cleaning particulates from cabinets such as those used for containment of electrical and electronic components and the like.

However, other arrangements and applications are disclosed also, and it is to be understood that the same principles are applicable to them.

FIGS. 1(a) and 1(b) show schematically how an internal space 2 of a cabinet (that is, an enclosure) 4 containing electrical (or other) components 6 can have accumulations of particulates removed.

A door 8 of cabinet 4 seals against fixed part 5 of cabinet 4 due to a seal 7 that extends peripherally around the edge of door 8. Door 8 has at least one port assembly 10 through which a rigid, elongate cleaning lance 12 can be inserted so that a part of its length is in internal space 2. Cleaning lance 12 is elongate and tubular and provided with gas from a source 32 (see FIG. 2) external to cabinet 4, the gas being expelled in a stream or jet from a nozzle 14, nozzle 14 being inside internal space 2 during that part of the cleaning process shown in FIG. 1(a). In some embodiments, cleaning lance 12 has a manually operable valve 16 for control (including shutoff) of gas flow through nozzle 14. Blowing a stream or jet of gas into internal space 2, as shown in FIG. 1(a), allows dislodgement of particulates from internal surfaces of cabinet 4 and components 6 and agitation of dislodged particulates so that they are entrained in gas within the internal space 2. Cleaning lance 12 can be manipulated by a user outside enclosure 4 so as to move the stream of gas ejected from it inside enclosure 4.

Cabinet 4 also has at least one outlet port 18 through which gas and entrained particulates can leave internal space 2 and be drawn into a duct 20 by an external source (see item 46, FIG. 2) of at least partial vacuum. As will be described further below, at least some of the particulates removed through outlet port 18 are removed from the gas downstream of outlet port 18. Outlet port 18 is shown as comprised in door 8, but may in alternative embodiments (not shown) be comprised in fixed part 5 of cabinet 4. The position of the outlet port is selected to benefit from gravitational settling and stratification of the dust so that the dust can be extracted as completely as possible. Further, an extension duct (not shown) may be fitted to the outlet port 18 to move the location from which gas and entrained particulates further into the enclosure 4. (This approach may also be taken in other embodiments described below.)

Cleaning lance 12 can be manually oriented (as shown by arrows 15), and the extent of its penetration into space 2 varied (as shown by arrows 17), by a user of cleaning lance 12 to orient and position nozzle 14 to best effect for dislodging particulates. Door 8 is provided with a transparent viewing window 22 so that the cleaning lance 12 in internal space 2 can be seen during cleaning. The purpose of providing multiple ports 10 is to enable a user to withdraw cleaning lance 12 from one port 10 and then insert it into another port 10 so as to dislodge particulates in multiple locations in internal space 2.

Cleaning lance 12 is a gas discharging device and essentially comprises a gas flow control valve 16 for manual operation by a user and an elongate tube 13 through which gas leaving valve 16 passes to nozzle 14 from which it issues in a gas stream or jet. Nozzle 14 may be of any suitable form or may be omitted altogether so that gas simply issues from an open end of tube 13. Nozzle 14 may direct gas at an angle to the length of tube 13, for example, or may even be freely rotatable about a lengthwise axis of tube 13 and expel gas at an angle to tube 13 such that reaction force from the gas stream causes the nozzle 14 and its emerging jet of gas to rotate. Nozzle 14 may optionally simply comprise an open end of tube 13, but in other embodiments would comprise a fixture that causes gas to increase in speed (hence momentum) as it leaves tube 13. Such a nozzle 14 may be detachable from tube 13.

In use of the method and apparatus illustrated in FIG. 1(a), particulate dislodgement and removal from the internal space 2 is continued until there is a satisfactorily low concentration of particulate matter entrained in the gas leaving the internal space 2. As set out below, a sensor for such concentration is provided, and information on the concentration is provided to a user so that cleaning can cease when the concentration is low enough. By maintaining a pressure in the internal space 2 that is lower than the atmosphere outside the internal space 2, leakage of particulate around the door 8 or through the ports 10 during the cleaning operation is limited or prevented. Concentration measurement provides an objective criterion for ending the cleaning process.

FIG. 1(b) shows another mode for particulate removal from internal space 2. Door 8 has been opened and particulates are being drawn into a duct 24 by the above (or a second) partial vacuum source. Particulate removal in this way may be done before or after a period of particulate blowing as shown in FIG. 1(a) as found appropriate or between periods of particulate blowing.

In some applications, it is appropriate to remove significant accumulations of particulates first by the method shown in FIG. 1(a) and then through use of the conventional vacuuming approach of FIG. 1(b).

While the methods of FIGS. 1(a) and 1(b) have been illustrated by reference to an enclosure 4 with modifications to its door 8, there will be described below embodiments in which a temporary cover is placed over an opening of an enclosure having an internal space instead of a door.

Although FIG. 1(a) shows all port assemblies 10 to be provided in door 8, it is possible to provide port assemblies (not shown) in other parts (eg top, bottom or side walls) of cabinet 4.

The gas may be air in suitable cases or may be an inert gas such as (for example only) nitrogen or carbon dioxide (derived for example from dry ice). Inert gas may be appropriate where fire, explosion or chemical reaction is a potential hazard.

FIGS. 2 and 3 show schematically an embodiment of a cleaning system 30 that is operable as described above to remove particulates from the enclosure 4. System 30 includes an instrumentation and control system 199 that is not shown in FIG. 2, but whose functionality is illustrated separately and schematically in FIG. 3.

Referring firstly to FIG. 2, a gas source 32 is provided to direct gas to nozzle 14 through a conduit 34 which includes both a flexible hose portion 33 and cleaning lance 12. Where air is to be the gas, gas source 32 may comprise, for example, a pump or blower (centrifugal or axial or a hybrid of these) or a reciprocating-piston compressor or a container of compressed air. In some applications and facilities, a reticulated compressed air supply (not shown) may be available and a connection thereto can constitute gas source 32. Gases other than air may be used, being stored as a gas, or as a liquid or solid that changes phase on or before discharge, or generated by chemical reaction.

Conduit 34 may comprise flexible hose to enable manipulation of the cleaning lance 12.

Item 52 in FIG. 2 represents one or more components for conditioning and controlling the gas supply to lance 12. It is preferred that the gas supply is conditioned to be substantially oil- and moisture-free, and components are known in the art for achieving this. More will be said about item 52 below.

Gas and entrained particulates are drawn out of enclosure 4 through duct 20 connected to enclosure 4 at outlet port 18 and then through a cyclone separator 38 (of which one is shown, but multiple cyclones may be used if appropriate to a particular application) and filters 40 and 42 by a blower 46. Together the cyclone 38 and filters 40 and 42 remove particulate matter to a desired standard (particle size and concentration). One or more of the filters 40, 42 may be a "High Efficiency Particulate Air" (HEPA) filter. Although two filters 40 and 42 are shown in FIG. 2, this is not intended to be a limitation. More than two filters may be used, or in suitable cases even one filter only or no filter at all. Duct 20 may comprise a length of suitable flexible ducting. Where duct 20 comprises a flexible material reinforced with a spiral wire, or otherwise comprises conductive material along its length, that wire or conductive material may be preferably earthed to limit explosion risk when battery power is used for the system 30.

To draw gas and entrained particulates from the enclosure 4, a vacuum source, such as a suitable fan or blower 46 is provided so that pressure in duct 20 is reduced. As shown in FIG. 2, this may be located downstream of the cyclone 38 and filters 40 and 42.

To also enable direct vacuuming of particulates from enclosure 4 as shown in FIG. 1(b), duct 20 may be disconnected from outlet port 18 and used as vacuum hose 24. Alternatively, as shown in FIG. 2, a separate duct 48 may be provided that is connected to duct 20 via a selector valve 50 and used as duct 24. Selector valve 50 allows selection of direct vacuuming through duct 48 (as in FIG. 1(b) or removal of gas and entrained particulates as in FIG. 1(a). Duct 48 is shown with an end fitting 47 for increasing the flow velocity of flow into duct 48. Such a fitting may also be used (not shown) with duct 20 if duct 20 is used as duct 24 for direct vacuuming.

Selector valve 50, where provided, may be adapted to ensure that some suction is maintained in duct 20 even when duct 48 is in use.

In some embodiments, end fitting 47 may be of the same or similar form as lance 12, so as to be enterable into any of ports 10 and enable direct vacuuming of particulates with door 8 closed. In still further embodiments lance 12 itself is provided with an inlet for gas from the gas source 32, as above, and additionally with a connection for duct 48, allowing either suctioning via duct 48 or blowing with gas from gas source 32. In such embodiments valve 16 comprises a selector for enabling sucking or blowing.

Still another alternative to the arrangement mentioned in the previous paragraph is to use a separate vacuum cleaner (not shown) for direct vacuuming in cabinet 4.

Depending on the intended capacity of the system 30, some or all of the components shown to the left of station "XX" in FIG. 2, including relevant parts of instrumentation and control system 199 may be provided in a single enclosure. This may be a fixed installation (not shown), or wheel or skid-mounted (not shown), or even comprised in a backpack-type enclosure. In some embodiments, as stated above, gas supply 32 is simply a connection to a reticulated compressed air supply.

It has been confirmed by applicants that a version of system 30 adequate for use in cleaning particulates from electrical cabinets of large diesel-electric mining haul trucks can be implemented in an enclosure the size of a small-to-medium suitcase.

Instrumentation and Control

Instrumentation and control system 199 will now be described, still using the electrical cabinet cleaning application shown in FIG. 1 for illustrative purposes. (Some other applications mentioned below may not require all the functionality described.) Locations in the system 30 which may be provided with sensors of various types are labelled A to L in FIG. 2.

FIG. 3 is not intended as a detailed indication of hardware components and their connections. It is intended to explain what the system 199 does. The functions are straightforward enough for persons of ordinary skill in the art to implement without more specific detail.

Sensors and associated signal conditioning may be provided in system 30 for the following purposes:

(a) to ensure that when particulates are being removed by entrainment, as in FIG. 1(a), it is able to be known when a satisfactorily low concentration of particulates is entrained in gas being drawn from the enclosure being cleaned (eg cabinet 4), (whichever one of port assemblies 10 is in use) so that that process is complete;

(b) to enable monitoring of gas leaving blower 46 to ensure it has a satisfactorily low concentration of entrained particulates, so that persons near the point of discharge of gas leaving blower 46 are protected from harm;

(c) to enable monitoring of the operation of the various particulate-separation components of the system 30 and so ensure that filters 40 and 42 and cyclone 38 (in particular) are cleaned or emptied when appropriate and blower 46 cleaned if necessary;

(d) to ensure that components 6 in the enclosure being cleaned (eg 4, 60) and blower 46 are not exposed to unsafe/damaging temperature levels;

(e) to enable monitoring of pressure in the enclosure 4 being cleaned to ensure it remains in a range where there is neither damage to the enclosure 4 nor leakage of particulates from the enclosure 4, in particular by maintaining pressure in the enclosure below atmospheric pressure in the surroundings where work is being carried out;

(f) to enable monitoring of the position and/or functioning of the seal 7 and door 8; and (g) to provide necessary inputs for automatic control of parts of the system 30;

(h) to enable remote (or local) monitoring of the condition of the various parts of the system, so that maintenance and servicing can be carried out in a timely fashion.

Depending on requirements of particular applications and users, embodiments may comprise sensors for all or some only of these purposes. Outputs from the sensors can be used in some or all of the following several ways, as follows:

First, sensor outputs may be displayed directly as numerical measures—for example, pressure or blower 46 temperature in the enclosure being cleaned may be displayed on a suitable display. Alternatively, they can be displayed as "OK/Not OK" visual signals—for example it may be sufficient to indicate that a connected gas supply has pressure enough to be used rather than display its actual value.

Second, numerical quantities may be computed from sensor outputs and displayed—for example flow rate of gas through fan 46 or cleaning lance 12. Derived quantities also may be provided only as "OK/Not OK" visual indications.

Third, audible or visible alarms can be generated where necessary and diagnostic messages displayed to guide correction by users. Further, alarm conditions may be used to trigger an automatic shutdown or otherwise limit operation of the system, i.e. to provide a "fail-safe" capability.

Fourth, sensor outputs and quantities derived from them may be recorded by a data logging facility, for verification or diagnostic purposes. For data logging, time stamping of data may be provided and even location may be recorded by provision of a GPS module. This use of sensor outputs is particularly important where it is desired not only to clean enclosures but to ensure that there is proof and/or certification of the standard of cleaning that has been carried out. This is potentially vital in applications where diseases such as silicosis, "black lung" disease and diseases associated with asbestos are to be avoided, for example. Further, purpose (h) above becomes very important in applications where logged data is to be provided to an off-site organisation for monitoring/certification purposes. Only if the equipment's condition can be maintained properly can results be relied upon.

Fifth, as well as the fail-safe capability mentioned above, automatic control of parameters and components may be provided using sensor outputs, as discussed below.

Particular choices from the above can be made according to intended applications.

Regarding purposes (a) and (b) above, the extent of particulate concentration in gas flows can be sensed using triboelectric particulate sensors. These are available from suppliers such as Auburn Filtersense LLC of Beverly, Massachusetts, USA. While triboelectric-type sensors are suitable, other types are known in the instrumentation art and can be used as appropriate, for example sensors based on interruption or attenuation or transformation of a beam or beams of infra-red radiation, visible light, laser, beta rays or other EMF or nuclear radiation by particulates, or even acoustic-type sensors (in effect microphones) which react to impacts of particulates on a surface. The appropriate choice will depend on the particular application at hand.

Thus, to achieve aim (a) above, there may be provided one or more triboelectric (or other suitable) sensor(s) at station F (or a position upstream of it, or even inside space 2), Operation of triboelectric sensors are sensitive to electric charge due to contact between dust particles and a sensing element of the sensor. However, applicants have found that where a triboelectric sensor is used (at least for purpose (a)), accuracy can be reduced due to charges on dust particles acquired in the space being cleaned and in the duct 20 through which dust laden air is drawn from that space. It has been found that this effect can be reduced by providing an electrical connection between the container being cleaned, the ductwork upstream of the triboelectric sensor and the sensor itself. The connection can be made through a spiral wire on the duct 20 to the fitting by which ductwork 20 is connected to the container. This does not fully eliminate the unwanted charges, but a further improvement can be made by carrying out tests on representative flows of representative dust-laden air through similar duct geometries with actual weighing of the dust content to produce calibration curves relating sensor output to actual flow. Temperature and humidity can also affect accuracy, and by varying and controlling these quantities in such calibration tests, further corrections can be made. The data handling system (described herein by reference to FIGS. 3 and 41) can be provided with the calibration curves in software form.

To achieve purpose (b) above, there may be provided one or more triboelectric (or other suitable) sensor(s) at station K, downstream of the cyclone 38, filters 40 and 42 and blower 46. In some embodiments, a duct (which may be flexible) may be provided to take discharged gas and residual (i.e. unremoved) particulate well away from the area in which the cleaning operation is taking place.

Depending on the gas source, it may be appropriate to provide sensing of gas quality upstream of cleaning lance 12, for example at stations A or B. At station A, a pressure sensor may be provided to indicate, when cleaning lance 12 is not in use, that gas for blowing is available.

Display(s) for displaying measured quantities may be provided on a casing containing the main components shown in FIG. 2, or in a separate unit (not shown) connected thereto and in use placed in a position visible to a user. Key operating parameters such as the concentration of particulate matter at the outlet from the space being cleaned are displayed.

Regarding purpose (c) above, pressure sensors (not shown) may be provided at stations G, H and I to provide a measure of fouling of filters 40 and 42 with particulates, based on pressure drop through them, so that the need for cleaning can be indicated at an appropriate time. Rather than three such separate sensors, two differential pressure sensors (not shown) may be provided, respectively sensing pressure differences between stations G and H and H and I.

Similarly, in some embodiments either another sensor (not shown) is provided to measure the pressure difference between stations F and G, before and after the cyclone 38, or alternatively separate sensors at stations F and G can be provided. Excessive pressure difference across cyclone 38 can indicate fouling or blockage.

It is also possible to provide a pressure sensor at station K in addition to a pressure sensor at station I, so that the pressure change through blower 46 is known, or alternatively to provide a differential pressure sensor to sense the pressure change between stations I and K, i.e. across blower 46. The speed of blower 46 may be sensed at station J as well.

Also in relation to purpose (c), at station L, a sensor (not shown) may be provided to indicate that a certain quantity of particulates has been collected in cyclone separator 38 (or a particulates container (not shown) secured thereto), so that for best operation, cyclone 38 should be emptied. This may be of the optical or infra-red type, that senses interruption of a beam, these sensors being well known in the instrumentation art. Alternatively an ultrasonic type may be used, or even a simple "sight-glass" type indicator or transparent section of cyclone 38 may be provided that can be seen by a user. When a "sight-glass" type indicator is used, an LED light positioned and coloured to minimize glare may be used internally within the cyclone 38 or particulates container to enhance visual clarity.

Regarding purpose (d) above, in some embodiments, temperature of the blower 46 Is sensed at station J and/or temperature of gas within space 2 is sensed at station C (or even F), in each case with suitable temperature sensors.

Regarding purpose (e) above, during use of cleaning lance 12, it is desirable that gas pressure in cabinet 4 be maintained at a level that does not lead to significant risk of particulates leakage from the cabinet 4 through for example port assemblies 10 or past seal 7 around door 8. A pressure in cabinet 4 slightly below external (atmospheric) pressure is suitable in many applications, as it limits the potential for leakage of particulates from cabinet 4.

It is also desirable that during the blowing operation, pressure in cabinet 4 not become too high or too low, to avoid distortion or even structural failure of cabinet 4. A simple approach is to provide a pressure sensor (not shown) at station C (i.e. sensing absolute pressure within space 2 of cabinet 4, or the difference between the pressure inside space 2 and the atmosphere). Actual control of the pressure in space 2 is described below. The pressure sensor (not shown) may be located physically on the cabinet 4 or on door 8 with signals communicated to instrumentation and control system 199 via copper cable, optical fibre, wireless or other suitable means. Alternatively, the pressure sensor may be mounted away from the cabinet 4 and communicate with space 2 via a small-bore flexible tube.

Regarding purpose (f) above, it is important when blowing gas into an enclosure such as cabinet 4 that there be no leakage of air (and entrained particulates) past elastomeric seals such as seal 7 of cabinet 4, due for example to seal 7 failing to close off excessive gaps between door 8 and cabinet 4 at positions along the seal 7. For applications such as that shown in FIG. 1), where a hinged door 8 is sealed by seal 7, a single sensor (not shown) may be provided to sense whether the door 8 is in the correct position, relative to cabinet 4, for correct operation of seal 7. This could be a simple microswitch or a proximity sensor mounted to door 8 or cabinet 4. If seal 7 is a pneumatic (i.e. inflated) seal, a pressure sensor may be provided to sense pressure in the seal 7.

However, in some embodiments described below, a detachable cover (see for example item 310 in FIG. 16, item 310a in FIG. 24, item 310b in FIG. 33, item 310c in FIG. 29) is used to close off an enclosure or space. In these cases, multiple proximity or other suitable sensors (not shown) may be provided at spaced-apart positions around the cover periphery to enable monitoring of seal operation. These sensors may be of proximity type as above, or be responsive to pressure between the seal and enclosure or electrical conductivity between metallic areas on either side of the seal and facing parts of the enclosure or cover. The sensor locations would correspond for example to stations D and E in FIG. 2.

If measurement of gas flow rate to lance 12 is required, a flow meter (not shown) may be provided at station B. This could be of any suitable type, for example a venturi section or calibrated orifice plate with sensor(s) to measure the pressure change therethrough (and ideally temperature as well), or a sophisticated thermal sensor such as those available from E+E Elektronik GmbH of Germany. Also, and in the same or any other suitable way, the gas flow rate out of space 2 may be measured. This may be done at station I or station K, where the measurement is unlikely to be influenced by entrained particulates. For applications where concentrations are expected to be sufficiently small, outlet flow rate measurement may be made with sensors at any of stations F, G, H or I.

Regarding purpose (g) above, control of the blowing/entraining operation will now be described.

In some embodiments, gas flow to the cleaning lance 12 from supply 32 is simply turned on or off as required, by a user, with blower 46 running continuously. The user, as well as monitoring the extent of particulate concentration (visually, or by use of particulate concentration sensor(s) as described above) can monitor pressure in the space 2 if displayed, or simply be alert for alarms based on the sensed pressure in space 2 being, or threatening to be, out of a specified range.

A more sophisticated approach in other embodiments is to include in item 52 (FIG. 2) a solenoid valve that can interrupt (or vent to atmosphere) gas flow to cleaning lance 12 automatically if required to prevent overpressure (or loss of appropriate partial vacuum) in space 2. Similarly, blower 46 can be stopped automatically or slowed down, (or a damper operated) if required to prevent an excessively low pressure in space 2. The system 199 generates signals to control the blower 46 and/or solenoid valve in item 52, based on sensed pressure in space 2 or a mismatch of inlet and outlet flow rates.

For either of the approaches described in the previous two paragraphs, generation of an alarm and/or of automatic control signals can be anticipatory, based on rate of change of pressure or gas flow rates.

In still other embodiments, closed-loop automatic control is used, subject to maintenance of a "fail-safe" capability. For example, cleaning lance 12 may be manually controllable by a user (i.e. with gas flow rate set to off, fully on, or any intermediate value), with blower 46 and/or a variable-flow valve included in item 52 controlled automatically by system 199 to maintain a chosen value (i.e. set point) of pressure in space 2 or net gas flow rate into space 2. Alarms and/or display of operating parameters may be provided also in these embodiments. For further example, cleaning lance 12 may be simply set to "off" or "fully on", with closed loop control of a set pressure in space 2, net flow rate into the space 2, or a specified flow rate through lance 12.

Note that while maintaining appropriate pressure within a space being cleaned is important, it is to be noted that in many industrial, mining and similar applications, it is unlikely that an excessively high or low pressure will in fact be encountered. This may be, for example because an enclosure being cleaned is itself leaky and therefore an accumulator of particulate matter. Accordingly, in some applications, sophisticated control and even sensing of cleaned space pressure can be safely dispensed with.

Referring now to FIG. 3, the presence of block 200 indicates the presence of one or more data processing components adapted to provide the functionality described herein. It is to be understood that block 200 may simply comprise a single processor (microprocessor or otherwise) or several processors each covering a subset of the functions required. For example, if there is a closed-loop control functionality as described herein, that may have a dedicated processor. Some or all of the functions carried out within block 200 may be implemented wholly or partially by other means than microprocessors—for example field-programmable gate arrays (FPGAs) may be used to implement some functionalities. Multiple data processing components may be comprised in block 200, for example, where a variable-flow valve is included at item 52 and has its own internal electronics or where a particulate concentration sensor is provided that has its own data processing components.

The data processing componentry of block 200 is provided to receive inputs from sensors and system controls and, using these, to drive a display at 208, and/or a set of alarms at 210 and, as applicable, control outputs at 207. It may not be essential for a particular application or embodiment to provide and use all of the sensors described above. For example, in some embodiments reliance may be placed on visual inspection of cyclone 38 to determine that it needs emptying, rather than providing a sensor at station L. However, in general some sensors will be used, and block 202 represents a set of sensor excitation (i.e. powering) and any necessary signal conditioning functions, all as required to convert raw signals from the sensors to a form (digital or analog) suitable for the processing function 200. (Note that many processors have internal analog-to-digital converters and so can accept analog signals.) The triboelectric sensors of the prototype system described below provide outputs in current-loop form, while the pressure transducers provide digital outputs directly.

Block 204 represents presentation of sensor outputs to the processor at 200. For example in the prototype system described below, a multiplexer is used to provide 8 scannable channels for pressure sensors via the I²C bus protocol. Multiplexing of sensor outputs may be provided if there are more sensors used than the number of inputs provided by the chosen microprocessor 200. Note that as discussed above there may be several sensors at some stations, for example a pressure sensor and a temperature sensor at station C. FIG. 2 is not intended to suggest a maximum of 12 sensors (A-L). Block 200 may also include any or all of: automated fault detection, diagnostics and datalogging capabilities.

System 30 also requires some control inputs provided at block 206 such as on/off switches (not shown) for the blower 46 and the gas supply 32 if it includes a dedicated compressor for example, and to initiate operation of data acquisition by system 199. If any quantity is to be controlled in closed-loop manner, there may be a control (eg potentiometer) to provide a set point for the mass flow rate. There may also be controls (eg potentiometers in the case of analog control implementation) to set allowed maximum and minimum pressures in the enclosure to be cleaned.

Block 207 represents provision of signals required for automatic functions—for example shutting off the gas source 32 if pressure at station C rises too much or a continuous control signal where closed-loop pressure control is provided.

Block 208 represents provision of the function of one or more suitable display(s) for visual output of system 30 information as required. For example, there may be display of outputs for particulate concentration from triboelectric sensors at stations F and K. Displays (not shown) may use any suitable technology, for example LED, LCD or OLED. The two last of these may be of a touch screen type arranged to receive any or all of the inputs mentioned in relation to block 206 above.

Block 210 represents provision of a separate display of alarm conditions for system 30. For example, it may indicate that cyclone 38 requires emptying or that filters 40 or 42 have pressure drops indicating that they need cleaning, or that pressure in the enclosure being cleaned is outside its set limits, risking damage or particulates leakage. Such alarm functions may actually be incorporated in and displayed on the display 208, or may be provided separately, for example using a known "traffic light" format (not shown) based on green, yellow and red LEDs to indicate respectively—no alarm or normal operation, warning, alarm condition.

The following is a list of conditions and responses that may be automatically recognized and caused within block 200 to generate alarms or control signals that provide system 30 with a "fail safe" capability.

Excessive particulate contents at either inlet or outlet of blower 46—shut down blower, provide diagnostics.

Where intention is to operate at negative pressure—pressure excessively low (with risk to structure) or not low enough (risking leakage of particulates). If not low enough, interrupt flow into the enclosure, also check blower, filter(s) cyclone fouling. If too low either stop blower or reduce blower speed.

Where positive pressure in enclosure 4 is allowed—pressure excessively high risking structural damage or leakage of particulates. Interrupt flow into enclosure, increase blower speed, check for fouling of filter(s) or fouling or filling of cyclone(s).

Fouling of filter(s)—stop operation of system.

Fouling or filling of cyclone(s) 38—stop operation of system.

Blower 46 temperature excessive—stop operation of system.

Blower 46 not operating or underspeed—stop operation of system.

Where seal 7 is a pneumatic seal—seal pressure out of allowable range—stop operation of system.

Where seal 7 is pneumatic or non-pneumatic—any one or more of seal position measurements (if sensors fitted) out of allowed range. (Or if pressure sealing pressure sensor(s) fitted, any one or more of their outputs out of range. Stop operation of system.

Block 211 represents the writing of sensor and other data to some form of storage. For example, the prototype system described below is provided with a facility to write data based on sensor outputs to an SD card for later downloading and checking. In that system, all active sensors are scanned cyclically once the system is in operation and derived outputs from them are time stamped using a real-time clock module and written to an SD card.

Block 213 represents communication of data to location(s) away from the worksite and receipt of instructions and/or the like from external sources. For example, where a service provider wishes to provide checking and certification of critical particulate removal operations from a location away from the site of the operation, it is possible to provide a communications interface for the transmission and receipt of data and instructions. As an example, a mine may have a wireless packet-switched digital data network covering its entire site that can be used to communicate with a base station, and that base station may communicate via the mobile phone network or via the internet by whatever other connection means is available. Where mobile phone network accessibility is available at a worksite, it may be used and the base station may not be necessary. The service provider may carry responsibility for correct functioning, calibration and the lie for the equipment used for particulate removal, and receipt of data from the various sensors described facilitates this function. Data and instructions may be transmitted substantially in real time or data may be written to memory (eg using an SD card) by system 199 for later transmission.

Note that although the above disclosure has referred to particulate removal, it is possible to use the apparatus as shown in FIGS. 1(a), 2 and 3 for purging of gases from enclosed spaces, either as an alternative to particulate removal or in any application where both particulates and undesired gas are both present. An online gas analysis device suited to the gas in question may be provided at for example any of stations F, G, H, I or K, instead of or in addition to a particulate concentration sensor.

Ways to arrange for the methods of FIGS. 1(a) and 1(b), and the operation of system 30 (including system 199) to be applied to other enclosures will now be described.

Example—Application to Cabinets

FIGS. 4 to 10 show one way in which a typical existing cabinet 60 for electrical components (not shown) can be modified to implement the invention using cleaning system 30, cabinet 60 corresponding to enclosure 4 in FIGS. 1 and 2. Cabinet 60, is a cabinet such as might typically be found in an industrial facility or in heavy mobile equipment such as a locomotive or mining haul truck, and has a fixed main portion 62 defining enclosed upper and lower spaces 64 and 66 respectively for electrical components. Cabinet 60 has been modified to enable cleaning of particulates using the invention, but only in respect of the upper space 64.

Closure of opening 68 of lower enclosed space 66 is provided by a conventional hinged door 70 normally held closed by a handle-operated latch 72. A peripheral elastomeric seal 74 mounted to main portion 62 extends around opening 68 to limit ingress of contaminants such as particulates when door 70 is closed.

Normally, cabinet 60 would have a hinged door essentially the same as door 70 except for its dimensions being suited to close opening 76 of upper space 64, and also a similar peripheral sealing arrangement. However, according to the modification, a rectangular frame 78 is secured (for example by welding at 81) to main portion 62 and extends peripherally around opening 76 of the upper space 64. A hinged door 80 is supported on frame 78 and can be opened to allow access to upper space 64 when required. Door 80 is received in frame 78 and held closed by handle-operated latches 82, and contaminant ingress and between door 80 and frame 78 is limited by a peripherally extending elastomeric seal 84. Because cleaning can involve temporarily increasing pressure in upper space 64, door 80 includes a reinforcing member 79 extending around its periphery.

Door 80 has features that enable the invention to be implemented for cleaning of upper space 64.

First, door 80 is provided with port assemblies 86 (corresponding to port assemblies 10) through any of which cleaning lance 12 can be pushed partway into upper space 64 at in the way shown for enclosure 4 in FIG. 1(*a*). Door 80 also has a transparent viewing window 88 corresponding to window 22 in FIG. 1(*a*).

Second, for removal of particulates from upper space 64, at least one outlet port 90 (corresponding to outlet port 18 in FIG. 1(*a*)) for gas and entrained particulates is provided in door 80. This has a removable cover 92 that can close outlet port 90 when cleaning is not underway. Duct 36 is secured to outlet port 90 for use when cleaning upper space 64. Outlet port 90 is provided in door 80, however in some embodiments (not shown) it may be provided (or an additional outlet port may be provided) at a suitable location in cabinet main portion 62.

In FIG. 6, one of port assemblies 86 is shown in exploded fashion. One or more discs 94 of gas impermeable elastomeric material (for example formed from an artificial or vulcanized natural rubber) are provided, each with a slit 96 extending across part of a diameter, and discs 94 are arranged in layered fashion with slits 96 oriented in different directions as shown. Discs 94 are secured against the door 80 by a ring 98 using fasteners (not shown) extending through holes 100 in ring 98 and door 80, ring 98 being concentric with a hole 102 in door 80. Port assemblies 86 can be reasonably (not absolutely) gas- and particulates-tight when not in use. Cleaning lance 12 can be pushed through slits 96 so that its nozzle 14 is inside the enclosure, while the gas supply hose 34 remains outside cabinet 60. Moreover, cleaning lance 12 can be rotated about its length as required, its angle to the door 80 varied, and the distance beyond door 80 to nozzle 14 can be varied by a user as required. The number of port assemblies 86 on door 80, and their positions, may in some embodiments be chosen to suit the arrangement of components within the enclosure 60 to enable most effective and thorough cleaning.

Note that the use of frame 78 as shown in FIGS. 4 to 10 is a measure that was adopted for the particular cabinet 60 described here, which had inadequate gas and particulates sealing around door 80. For a cabinet and door having adequate sealing arrangements (not shown) the door features described above may be able to be implemented by simply modifying the original door.

Figure 15:
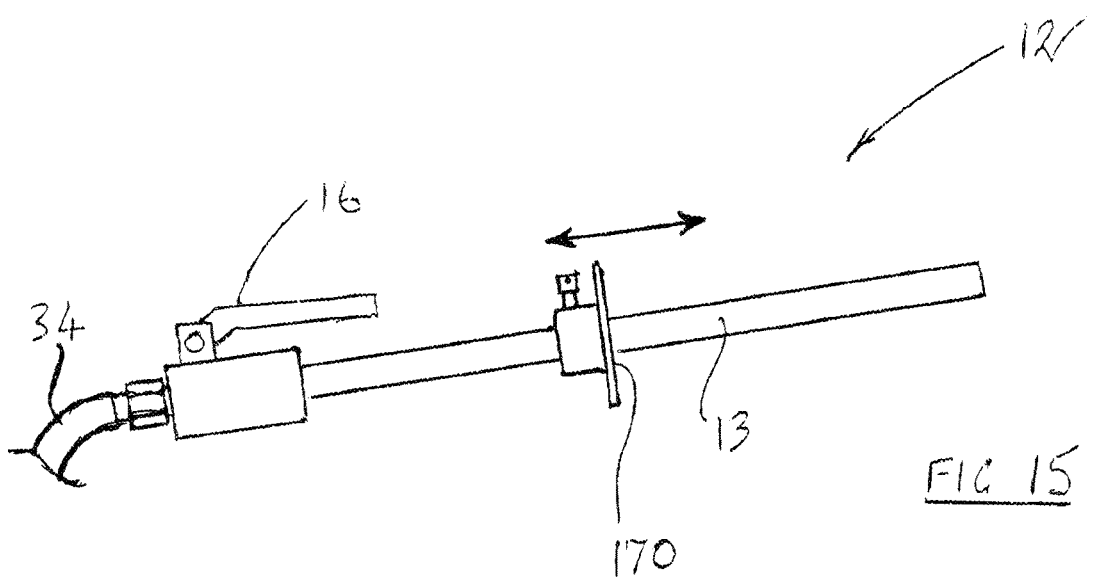
FIG. 15 is a side view of a cleaning lance according to the invention fitted with a collar assembly.

As shown in FIG. 15, the cleaning lance 12 may have a collar assembly 170 securable in any of a range of positions on tube 13 so as to prevent excessive penetration of cleaning lance 12 into the enclosure (for example cabinet 60, cabinet 150 or enclosure 4), leading to potential damaging of components therein.

Figure 11:
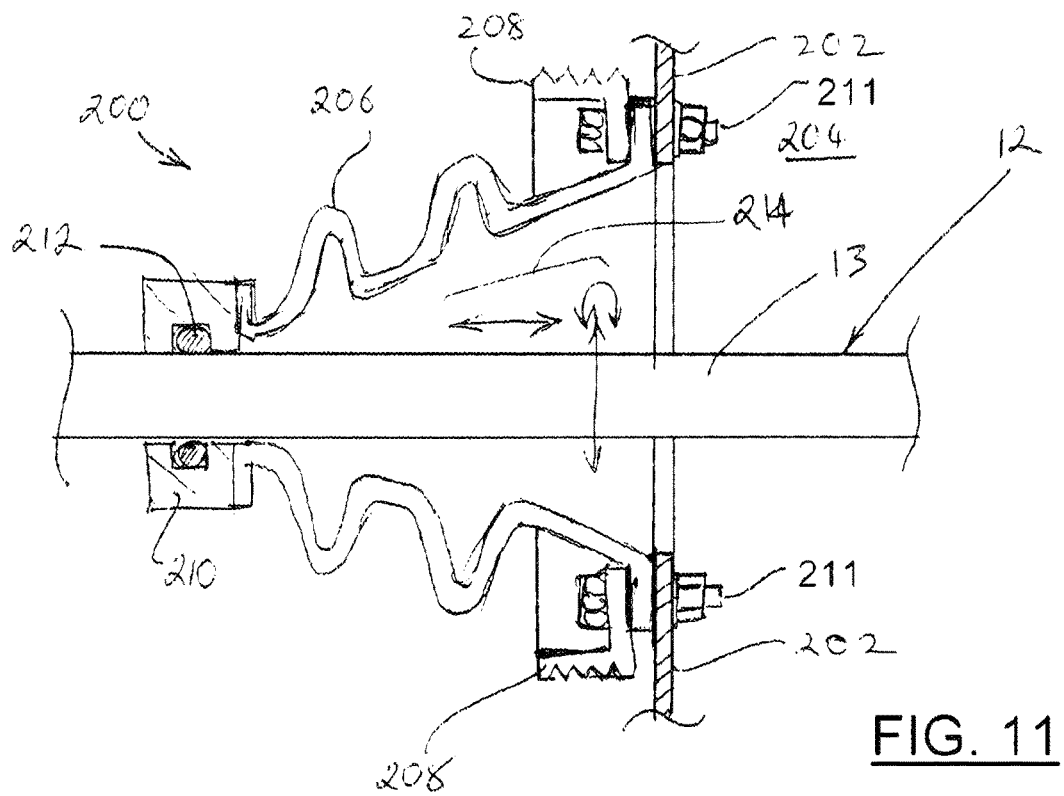
FIG. 11 is a vertical section through an alternative port assembly according to the invention, when in use.
Figure 12:
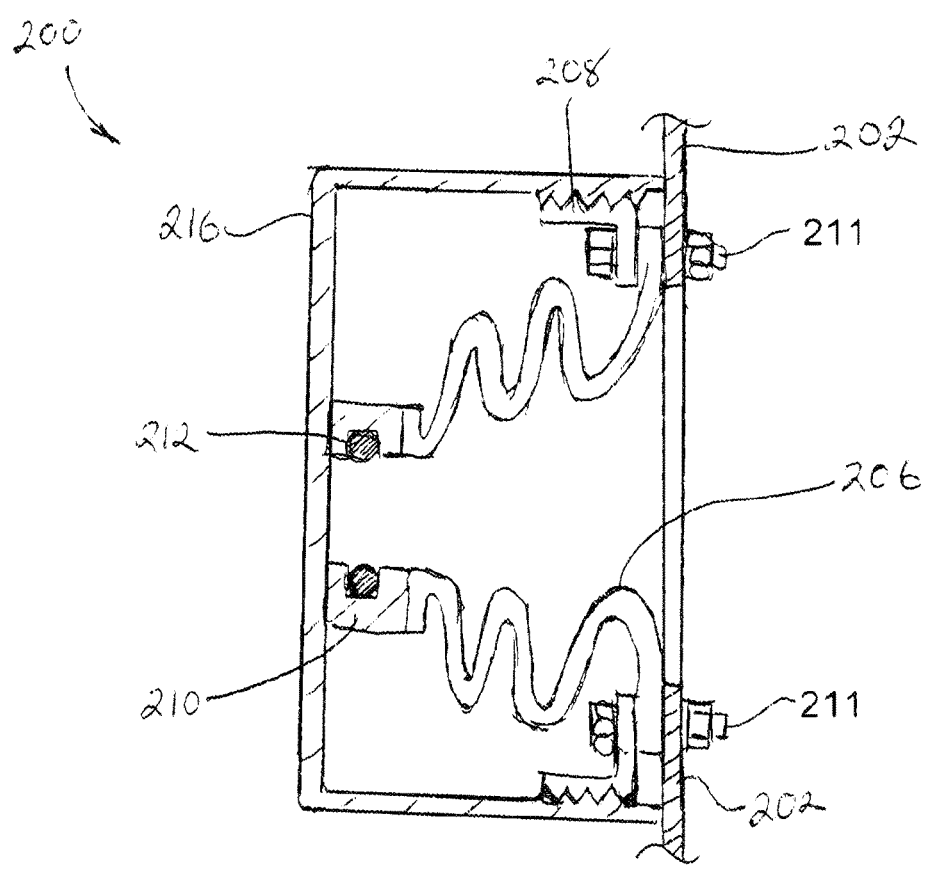
FIG. 12 is a vertical section equivalent to FIG. 11 showing the alternative port assembly of FIG. 11, now when not in use.

Alternatives to the port assemblies 10 shown in FIGS. 4 to 10 are possible. One such is shown in FIGS. 11 and 12. FIG. 11 shows a port assembly 200 secured to an enclosure door 202 (similar for example to door 80 or door 8) and providing access for cleaning lance 12 to an internal space 204. Port assembly 200 comprises an elastomeric bellows or boot 206, secured to door 202 by a ring 208 and fasteners 211. Secured to bellows 206 is a block 210 through which, in use, tube 13 of cleaning lance 12 can pass. Tube 13 can slide lengthwise in, and rotate relative to, block 210, and be angled in horizontal and vertical planes as shown by arrows 214, and sealing between tube 13 and block 210 is provided by an elastomeric O-ring seal. Other seal arrangements may be used depending on the application (eg lip seals, multiple seals). When port assembly 200 is not in use, a lid 216 is screwed onto a threaded portion of ring 208, after withdrawal of tube 13, to prevent gas and particulates egress. (Note that a lid (not shown) equivalent in function to lid 216 could be screwed to block 210 instead of ring 208.) Port assembly 200 requires that any nozzle 14 comprised in cleaning lance 12 be of lesser diameter than tube 13, so that tube 13 can be entered through block 210.

Alternative Embodiments—Cover Assemblies

Further alternatives to the arrangements that were described above by reference to FIGS. 4 to 10 will now be described.

FIGS. 4 to 10 showed a permanent modification to an existing cabinet 60 to implement the invention, in which a frame 78 was secured to a main portion 62 of the cabinet 60, the frame 78 itself incorporating a door 80. Another approach applicable to cleaning of cabinets with hinged doors will now be described. This is to provide a temporary cover which can be secured sealingly over the opening of the cabinet after either removing or swinging open the cabinet's existing door.

Figure 9:
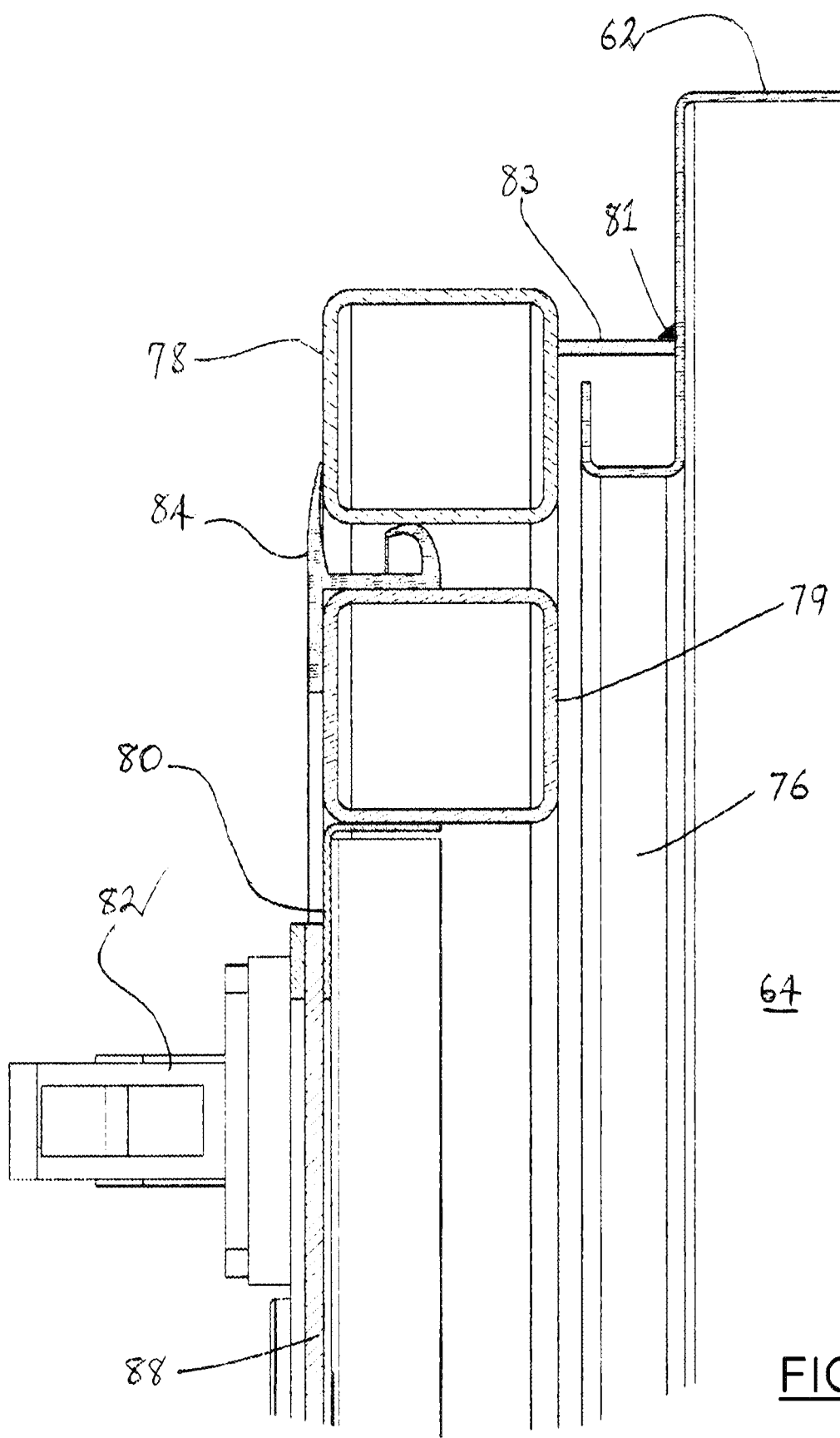
FIG. 9 is an enlarged view of detail A of FIG. 8.
Figure 10:
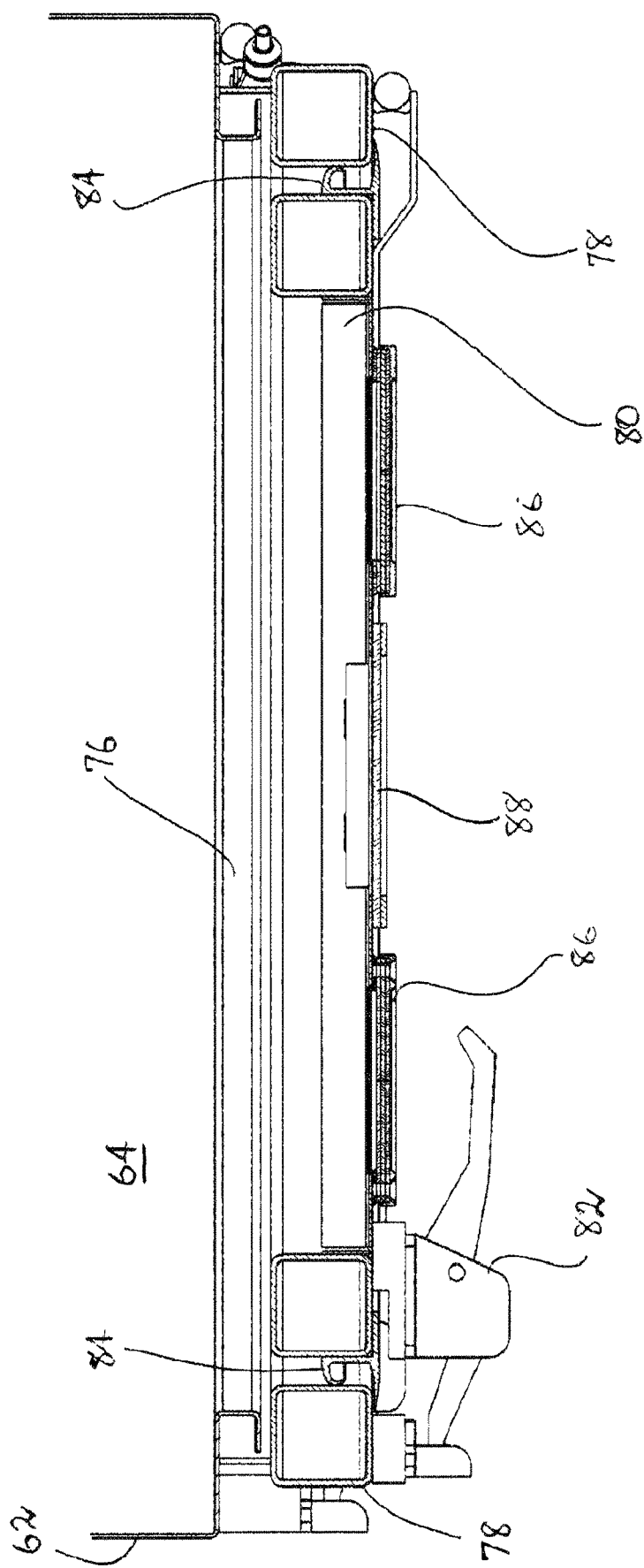
FIG. 10 is a sectional view of the cabinet as shown in FIG. 7, the section being taken at station DD of FIG. 6.
Figure 13:
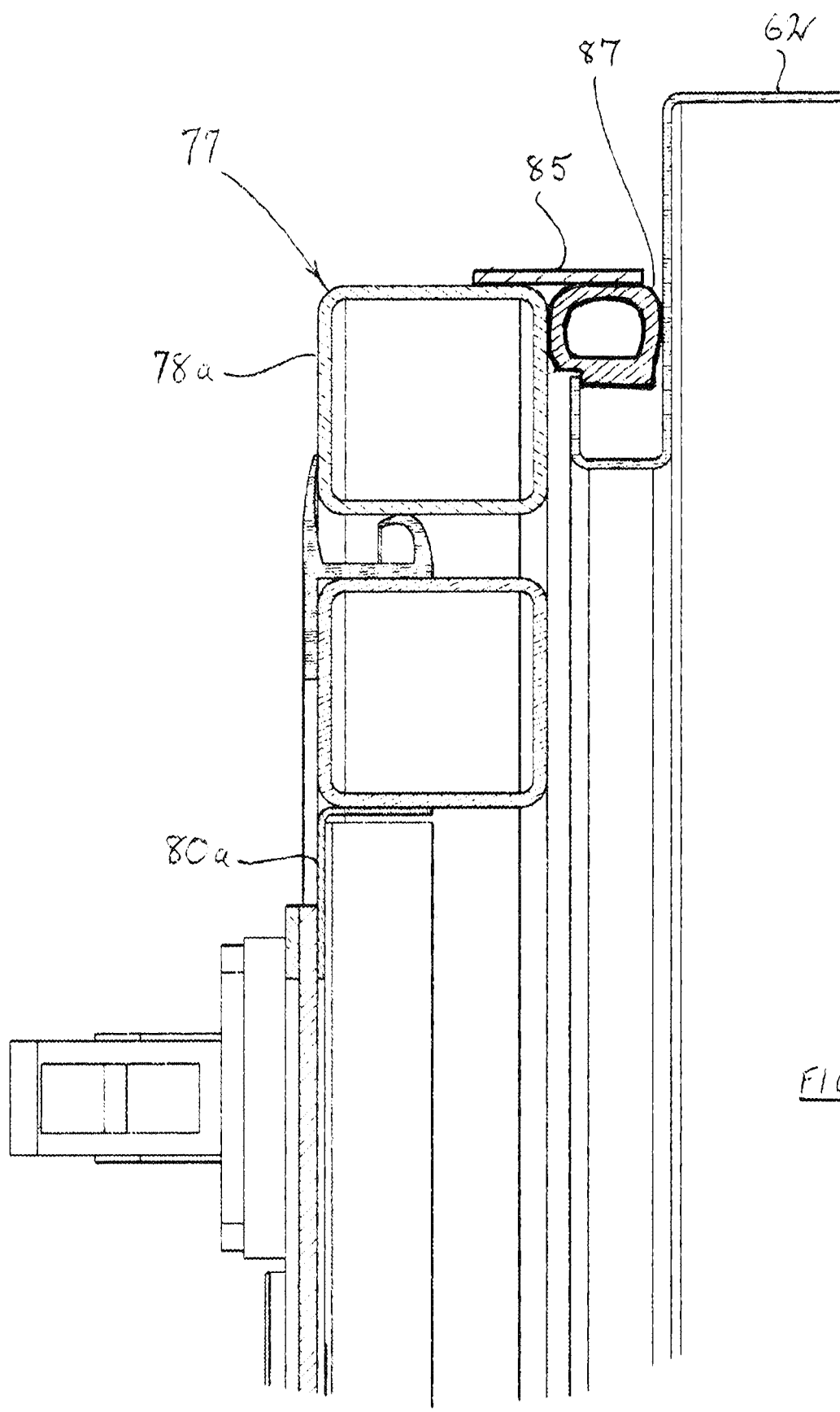
FIG. 13 is a view exactly equivalent to FIG. 8 of a temporary version of the frame shown in FIG. 8.

FIG. 13 shows in a view equivalent to FIG. 9 a temporary cover 77 comprising a frame 78a that is exactly the same as frame 78 in all respects, including provision of a door 80a equivalent to door 80, except that frame 78a lacks a member equivalent to member 83 (see FIG. 9) secured to cabinet portion 62 at 81. Instead, a retaining member extending peripherally around frame 78a is provided together with an elastomeric seal 87, also extending peripherally around frame 78a. When particulates are to be dislodged by use of cleaning lance 12, cover 78a is temporarily secured to cabinet main portion 62, being held in place by suitable clamps (not shown), the original door (not shown) of cabinet 60 being swung aside or removed altogether. Seal 87 may be inflatable with a gas to enhance its sealing action. When cleaning is complete, frame 78a is removed.

Figure 14:
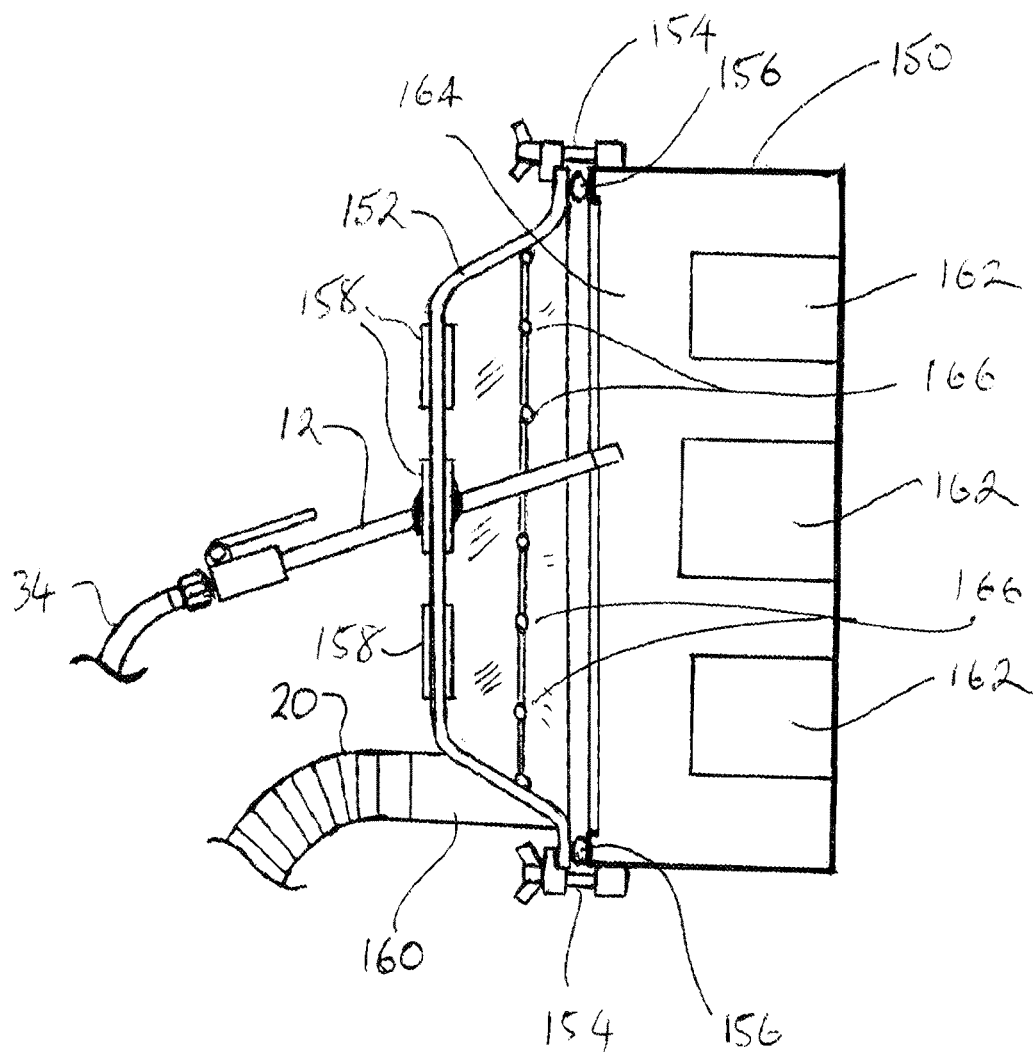
FIG. 14 is a vertical section view of an enclosure fitted with a temporary cover according to an embodiment of the invention.

FIG. 14 shows a view (in vertical section) of a cabinet 150 fitted with an alternative temporary cover 152 for cleaning. Cover 152 is secured by suitable clamps 154 on its periphery. Cover 152 is sealed against cabinet 150 by a peripheral seal 156. This may if desired be of a type inflatable by gas. Cover 152 has port assemblies 158 which may be the same as port assemblies 10 and a gas-and-particulates outlet port 160 for connection of duct 20. Cover 152 has a dished shape (as seen in the section of FIG. 14) to provide more room between the port assemblies 158 and components 162 in cabinet 150 than would be provided by for example cover 78a. Where practicable, this shape can be advantageous in enabling easier and better positioning of cleaning lance 12 and reduced risk of contact with and damage to components in cabinet 150. Further, cover 152 is formed from a substantially transparent plastics material (eg polycarbonate or acrylic) to provide for easy visibility of the cabinet interior while cleaning lance 12 is in use. Anti-scratch treatments are known in the art and may be applied to at least the inward surface of cover 152. Still further, a set of light-emitting components (eg LEDs) is provided inside the space 164 formed by cabinet 150 and cover 152 to enhance visibility within space 164. (This approach to lighting is applicable also to other embodiments, such as those shown in FIGS. 4 to 10 and 13.) Cover 152 is shown without a door equivalent to door 80a of cover 77 but a hinged door could be provided in cover 77 if desired (not shown).

Figure 16:
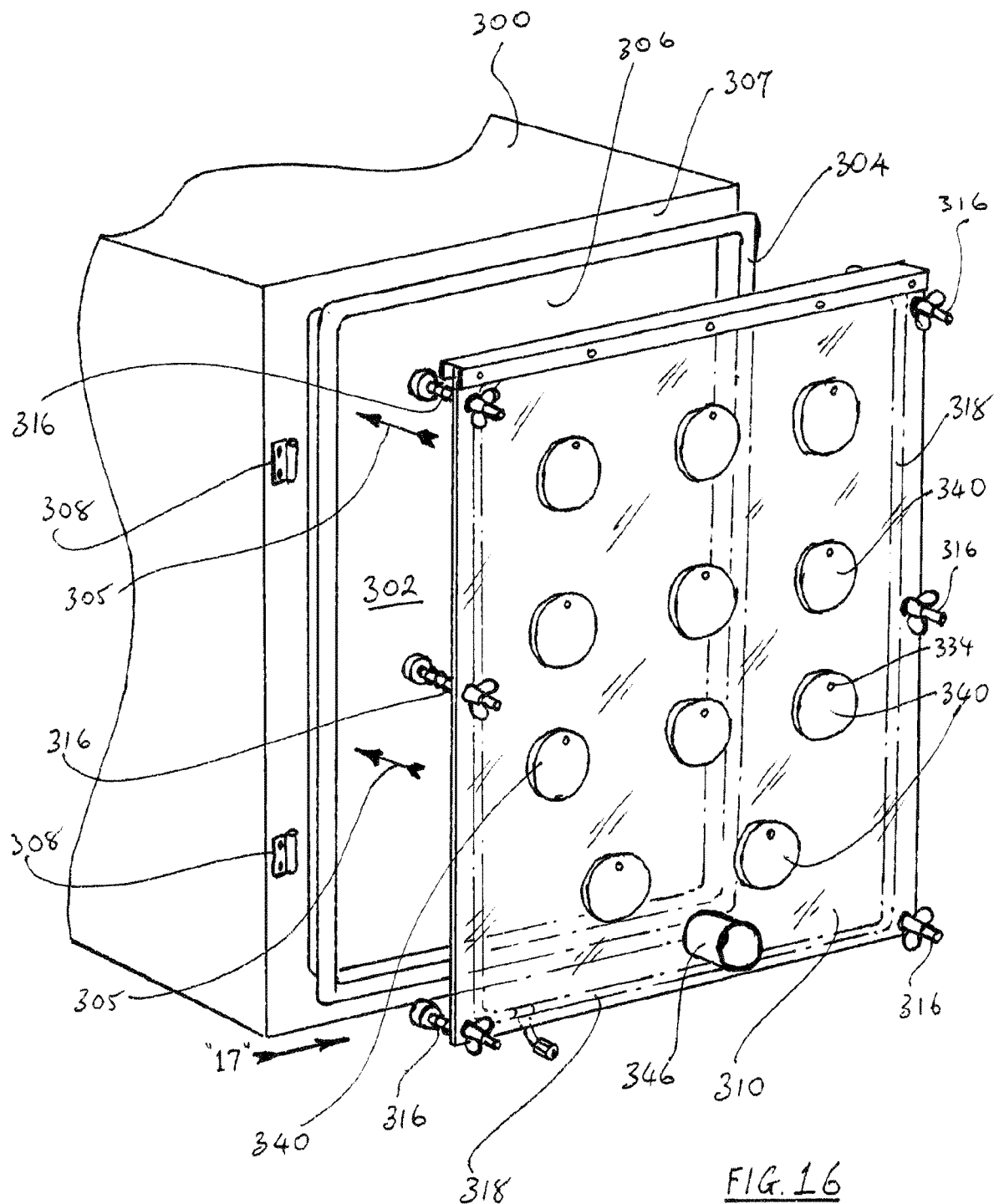
FIG. 16 is a perspective view of a cabinet and a further cover assembly positioned ready to be secured to the cabinet.

FIG. 16 shows still another temporary cover 310 that is an alternative to those described above. A cabinet 300 has an internal space 302 that is to be cleaned of particulates. Cabinet 300 has a flange 304 surrounding an opening 306 that in ordinary use of cabinet 300 would be closed by a door or other cover. (No such door or cover is shown in FIG. 16.) Hinges 308 could for example support such a door that either is simply swung open or removed from cabinet 300. To cover opening 306, cover 310 is provided.

Cover 310 has a formation 312 on its upper edge 314 that can be hooked over an upper part of flange 304 when cover 310 is moved in the direction of arrows 305 towards flange 304. Cover 310 is then held in position over opening 306 by clamps 316. Extending around the periphery of cover 310 is a seal 318 that in use of cover 310 bears sealingly against flange 304 to prevent or limit passage of particulates from internal space 302 during cleaning (similarly to seal 84 of FIG. 8). Seal 318 is of rubber or a rubber-like material and may optionally be of a pneumatic type inflated with a gas. (A seal (not shown) serving the same purpose as seal 318 may, in alternative embodiments, be provided on an enclosure being cleaned for use with a cover otherwise equivalent to cover 310. Further, such a cover or a cover with a seal such as cover 310 may instead of being hung from a flange (such as flange 304 in FIG. 16, be hung from a suitable temporary or permanent formation specifically provided.)

Figure 17:
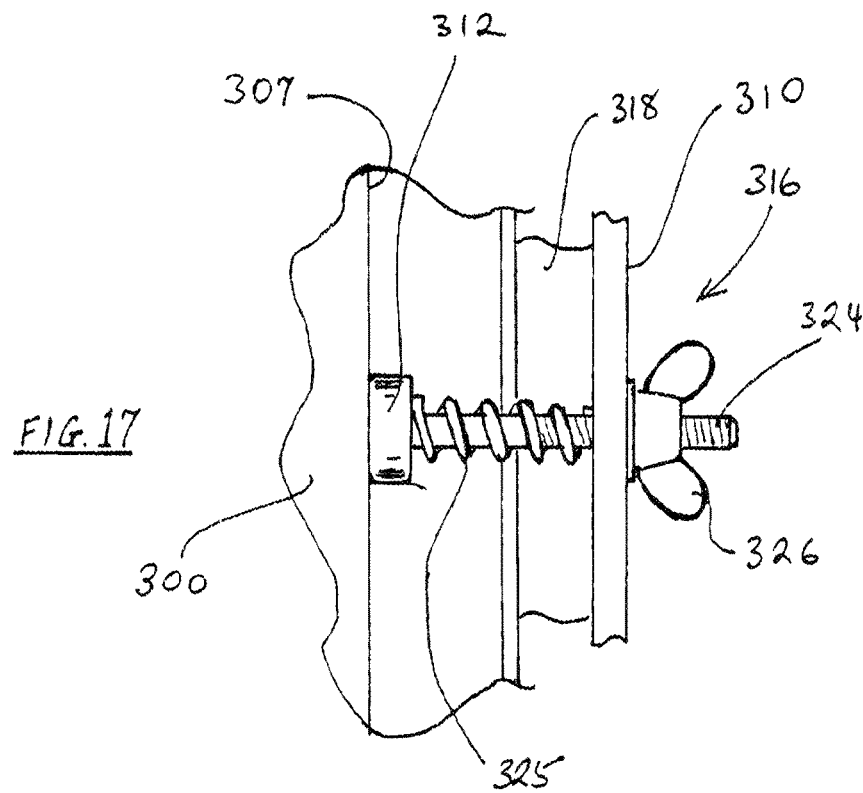
FIG. 17 is an elevation of a clamp assembly as shown in FIG. 16 and as seen looking in the direction of arrow "17"

FIG. 17 shows one of the clamps 316. This has a magnet 322 that in use holds itself against surface 307 of cabinet 300, and captive thereon a bolt 324 passing through cover 310. A wingnut 326 can be screwed on bolt 324 to move cover 310 towards surface 320. Bolt 324 passes through a compression coil spring 325 between the magnet 322 and cover 310 to aid correct positioning of magnet 322 when cover 310 is being positioned ready for use.

Any other suitable clamp arrangement can be used as an alternative to clamps 316. In other embodiments, where control of pressure within an enclosure being cleaned is sufficiently reliable, to maintain a negative pressure within that enclosure at all times and dispense with some or all clamps such as clamps 316. The cover 310 is then held in place entirely or partially by atmospheric pressure due to the lesser pressure inside the enclosure. Another approach (not shown) as an alternative to clamps 316 is to provide magnetic tape to cover 310 extending around all or part of the periphery of cover 310 so as to be attracted to (for example) flange 304. Still another approach (not shown) is to provide discrete magnets recessed into cover 310 on its enclosure-facing side that are positioned to be abut flange 304 and be held by the magnets against it.

Figure 18:
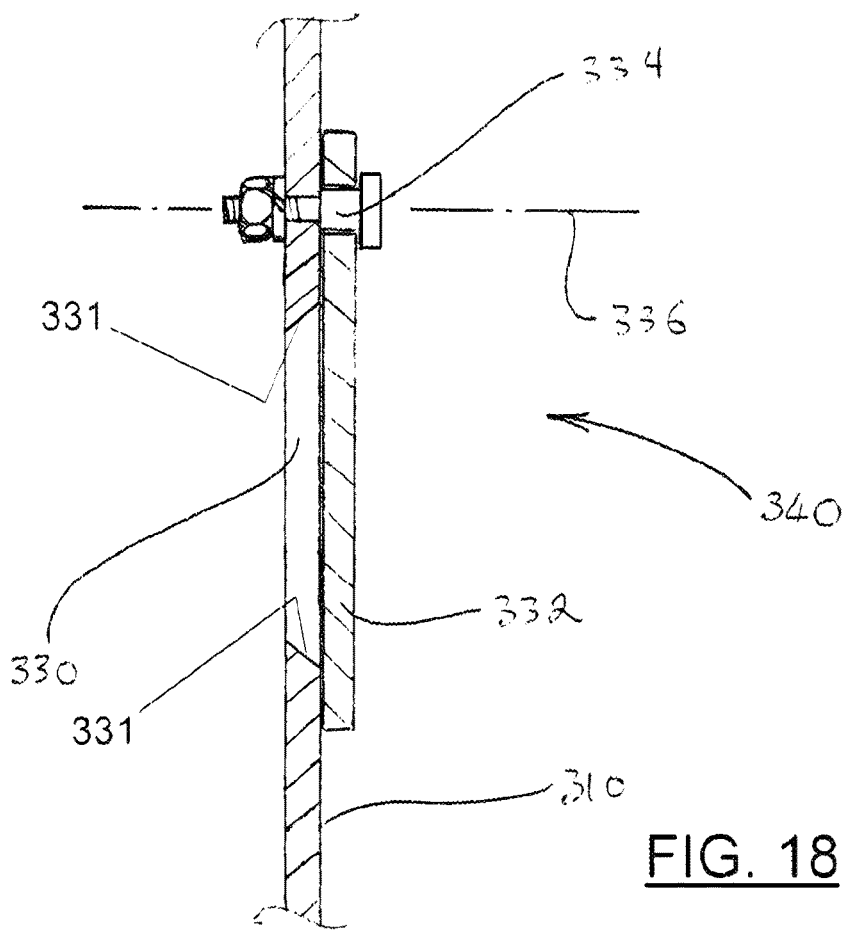
FIG. 18 is a cross-sectional view of a port assembly of the cover shown in FIG. 16.
Figure 19:
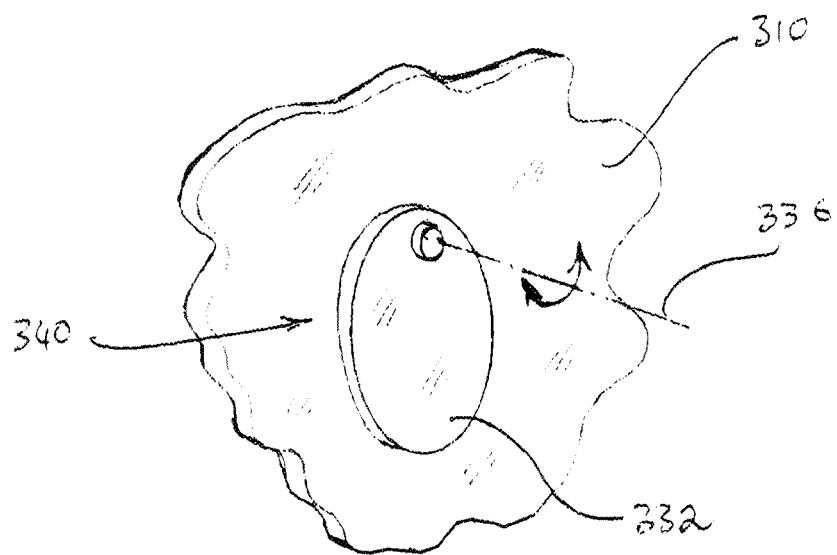
FIG. 19 is a perspective view of the port assembly shown in FIG. 18.

While port assemblies of the types described above (i.e. items 10, 200) may be used for cover 310 for insertion of a cleaning lance such as lance 12, cover 310 is shown with port assemblies 340 of a further type. Cover 310 has multiple openings 330 each covered (on the outer side of cover 310) by a movable cover 332, as shown in FIGS. 18 and 19. Movable cover 332 acts as a restriction to flow and possible particulate leakage through opening 330 when the port assembly 340 is not in use accommodating a lance 12. Openings 330 are bevelled at 331 to accommodate a range of angular movement of lance 12. Each cover 332 is supported on a pivot pin 334 so as to be freely swingable about an axis 336 by a user to uncover the associated opening 330. A cleaning lance such as cleaning lance 12 can then be inserted through the opening 330 in the same way as shown in FIG. 1(a) for use in blowing gas into internal space 302 to dislodge particulates therein. Thus, each combination of an opening 330, cover 332 and pivot pin 334 amounts to a port assembly 340 analogous to a port assembly 10. Port assemblies 340 are simpler than port assembles 10 and 200 and are suitable for use where it is intended that the internal space of a cabinet (or other enclosure) being cleaned will be held at a lower pressure than the surroundings of that cabinet enclosure. The low pressure at least limits any escape of particulates from the space 302 through port assemblies 340. Although not shown, it would be possible to provide a seal (for example an O-ring) surrounding opening 330 in either cover 332 or cover 310 to better seal cover 332 against cover 310 when the pressure is lower in the internal space than outside.

Cover 310 is shown as made from a sheet of transparent or at least translucent material, which is advantageous because a user has better visibility of what is happening inside the enclosure being cleaned. Suitable polycarbonate plastics materials can be used, for example, and may be treated with a scratch-resistant treatment as known in the art. Alternatively (not shown) a window (similar to window 88) may be provided, with cover 310 being otherwise non-transparent.

Cover 310 is shown with an outlet port 346 similar to outlet port 18 of FIG. 1(a), for connection of a duct (not shown) to be held at low pressure and receive gas and entrained particulates gas from the enclosure being cleaned.

Figure 24:
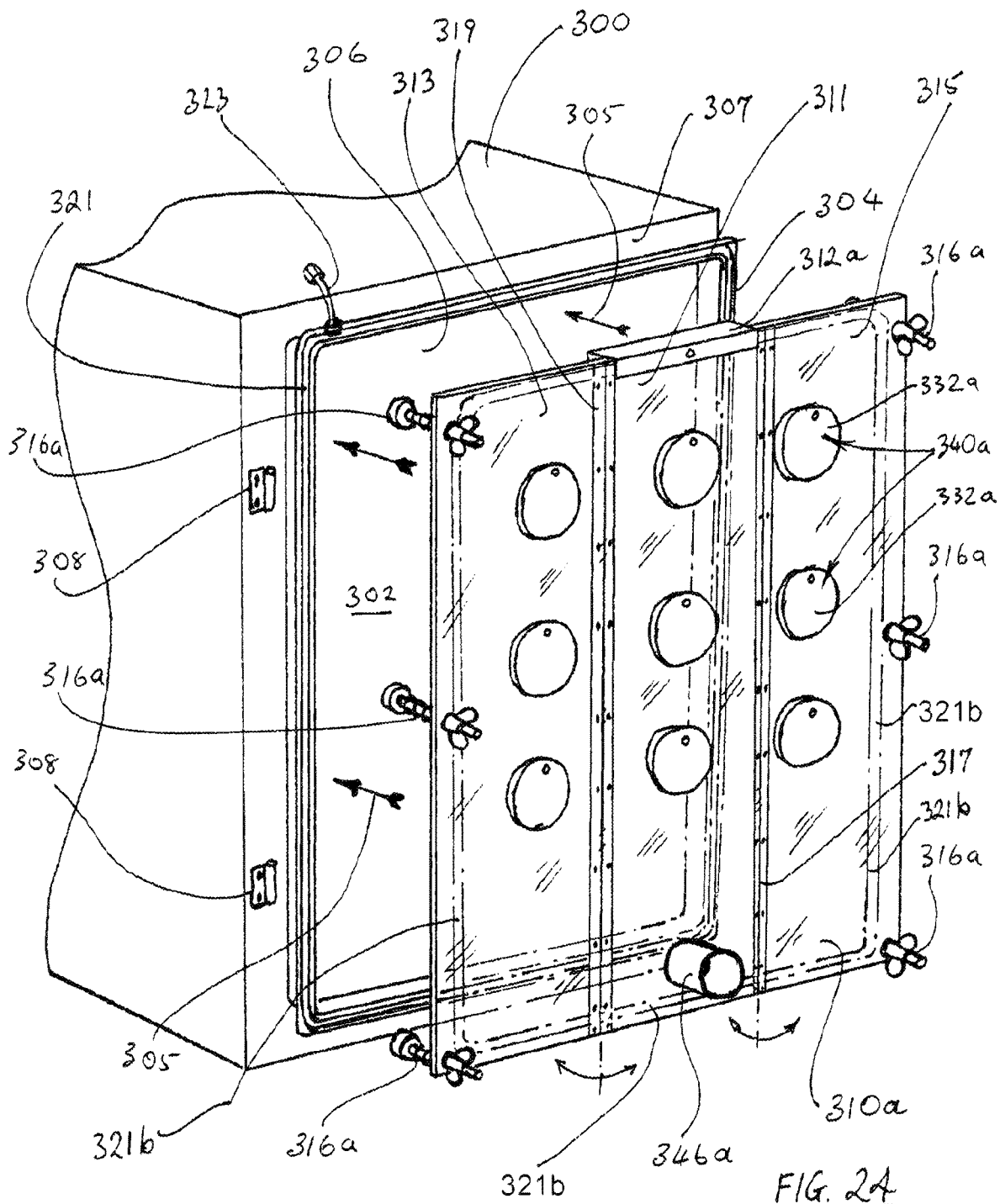
FIG. 24 is a perspective view of a cabinet and a further cover assembly positioned ready to be secured to the cabinet.

FIG. 24 shows a cover 310a that is an alternative version of the cover 310 also positioned ready for securing to cabinet 300. Parts of cover 310a that are, and that function, the same as corresponding parts of cover 310 are indicated by item numbers including the suffix "a" and are not described again here. Cover 310a has several differences from cover 310, as follows. First, cover 310a comprises a central portion 311 and two side portions 313 and 315, that are hinged to central portion 311 by "piano"-type hinges 319 and 317 on the outward-facing side of cover 310a. This enables cover 310a to be folded, so as to be easier than cover 310 for one person to carry. (However, it is to be noted that hinges such as 317 and 319 preferably avoided where folding is not necessary as having no hinge is simpler.) Formation 312a is shorter than formation 312 of cover 310, extending only along a top edge of portion 311, to enable folding. Second, cover 310a has no attached seal corresponding to seal 318 of cover 310. Instead, a seal 321 is secured to, and extends around, flange 304. This may be either a pneumatic seal with an inflating connection 323, as shown, or a non-pneumatic elastomeric seal (not shown). To provide an adequate seal on cover 310a itself instead of flange 304, would be problematic due to the feature of folding. The chain-dotted outline 321b in FIG. 24 does not represent an actual component, but the area on cover 310a that is contacted by seal 321 when cover 310a is secured on cabinet 300. Note: cover 310a is shown with a different number and arrangement of port assemblies 340a from cover 310, but this is simply a matter of choice for any particular application.

While various embodiments of cabinet doors and enclosure covers have been described above, it is to be understood that particular features of any one may where practicable be combined with features of another. For example, LED lighting may be used in any of the designs described above, as may any of the port assemblies 10, 200 or 340 or the "dished" shape of cover 152.

Alternative Embodiments and Applications

Instead of a manually-manipulated and operated cleaning lance 12, some further embodiments provide for mechanical means for moving gas nozzle(s). Examples will now be given.

Figure 20:
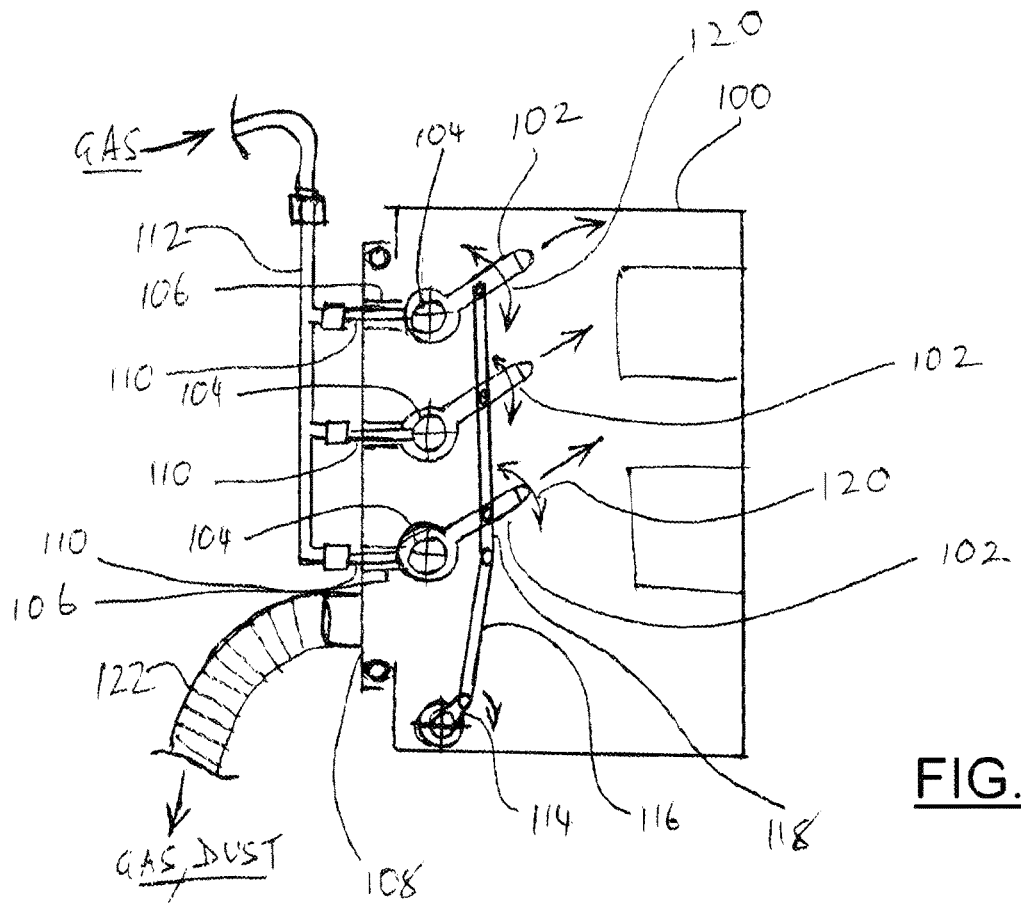
FIG. 20 is a sectional view of an enclosure showing a method of blowing gas according to the invention that is an alternative to that of FIG. 1(*a*)

FIG. 20 shows an enclosure 100 in a view equivalent to FIG. 1(a). Nozzles 102 are mounted to, and able to rotate on, manifolds 104 that are in turn secured by brackets 106 to door 108. Manifolds 104 are supplied with gas from an external source (not shown) via conduits 110 that extend through door 108. Rotating seals (not shown) enable gas to flow from manifolds 104 into nozzles 102 even as nozzles 102 oscillate about manifolds 104. Conduits 106 are connected to an external manifold 112 on door 108. A rotating crank member 114 connects via a link 116 to a link 118 that can oscillate nozzles 102 about manifolds 104 through a range of angles as shown by arrows 120. Crank member 114 extends sealingly to the exterior of enclosure 100 and is rotated manually or by a motor (not shown). Gas with entrained particulates is drawn from enclosure 100 through a duct 122 equivalent to duct 20 of FIG. 2. There are several nozzles 102 on each manifold 104. Alternatively, an "air knife" type nozzle, not shown, elongate along the length of each manifold 104 may be provided instead of nozzles 102.

Figure 21:
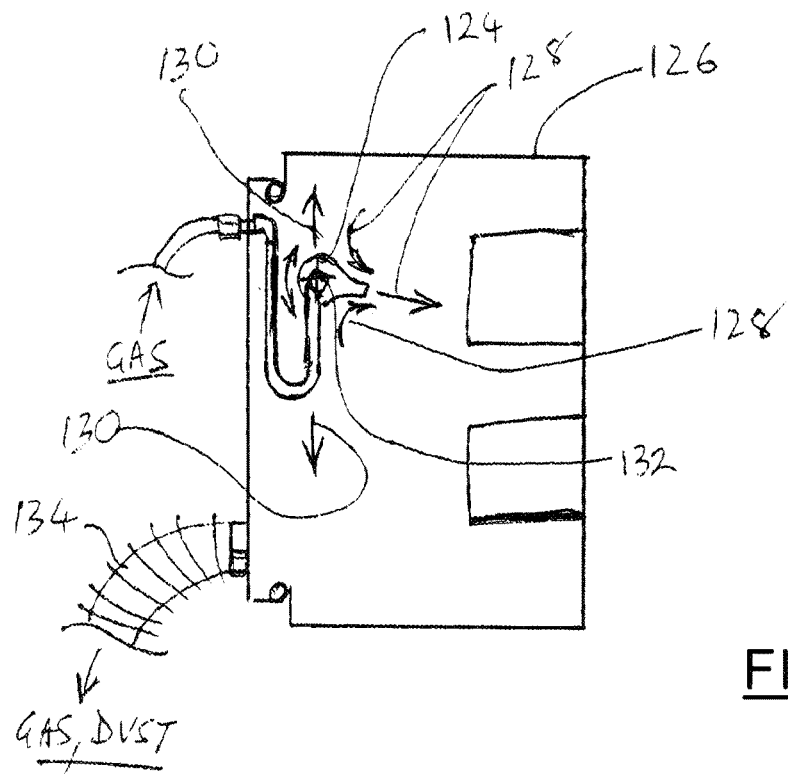
FIG. 21 is a sectional view of an enclosure showing an method of blowing gas according to the invention that is an alternative to that of FIG. 1(*a*)

In a still further alternative shown in FIG. 21, a single "air knife" 124, so-called, that is elongate across the width of an enclosure 126 may be provided and arranged to be fed with gas from an external supply and to produce a flow of the type shown by arrows 128 in FIG. 21, with the air knife 124 being able to traverse up and down (as shown by arrows 130) and to oscillate around an axis 132 extending lengthwise of the air knife 124. A suitable mechanism (not shown) could readily be provided by a person skilled in the art and enable such motions to be provided. Duct 134 extracts gas and entrained particulates from enclosure 126.

In each of the arrangements shown in FIGS. 20 and 21, the system external to the enclosures 100 and 126 is in some embodiments the same as system 30 described above except for absence of cleaning lance 12. In some embodiments, the arrangements shown in FIGS. 20 and 21 are provided with motorized and automatically controlled positioning of the nozzles (102 or air knife 124), such positioning being under the control of microprocessor 200 or a separate microcontroller (not shown). In these embodiments, item 207 in FIG. 3 includes control outputs for any or all of positioning, orienting, movement speed control, and gas flow control for nozzles 102 or air knife 124.

Positioning and orientation of the nozzles 102 or air knife 124, the flow rate of gas through them, and traversing speed may all be controlled by processor 200 to execute a predefined or programmed cleaning scheme input by a user, with instructions stored in a memory (not shown) accessible and executable by the processor 200. In some embodiments, the scheme may be executed repeatedly until a preset acceptable level of particulate concentration is achieved at the gas outlet from the enclosure 100 or 126. In other embodiments, multiple cleaning schemes may be entered with provision for execution of several of them where one only does not lead to acceptable particulate concentration at the outlet.

In some embodiments, a user may enter multiple schemes for different requirements, such as for example a fastest satisfactory clean or a most thorough clean.

Cleaning schemes may include instructions to cause nozzles 102 or air knife 124 to dwell at specific locations and orientations for preset times or until particular outlet particulate levels are achieved. Provision may be made for sudden variations in gas flow through the nozzles 102 or air knife 124.

In some embodiments, processor 200 is adapted to record and store a manually executed cleaning and thereafter execute that scheme whenever cleaning is subsequently required.

In some embodiments, processor 200 executes a randomly or pseudo-randomly selected series of movements and re-orientations of nozzles 102 or air knife 124 until a satisfactory outlet particulate level is achieved. The scheme thus executed may be recorded for future automatic repetition in future under processor 200 control.

In some embodiments, processor 200 may be programmed to automatically execute a number of random or pseudo-random schemes and select the best according to a specified criterion, such as lowest particulate level achieved, or least time to reach a specified outlet particulate level. It is further possible to provide for machine learning, by providing for replacement in memory of a previously stored cleaning scheme by one recorded (for example when manually executed by a user or in additional random or pseudo-random cleaning schemes) that achieves an improved result.

An embodiment will now be described that provides for cleaning of an open-top rail car (for example of the type used for transport of coal or other minerals) or the like, and that involves essentially the same principle as the embodiments described above. A problem with such rail cars is excessive particulates remaining in the car after emptying, these particulates later being disturbed when the empty car is in motion and so polluting the environment.

Figure 22:
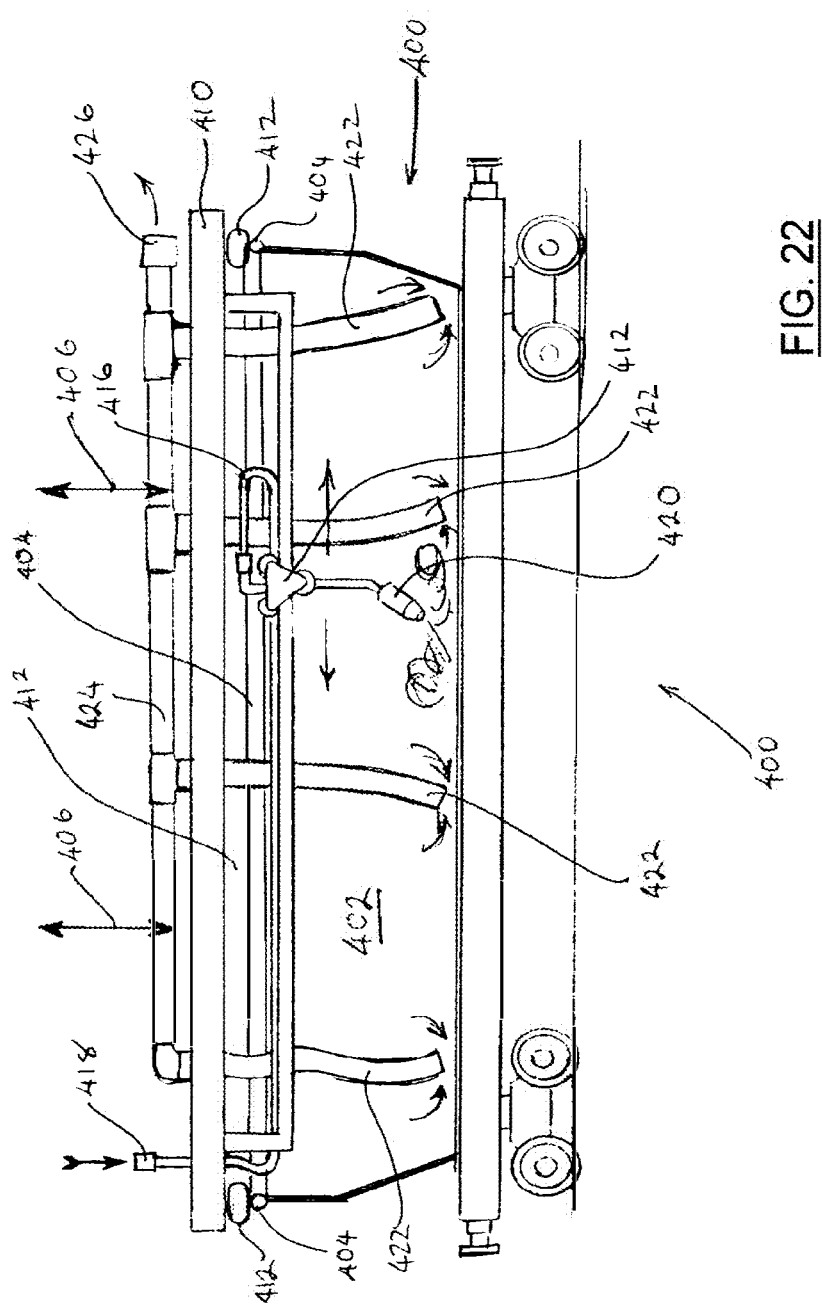
FIG. 22 is a side view of an open-topped railcar (whose upper section is shown in longitudinal cross-section) and a cleaning apparatus according to a further aspect of the invention.

FIG. 22 shows a typical open top rail car 400 whose upper part, comprising a load containing space 402, is shown in longitudinal section. A tubular-section rail 404 extends around the top of the rail car. At a location where the car 400 is to be cleaned, a platform-like cover 410 is provided that when cleaning is to be carried out can be positioned over car 400 and lowered (in the direction of arrows 406) onto the rail 404 from above, whereby to close space 402. An elastomeric seal 412 contacts rail 404 after such lowering.

A carriage 412 moves lengthwise of the car 400 on a rail 414 (propelled for example by an air motor (not shown)) and has mounted thereon one or more nozzles 420 for blasting internal surfaces of space 402 with air (or other gas) supplied through a hose 416 and gas inlet 418.

To remove air (or gas) and entrained particulates from space 402, one or more ducts 422, of which four are shown, are provided on the underside of platform 410 and extend downward into space 402. Ducts 422 communicate with a manifold 424 from which air (or gas) and entrained particulates are drawn at 426 by a vacuum source (not shown). Internal space 402 may be kept during cleaning at a pressure below atmospheric.

When cleaning is complete, cover 410 is lifted upward to clear rail car 400. The arrangement shown in FIG. 22 may be used in a building (not shown) with ends through which cars 400 (or other vehicles where applicable) are sequentially driven with lifting of platform 410 effected by a fixed lifting equipment in the building. Alternatively, a truck or specialized vehicle (not shown) with a pivoted or articulated arm may be used to manipulate platform 400 and associated equipment as required for cleaning.

Figure 25:
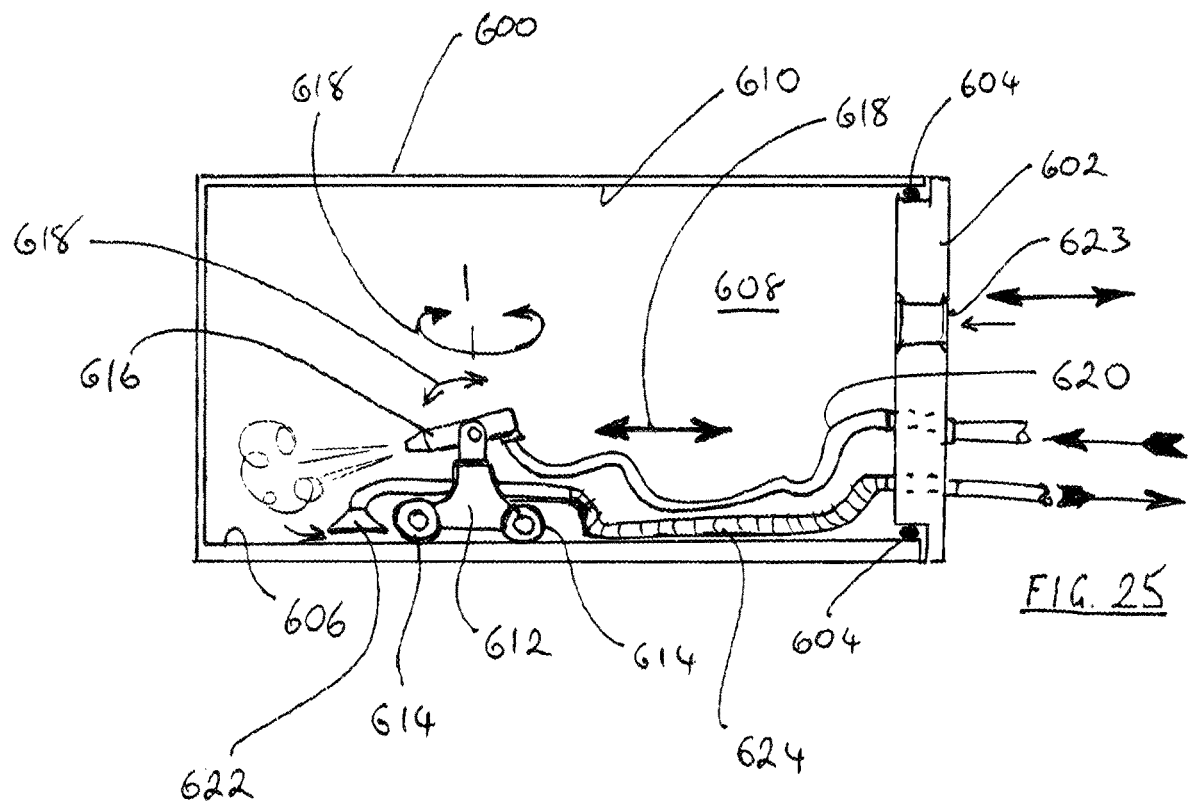
FIG. 25 is a longitudinal central section of a shipping container (with some detail omitted) fitted with particulate removing equipment.
Figure 26:
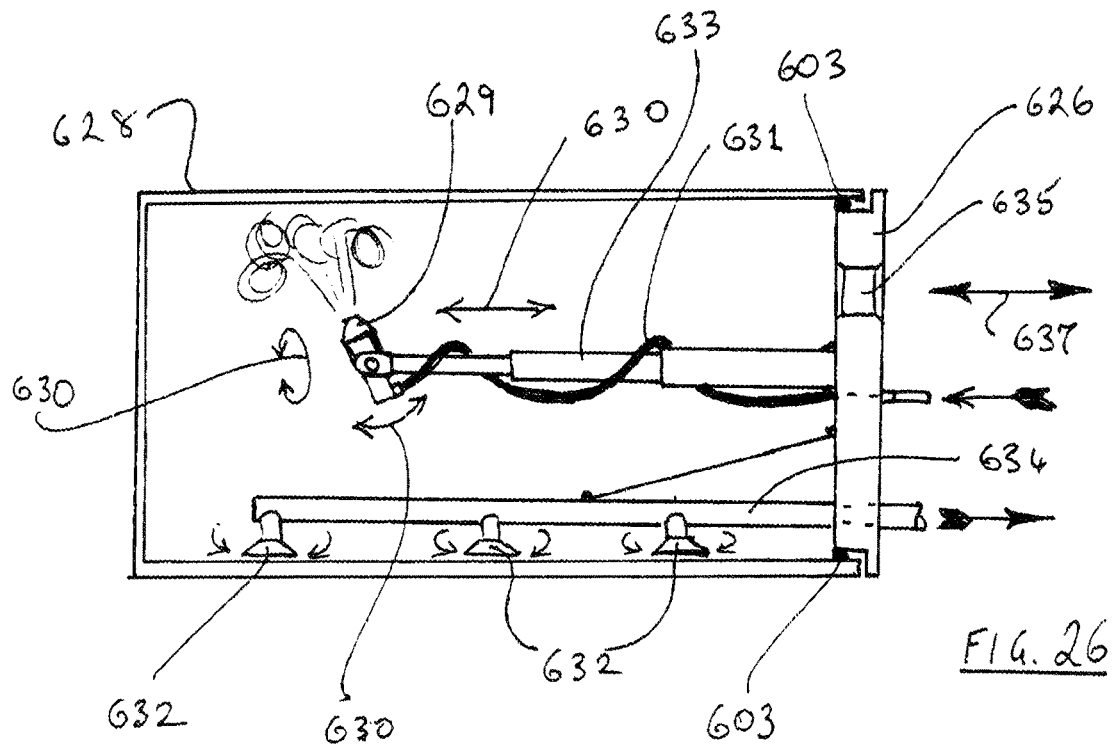
FIG. 26 is a longitudinal central section (equivalent to FIG. 25) of a shipping container (with some detail omitted) fitted with alternative particulate removing equipment.

Other types of container or enclosure are not open-topped but rather open at an end. As an example, FIGS. 25 and 26 are longitudinal central sections on standard shipping containers. (Some detail of these containers has been omitted, including doors.)

In FIG. 25, container 600 is closed by a cover 602 that fits into its open end when the outward-opening doors (not shown) are opened. Cover 602 is sealed against gas and particulate movement by a peripheral seal 604 that extends wholly around cover 602 and seals against inner surfaces (floor 606, walls 608 and ceiling 610) of the container 600. Seal 604 may be a pneumatically inflated seal. Sealing is not against end surfaces of container 600 because of the presence thereon of latch fittings (not shown). In container 600 is a support carriage 612 movable under user remote control on wheels 614, and that has a gas nozzle 616 that can be remotely controlled by a user, outside container 600, to move in a range of ways, as indicated by arrows 618. Gas is supplied to nozzle 616 by a conduit 620 (including a hose portion) connected through cover 602 to a gas source (not shown) so that a jet of the gas can be used to dislodge and entrain particulates. Carriage 612 is also fitted with at least one inlet 622 for gas and entrained particulates, that in turn is connected via a flexible outlet duct 624 to a system (not shown) equivalent in function to system 30 of FIG. 2. A window 623 is provided in cover 602 so that the user (not shown) can see and guide the carriage 612 as required until the monitored concentration of particulates leaving the container 600 is sufficiently low. Suitable lifting and manipulation equipment (not shown) is provided for positioning carriage 612 and then cover 602 for use, and for subsequently removing them from container 600.

FIG. 26 shows an alternative arrangement in which a cover 626 is fitted into an end of a shipping container 628 in essentially the same way as cover 602 is fitted to container 600. A pneumatic or other suitable seal 603 equivalent to seal 604 is provided to prevent escape of gas and particulates around the periphery of cover 626. A nozzle 629 directs a jet of gas to dislodge and entrain particulates in the same way as nozzle 616 and is movable under user remote control in a range of ways as indicated by arrows 630. A gas supply (not shown) external to cover 626 is provided and supplies nozzle 629 through a hose 631. Nozzle 629 is supported in this embodiment by a structure 633 secured to cover 626. This is shown as a multi-section telescopic arm, but other arrangements will readily suggest themselves to persons skilled in the art. Exhaust inlets 632 are provided on a structure 634 that is also secured to cover 626 and that incorporates outlet ducting for gas and entrained particulates. A window 635 is provided in cover 626 for a user outside container 628. Not shown in FIG. 26 is a system equivalent in function to system 30. Suitable manipulating equipment (not shown) is provided to enable cover 626 and the components secured to it to be entered longitudinally (i.e. in the direction of arrow 637) into container 628 and later removed.

Although standard shipping containers have been referred to in relation to FIGS. 25 and 26, other types of enclosures could be suitable for similar arrangements. For example, some road vehicles (not shown) have enclosures with end doors, and the arrangements shown in FIGS. 25 and 26 could apply to them.

Figure 27:
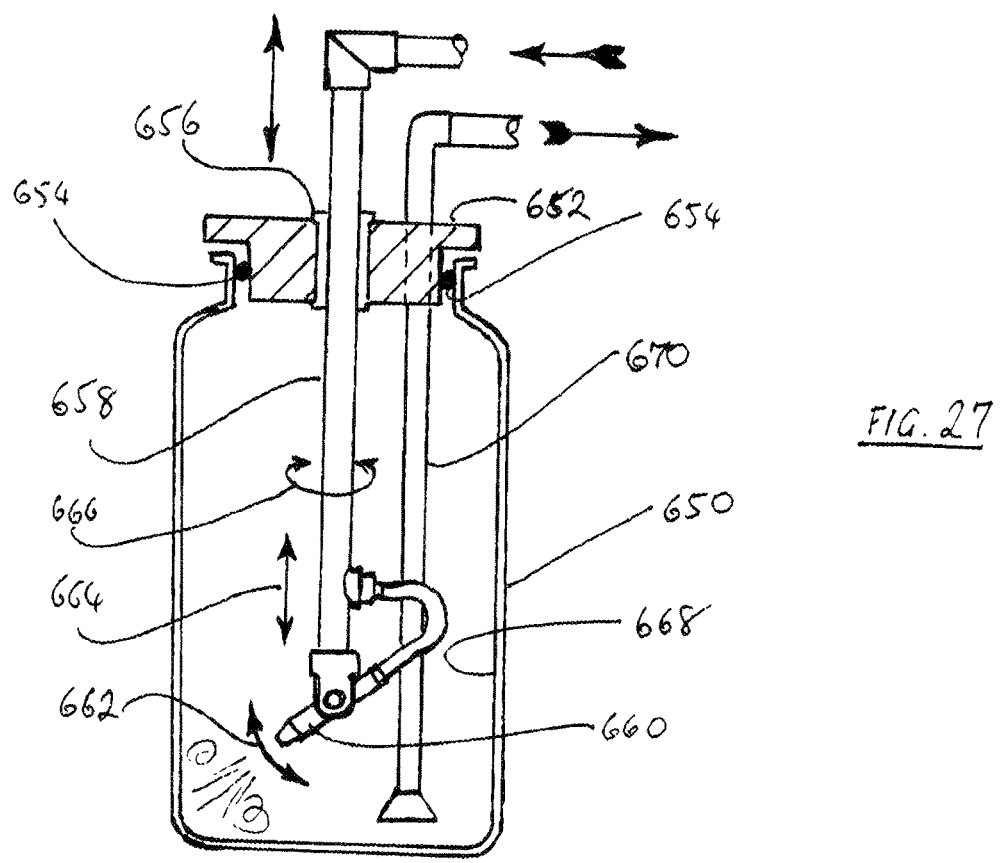
FIG. 27 is a longitudinal central section of a barrel-type container fitted with apparatus for removing particulate matter.

FIG. 27 shows a still further application similar to that described above by reference to FIG. 26. A container 650 (such as for example a plastics barrel of the type used for solid-phase chemicals) is temporarily closed by a cover 652 that is sealed to the container 650 by a suitable peripheral seal 654 (pneumatic or otherwise). Cover 652 has a gland 656 through which there passes sealingly a gas inlet duct 658 through which an external gas source (not shown) supplies gas to a nozzle 660 within container 650. Nozzle 660 is able to be moved angularly as shown by arrow 662, and the duct 658 is able to be both traversed up and down (as drawn) and rotated as shown by arrows 664 and 666 respectively. The movements of the nozzle 660 and duct 658 are controlled either by an automatic mechanism (not shown) or manually by a user whereby a jet of gas from nozzle 660 can be directed over the entire internal inner surface 668 of container 650. Also extending through the cover 652 into container 650 is an outlet duct 670 through which gas and entrained particulates are drawn out. Also provided is a system (not shown) equivalent to system 30, for providing gas to duct 658 and drawing out, treating and monitoring gas and articulates flowing through duct 670.

Figure 23:
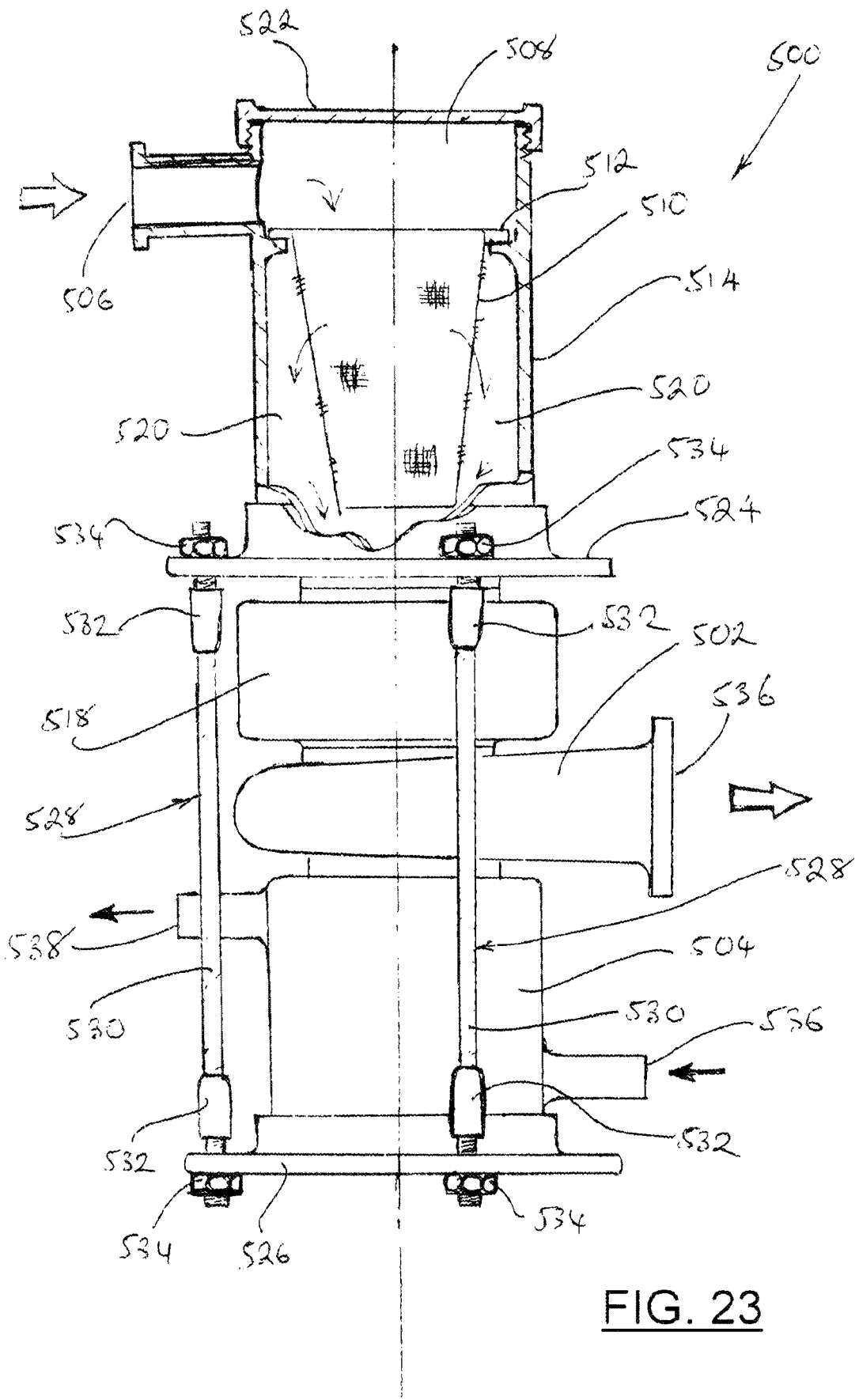
FIG. 23 is a side view, with one portion shown in section, of an assembly of components of the system shown in FIG. 2.

FIG. 23 shows an assembly 500 usable in some embodiments of the system 30 shown in FIG. 2, specifically comprising elements 40, 42 and 46. Assembly 500 comprises a firstly centrifugal fan (blower) 502 corresponding to blower 46 in system 30. Fan 502 is coupled to and driven by a shaft (not visible) of an electric motor 504. Gas enters assembly 500 through an inlet port 506 after leaving cyclone separator 38 and so contains less particulates than at outlet 18. From inlet port 506 the gas enters a plenum chamber 508 and then passes through a filter bag 510 that is supported by a ring 512 at its upper end in a cylindrical casing 514 which is shown partially sectioned. Filter bag 510 corresponds to filter 40 of system 30 and may comprise a woven textile or unwoven material (as known in the filter art) suitable for catching particulates while the gas passes through it and into an outer space 520 of casing 514. From space 520, the gas then enters a modular HEPA filter 518 (corresponding to element 42 in FIG. 2)), thereafter passing into fan 502 and out through outlet 536 (corresponding to outlet 53 of system 30). Casing 514 may advantageously be formed from a transparent plastics material so that any fouling of space 520 by particulates becomes apparent to a user.

Removal of filter bag 510 for emptying or disposal can be effected through a lid 522 at the top (as drawn) of the plenum chamber 508. Bag 510 is preferably of conical shape and proportioned to at least approximately equalize along its length the flux of gas through its surface.

To hold the parts of assembly 500 together securely and sealingly against gas and particulates leakage and enable easy disassembly when required, casing 514 is fitted with a flanged ring 524 and a base plate or ring 526 is provided at an end of motor 504. Spaced circumferentially around and extending between and through ring 524 and plate (or ring) 526 are several (for example three) tension members 528 which once placed in tension hold together the fan 502 and motor 504, HEPA filter 518, and casing 514. Members 528 may be for example solid rods threaded at each end for nuts or (as shown) lengths 530 of wire rope with threaded end fittings 532 swaged on at each end and secured by nuts 534.

Motor 504 has its own integral air pump (not shown) for cooling with inlet 536 and outlet 538 separate from the gas flow circuit of system 30.

Assembly 500 is convenient for some embodiments and applications, including where components of system 30 are provided in a backpack (not shown).

Further Cover Assembly Embodiments

Yet another cover 310c, shown in FIG. 29 and similar to cover 310a (shown in FIG. 24) will now be described. Cover 310c has a number of features that differ from features present in cover 310a. Parts of cover 310c that are, and that function in essentially the same as corresponding parts of cover 310a are indicated in FIG. 29 by item numbers that are the same as those corresponding parts with an added suffix "c" so as to not need further explanation. Thus, for example, items 312ac in FIG. 29 do for cover 310c what items 312a do for cover 310a, namely allow cover 310c to be hooked over an upper part of a flange of a cabinet (not shown).

Instead of being made in three panels 313, 315 and 311 connected by two hinges, cover 310c has two panels 802 and 804 connected by a single hinge 806. (Of course, hinge 806 may be omitted altogether where foldability is not required.) Panels 802 and 804 are flat and may be of a suitable translucent or transparent sheet plastics material. Port assemblies 340ac are provided, but in different locations from the port assemblies 340a of cover 310a that facilitate folding of the two panels 802 and 804 flat against each other when cover 310c is not in use. Not shown, but another possibility, is to provide port assemblies 340ac in locations tailored to allow best access to items (not shown) in enclosures on which cover 310c will in use be deployed.

FIG. 30 shows a particular port assembly 808, comprising a cover portion 810 that threadably engages with a collar 812 secured gas-sealingly to panel 802. Cover portion 810 can be screwed into or out of collar 812 as required using handle formations 816 and has an opening 814 that allows a lance (such as lance 12) to be pushed into an enclosure (not shown) on which cover 310c is secured. The other port assemblies 340ac have collars (not shown) the same as collars 812 and cover portions 818 the same as cover portion 810 except that no opening corresponding to opening 814 is provided. These cover portions 818 have annular elastomeric seals (not shown) the same as seal 820 of cover portion 810.

Instead of a single port for extraction of gas (like port 346a of cover 310a) cover 310c has two ports 821 and 822 that are in fluid communication with chambers 823 and 824 on the sides of panels 802 and 804 respectively that in use of cover 310c lie in the opening of an enclosure (not shown) to be cleaned. Chambers 823 and 824 have internal spaces 825 and 826 respectively. (Chambers 823 and 824 are shown in FIG. 29 as they would be seen through transparent panels 802 and 804.)

Figure 31:
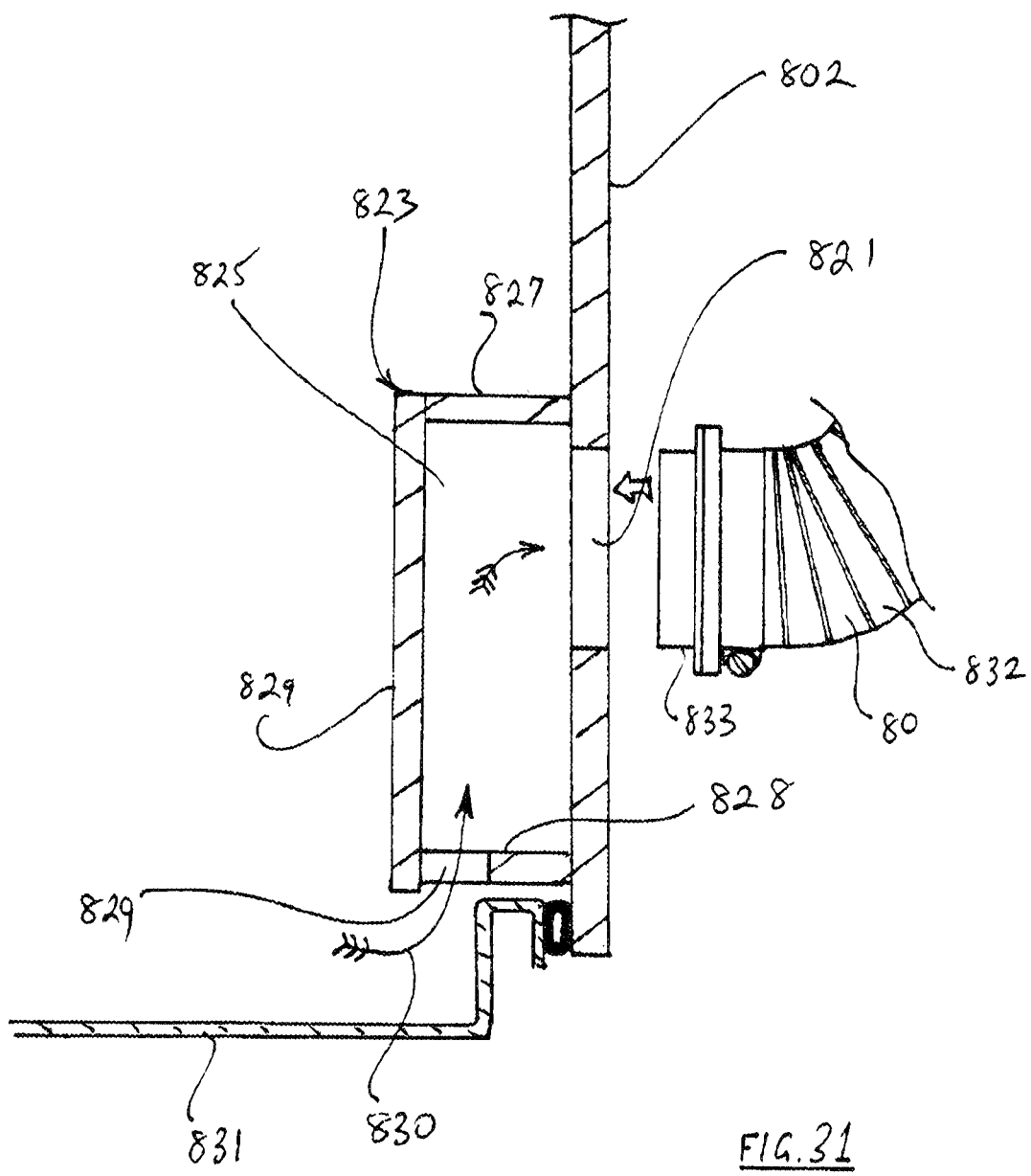
FIG. 31 is a partial cross-section taken at station "31-31" in FIG. 29.

Chamber 823 (the same as chamber 823) is shown in section in FIG. 31. Space 825 is defined by walls 827, 828 and 829. Wall 828 has elongate slots 829, so that entry of gas and entrained matter is through multiple slots 829 as shown by arrow 830. This arrangement provides for better removal of entrained matter than a single position port such as 346a. Item 831 is a portion of an enclosure to which cover 310c could be secured for use. Flexible duct 832 (corresponding to duct 20 of FIG. 1) is shown in FIG. 31 as positionable sealingly by an end fitting 833 enterable into port 821. Because there are tow ports 821 and 822, two such ducts are required and may be joined into a single flexible duct (not shown) by a suitable fitting. The essential here is that gas and entrained particulate matter can be collected at multiple points with an enclosure being cleaned.

Still further arrangements for effective removal of gas and entrained particulates will readily suggest themselves to persons skilled in the art.

Figure 32:
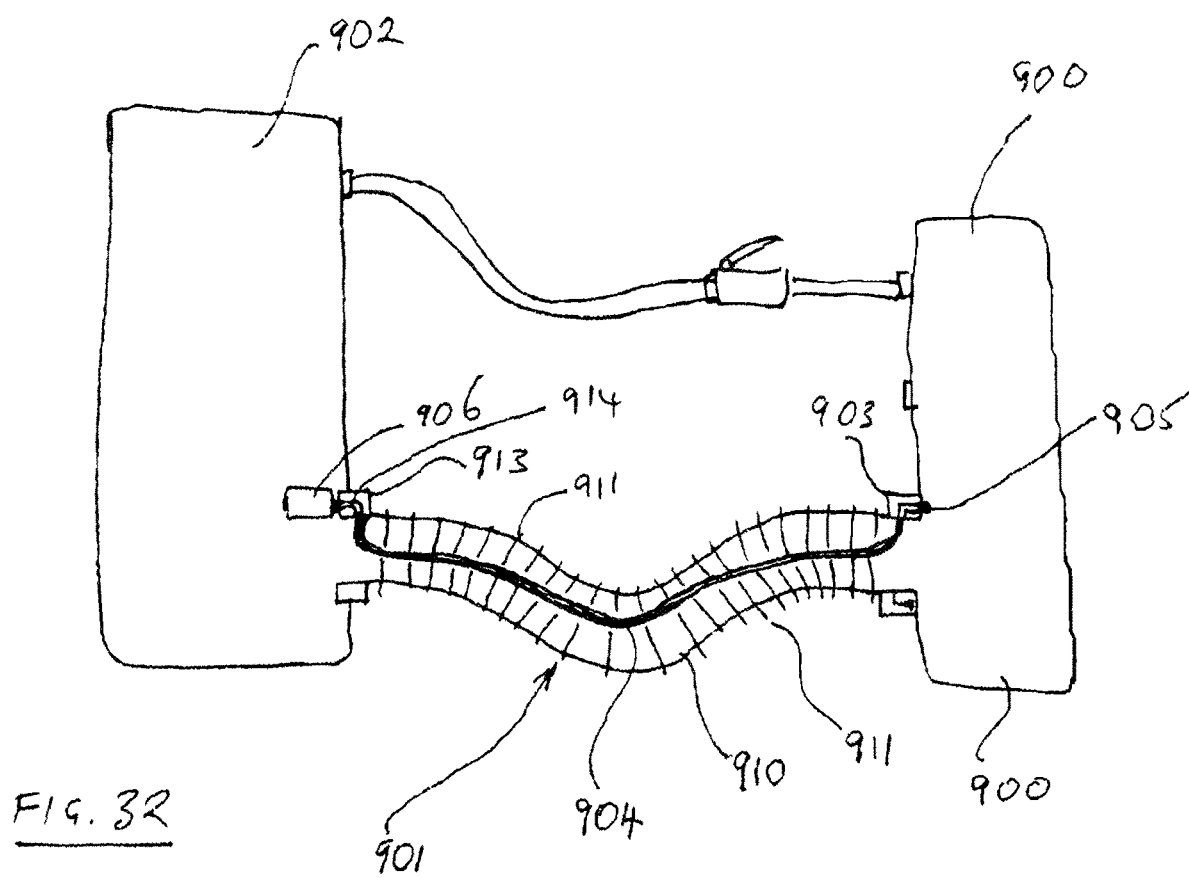
FIG. 32 is a schematic view of an enclosure of components of the invention and an enclosure being cleaned, these two enclosures being connected by a duct through which gas and particulate matter is withdrawn from the enclosure being cleaned. The duct is shown in section.
Figure 33:
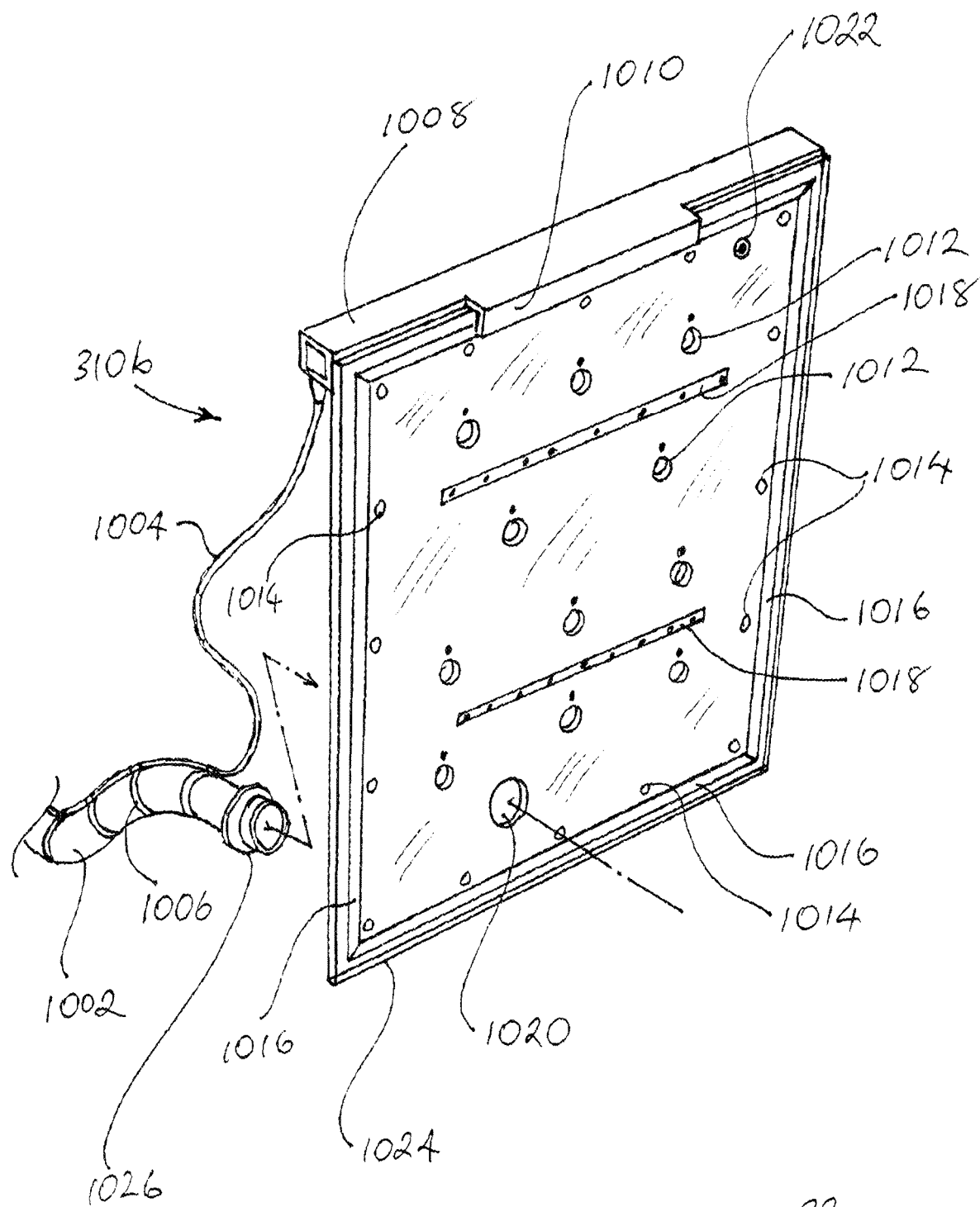
FIG. 33 is a perspective view of yet another cover assembly according to the invention.

Referring to FIG. 2, in practical realisations of the invention, many, most or all of the sensors provided may be in an enclosure that is separate from the enclosure being cleaned and connected to the latter by the conduits 34 and 20. However, the measurement of pressure within the enclosure being cleaned is particularly important and sensing of that pressure may be done at a point within the enclosure being cleaned. As an alternative to a sensor at a station such as station C (FIG. 2) with an electrical connection for its output to an enclosure containing the other components left of station "XX" in FIG. 2, it is possible instead to provide an orifice opening into the enclosure being cleaned and in fluid communication through a flexible tube with a sensor (pressure transducer) located in the enclosure containing those other components. FIGS. 32 and 33 show two ways to do this.

FIG. 32 shows an enclosure 900 being cleaned, with a duct 901 (corresponding to duct 20 of FIG. 2) connecting the interior of enclosure 900 to an enclosure 902 containing the components shown to the left of station "XX" in FIG. 2. Duct 901 is of the known type having a flexible tube 910 held open by a spiral formation 911 such as a wire.

A small-diameter tube 904 enabling an orifice 905 open to the interior of the enclosure 900 to connect to a sensor 906 in enclosure 902 may conveniently be provided inside the flexible duct 901, with the tube 904 terminating in the orifice 905 in a fitting 903 by which the duct 901 is secured to the enclosure 900. At its other end, tube 904 terminates at a fitting 913 with a passage 914 in fluid communication with a pressure transducer 906 in enclosure 902.

Another possibility is to eliminate tube 904 and provide instead that the duct 901 is again of the type having a flexible tube 910 held open by a spiral formation 911, but in which that spiral formation is itself hollow along its length, so as to be in effect a small-diameter tube. The orifice 905, in fitting 903, is in this case in fluid communication with the hollow interior (not shown) of the spiral formation 911. At the other end of the duct 901, the spiral formation 911 and its interior (lumen) is in fluid communication via passage 914 in fitting 913 with the pressure sensor 906 in enclosure 902.

In each of these two arrangements, it is appropriate to provide at the orifice that opens into enclosure 900 a plug or cover, for example of sintered metal, (not shown) adapted to prevent clogging of the orifice, which could adversely affect the pressure measurement.

Further Embodiments—Cover Assemblies

To disclose yet further additional options for covers according to the invention, FIG. 33 shows a cover 310b that is an alternative to covers 310, 310a, and 310c. Cover 310b comprises a single transparent plastics panel 1024 shaped and proportioned to fit over an opening into an internal space of an enclosure (not shown). Cover 310b is provided with multiple ports 1012 of the type shown in FIGS. 18 and 19, located specifically in positions that provide optimal access for a cleaning lance such as lance 12. There is also a port 1020 that in use of the cover 310b receives an end fitting 1026 of an outlet conduit 1002 for gas and entrained particulate matter that corresponds in function to conduit 20 of FIG. 2.

Banks 1018 of light emitting diodes (LEDs) are provided on the internal-space-facing face of panel 1024 for internal lighting of the internal space. The LEDs are protected by transparent or translucent elongate covers glued or otherwise secured to panel 1024. Extending around the periphery of panel 1024 is a seal 1016 that in use of cover 310b lies between panel 1024 and a facing part of the enclosure being cleaned. Seal 1016 may be formed from rubber or a rubber-like material or other material (for example felt) to provide at least some degree of sealing against gas and particulate leakage as cover 310b is pushed against the enclosure by the difference between atmospheric pressure and the partial vacuum maintained in the enclosure. Perfect sealing is not essential where there is a p[atrial vacuum in the enclosure.

Two additional provisions are made for holding the cover 310b in place. First, magnets 1014 are secured in recesses in panel 1024 and pull panel 1024 toward the enclosure (if it is ferromagnetic). Second, a formation 1010 is provided whereby the cover 310b can be hooked onto an upper edge of a flange (not shown) on the enclosure, in the same way as described for covers 310 and 310c.

Two forms of sensor are provided on cover 310b. First, a pressure sensor 1022 is provided for sensing pressure inside the enclosure, having a pressure-sensitive diaphragm or surface (as opposed to a small hole leading to such diaphragm or surface) so as to be immune from clogging with particulate matter. Second, at each port 1012 there is provided a sensor (not shown) that indicates whether the port is "open" (i.e. in use to accommodate a cleaning lance such as lance 12) or closed. The sensor may be of any suitable type for example a microswitch or Hall effect proximity sensor actuated by a movable portion of the port assembly, such as movable covers 332 of port assemblies 340).

The functionality of instrumentation and control system 199 of FIG. 3 may be expanded to include sensing of the state of ports 1012 during a cleaning session, to provide to supervisors and/or others (including in reports of the cleaning process generated by the system) an indication of how the operation was carried out, for example, whether all of ports 1012 were used at some point, and for how long. Moreover, it is possible to provide through system 199 a defined sequence to be followed in cleaning a particular enclosure and to display prompts to an operative as to that sequence at block 208.

To direct power to the sensors and LED banks 1018 and to allow transmission of their outputs to other parts of the system a connecting cable 1004 is provided that is secured (at 1006) by tape, suitable clips or the like to duct 1002. Necessary electronics, signal conditioning for the sensors and power connections (not shown) are protected in a housing 1008 secured to panel 1024, at which an end of cable 1004 terminates. Note that with suitable end fittings for outlet conduit 1002, it is possible to run cable 1004 inside conduit 1002, thus reducing the risk of damage to cable 1004.

As an alternative to cable 1004, it is possible to provide for signals from the sensors on cover 310b to be transmitted to the rest of the system by a short-range wireless connection for example using the "Bluetooth" or "Bluetooth Low Energy" or other suitable protocol. In this case, housing 1008 may contain a battery for supplying power to the sensors as required and to the LED banks 1018. Note that as a further alternative, the functions of housing 1008, pressure sensor 1022 may be provided in a housing secured temporarily or even permanently to the enclosure to be cleaned.

Note also that in embodiments where the pressure sensor for internal space pressure is to be located elsewhere in the system and connected to a tapping in a cover such as 310, 310b or 310c, a flexible tube can be provided terminating at a tapping in the cover and secured along duct 1002 as shown in FIG. 33, although such embodiments are not preferred.

Outlet conduit 1002 (or other outlet conduits described herein) that correspond to outlet conduit 20 of FIG. 2 are preferred to have smooth inner wall surfaces to avoid fouling with particulate material. Thus wire reinforced hose having a non-smooth inner surface is less preferred than hose with a smooth inner wall surface.

Exemplary Embodiment—Backpack

Figure 34:
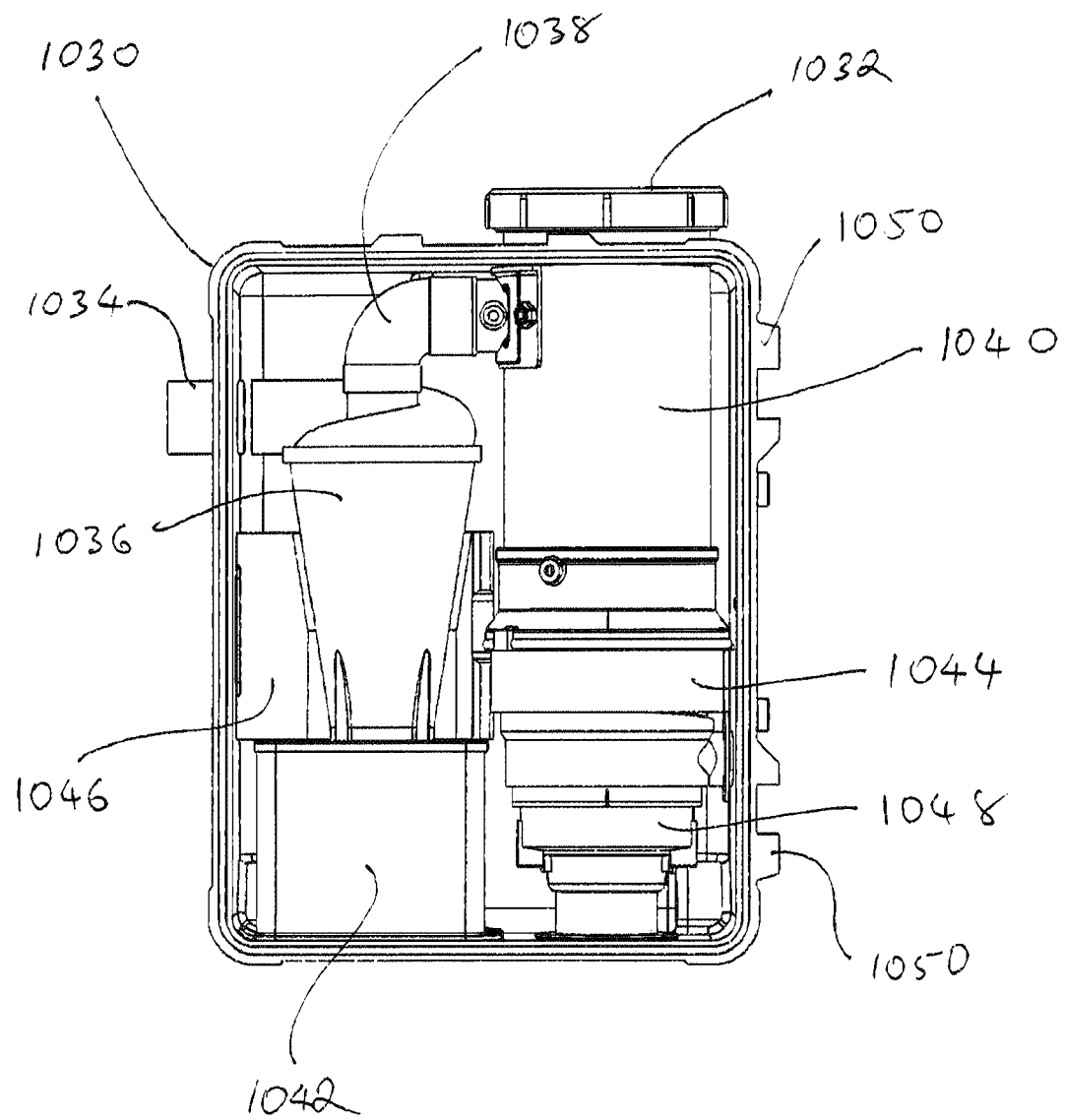
FIG. 34 is an elevation of a portion of a prototype system according to the invention.

A prototype system 999 according to the invention has been developed and has proved satisfactory for cleaning electrical component cabinets on large surface mining haul trucks. The system uses a conventional reticulated workshop air supply as its gas source (item 32 of FIG. 2) and the other components to the left of station "XX" in FIG. 2 (excluding selector 50 which was not included) and were able to be accommodated in a suitcase-sized plastics casing 1030 suitable for carrying as a backpack or otherwise reasonably portable. FIG. 34 is an elevation showing how the major components (only) of system 999 were able to be accommodated in the casing 1030. Casing 1030 is shown without its lid, which is hinged at moulded fittings 1050. Note that system 999 comprises casing 1030, the equipment within it as shown in FIG. 34, a cleaning lance (for example lance 12 or one of the others lances 1160 or 2600 described herein), and all associated ducting.

A cyclone corresponding to cyclone 38 of FIG. 2 is shown at 1036, with its inlet for gas and particulates drawn from enclosures shown at 1034. Item 1042 is a container inside which is a receptacle (not shown) for collection of particulates received from the cyclone at 1036, the receptacle being emptiable when an ultrasonic transducer pair (sender and receiver, not shown) provides a signal indicating it is full.

At 1038 is a duct from the cyclone at 1036 leading to a cylindrical casing 1040 containing firstly a disposable paper bag-type filter (not shown in FIG. 34) receiving gas and unremoved particulates from the duct at 1038, and secondly a HEPA filter downstream of the paper-bag-type filter. At 1032 is a screw cap for accessing the interior of casing 1040 for removal and replacement of the paper-bag filter and removal and servicing of the HEPA filter.

The source of vacuum for drawing gas and particulates through the system is shown at 1044 (casing for a centrifugal or blower fan (not visible) and 1048 (motor for the fan). Gas leaves the system via a muffler 1046 via a port (not visible) at the left side of the casing 1030.

Not shown in FIG. 34 are triboelectric sensors for sensing particulate concentration at locations corresponding to stations F and K of FIG. 2. Electronics componentry (not shown) is housed in the lid (not shown) of the casing 1030. Pressure transducers for locations corresponding to stations C, F, G, H and I of FIG. 2 are mounted on a printed circuit board in the lid and connected to those locations by small-bore flexible plastics tubes.

Also housed in the lid is a relay-operated valve corresponding to item 52 of FIG. 2 for controlling gas supply to the lance (not shown), and in particular shutting off that supply if pressure in the enclosure being cleaned rises to become too close to pressure in the surroundings (i.e. if there is a risk of loss of partial vacuum in the enclosure being cleaned).

Figure 35:
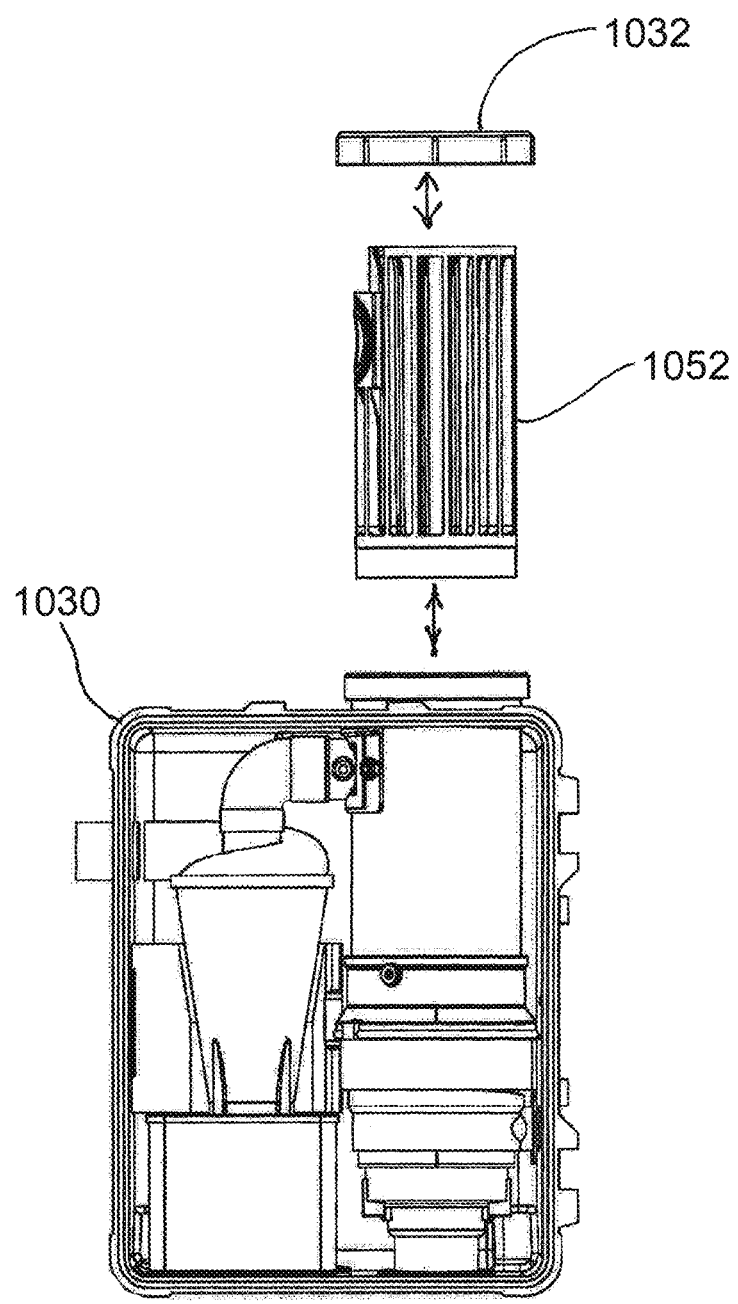
FIG. 35 is an exploded view of the prototype portion shown in FIG. 34, now with a filter holder and screw cap removed as if for emptying of filter bag.
Figure 37:
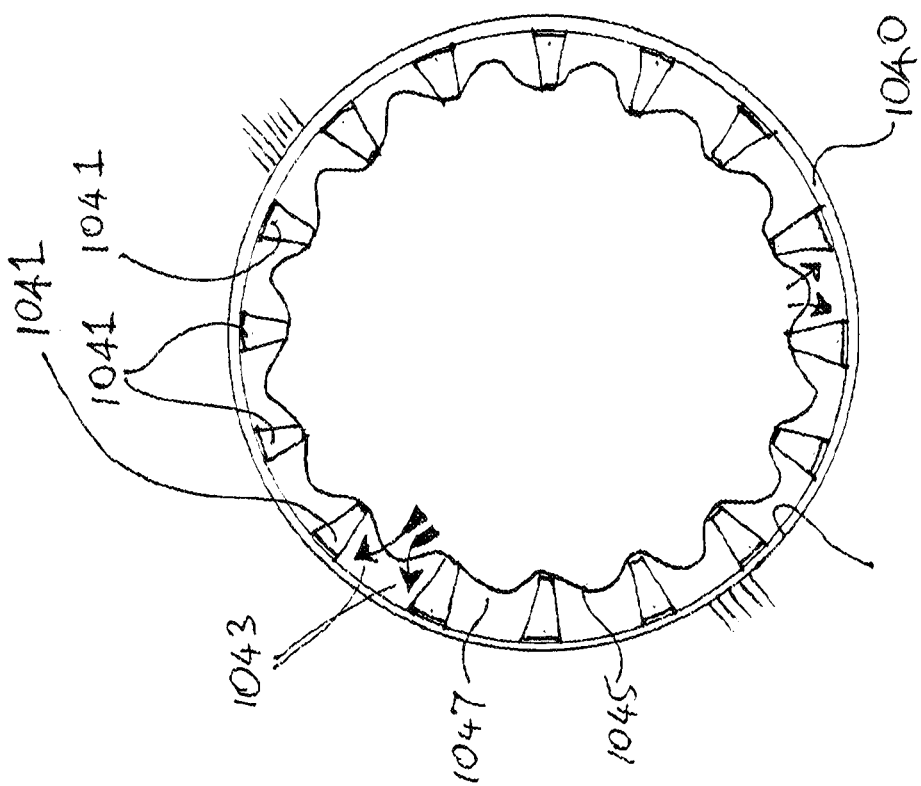
FIG. 37 is a transverse sectional view of the holder of FIG. 36 in use with a contained filter bag, the section being taken at station "A" of FIG. 36.
Figure 36:
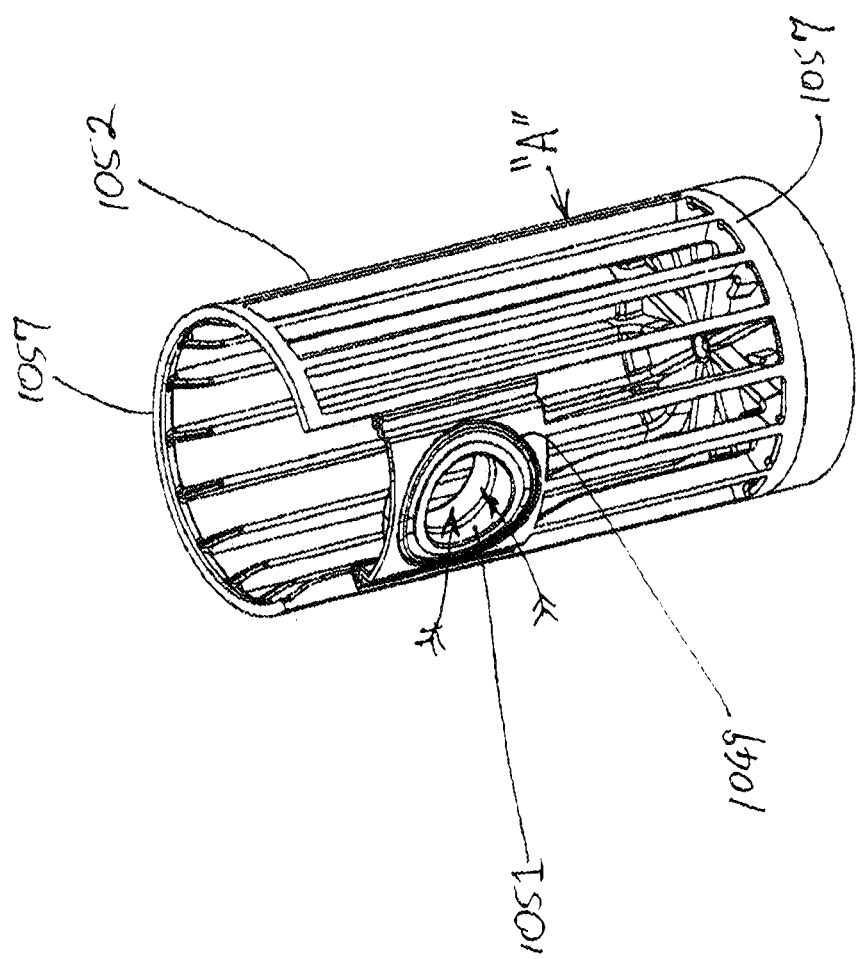
FIG. 36 is a perspective view of an elongate filter bag holder for use in the invention.

FIG. 35 shows the casing 1030 in the same elevation as FIG. 34 but now with screw cap 1032 removed and a filter bag holder 1052 removed from casing 1040 as is required for emptying. Bag holder 1052 (shown in FIG. 36) comprises a plastics moulding in which vertical bars 1041 are arranged in a circle supported by circular parts 1057. No filter bag is shown in FIG. 36, for clarity. As can be seen in the sectional view of FIG. 37, bars 1041 lie adjacent to the wall of casing 1040 when holder 1052 is placed in casing 1040. Filter bag 1045 is held away from the wall of casing 1040 by bars 1041 when, in use, there is gas under pressure in bag 1045. This ensures that between each pair of adjacent bars 1041 there is a space 1047 into which and down which gas passing through bag 1045 can pass as shown by arrows 1043. Holding the bag away from casing 1040 in this way ensures that a large portion of the bag's surface is available for catching particulate material entrained in the gas in the bag 1045. Item 1059 defines a space above the HEPA filter (not shown) so that its whole cross-sectional area is used.

The filter bag used in holder 1052 in the prototype is a commercially available porous paper filter bag having a circular opening. Gas and particulates enter the bag through a short duct 1051 that is separate from holder 1052 but is received therein as shown. A seal 1049 is provided on duct 1051 that when the bag is placed in holder 1052 seals against the inner wall of casing 1040.

Additional Embodiments—Lighting

Figure 38:
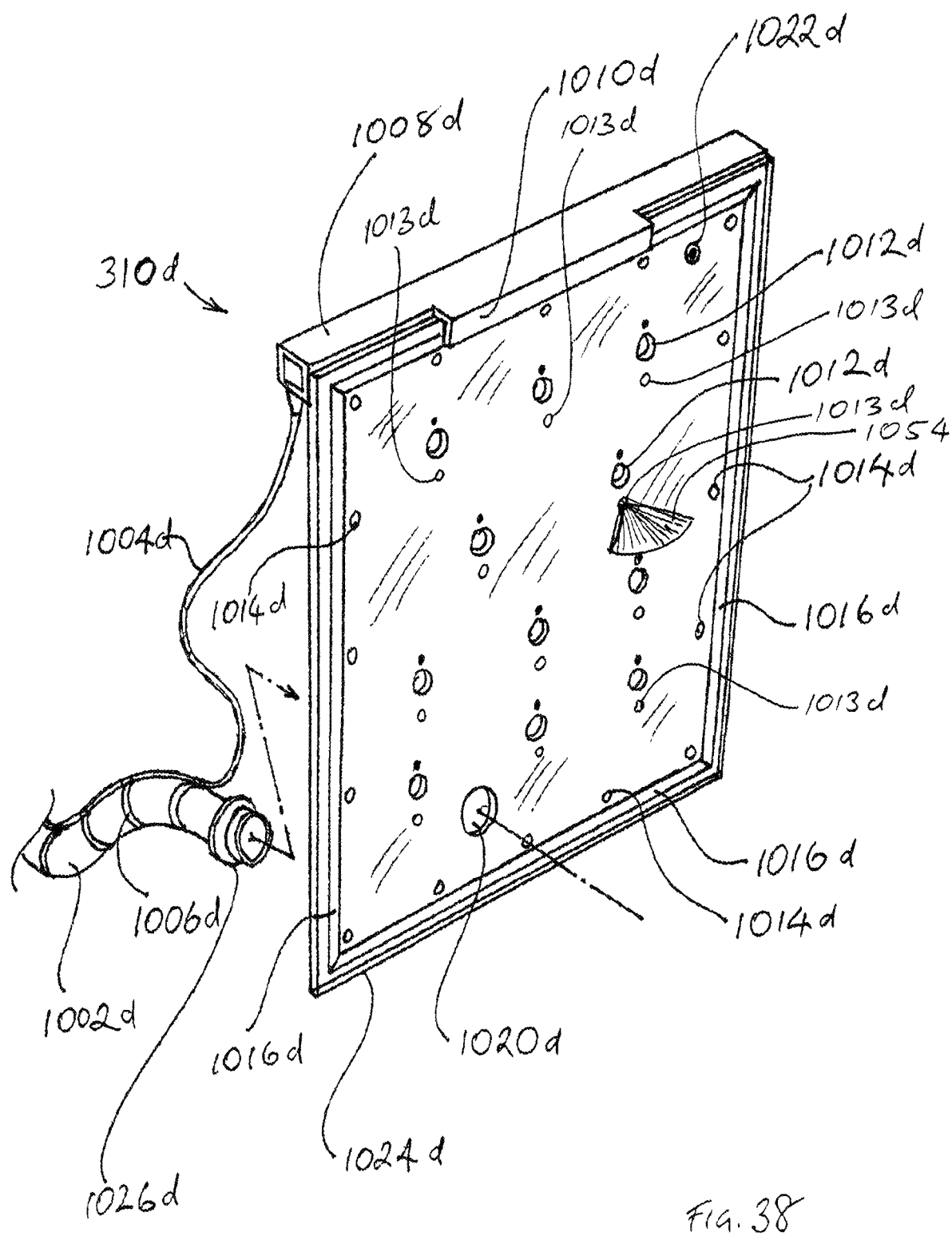
FIG. 38 is a perspective view of still another cover assembly according to the invention, shown in a vertical orientation.

FIG. 38 shows a further cover assembly 310d that is similar in most respects to cover 310c and used in the same way. Items with numbers ending with "d" are the same as the corresponding items without the "d" as described above in relation to cover 310b as shown in FIG. 33 and so need not be described again. (For example, item 1008d in FIG. 38 corresponds in description and function to item 1008 of FIG. 33.) The difference between cover 310b and cover 310d is that lighting is provided in a different way. Associated with each port 1012d is a light source 1013d that, instead of providing diffused light as in the case of the LED banks 1018 of cover 310b, project a thin sheet of light 1054 into an enclosure (not shown) on which cover 310d is used. (For clarity, such a sheet of light is shown only for one of the light sources 1013d in FIG. 38.) This is helpful to an operator in that particles in or passing through the light sheet 1054 are illuminated by the "Tyndall" effect and a user cleaning the enclosure has a clear indication of whether and where particles are still present in the enclosure and therefore need further attention.

FIG. 39 shows one way in which such a sheet of light can be produced. A miniature laser 1051 generates a narrow beam of light in the direction of an axis 1060 that passes through a transparent or translucent cylinder 1052 made of for example a suitable plastic material or even glass, the cylinder 1052 having a lengthwise axis 1053 perpendicular to axis 1060. The effect of the cylinder 1052 is to convert the beam into a fan-shaped flat sheet of light 1054 in a plane perpendicular to the axis 1053.

FIG. 40 shows this arrangement as realized in cover 310d for a typical port 1012d. The panel 1024d of cover 310d comprises two layers secured together—one is a sheet 1055d of a suitably stiff plastics material and the other, on an outer face of panel 1024d, is a sheet 1056d of a vacuum-formable transparent plastics material in which holes corresponding to ports 1012d are provided and in which are formed elongate dimples 1057, one for each laser 1051. Cylinder 1052 and laser 1051 are positioned within dimple 1057 between sheet 1056d and sheet 1055d in the desired orientation. In some embodiments, sheet 1055d is recessed as shown at 1061. Electrical connections supplying power for the laser 1051 (not shown in FIG. 38 or 40) may be run between sheets 1055d and sheet 1056d to a suitable termination (not shown) and may be flat copper strips, for example. The orientation of axis 1053 is vertical when the cover assembly 310d is oriented as shown in FIG. 38, so that a horizontal sheet of light 1054 is provided, as shown in FIGS. 38 and 40, although other orientations may be chosen. It will be recognized that other, different ways may be chosen to realize the described arrangement of laser 1051 and cylinder 1052. (For example, not shown, panel 1024d may comprise only a single sheet such as sheet 1055d, with laser 1051 and cylinder 1052 being accommodated in a short length of tube secured by gluing or otherwise, to panel 1024d at one end and closed at the other end.) Also, instead of a cylinder 1052, a suitably shaped lens (not shown) may be used.

An embodiment with a further, optional enhancement is now described. FIG. 40 also shows a light emitting diode (LED) 1058 optionally accommodated in dimple 1057 and oriented facing away from the sheet of light 1054 so as to be visible to a user. LED 1058 is arranged to be lit with power provided by the system in a colour that is modulated (by the processor shown in FIG. 3 at 200) according to the measured concentration of particulates at the enclosure outlet 102d when its associated port 1012d was last detected (by the means described earlier above) as being in use—for example green in the event of a negligible concentration and red in the case of a heavy concentration. A user seeing that the LED 1058 for a particular port 1012d is showing red knows to take cleaning action at that port until the LED 1058 turns green, due to the particulate concentration at outlet 1020d falling. When the LEDs for every port 1012d are green and the measured concentration of particulates at outlet 1020d is adequately low, and the light from each light sheet 1054 does not show particles, the user has some assurance that cleaning is complete. As for lasers 1051, conductors (not shown) providing power for the optional LEDs can be run between sheets 1055d and 1056d to suitable terminations for onward connection to the system. In some embodiments power for the LEDs is provided by the same power supply that supplies power to the instrumentation and control system shown in FIG. 3.

Although cover 310d is shown to have one light source 1013d associated with each port 1012d, it is possible to provide them in other, or additional, positions.

In some embodiments, it is possible to make cylinder 1052 rotatable by a user so that the sheet of light 1054 can have any of a range of orientations. This can be achieved for example by securing a ferromagnetic element (not shown, for example a small disc) to cylinder 1052 and providing a magnet outside dimple 1057 to act on the ferromagnetic element to rotate the cylinder 1052.

In other embodiments, the colour of the light from the laser is made adjustable by the user to enable a most suitable colour to be chosen.

Note that cover assemblies as described herein may comprise lighting as described herein, even where a cleaning lance such as lance 1160 with its own lighting is to be used.

Additional Embodiments—Workspace Environment Instrumentation

Figure 41:
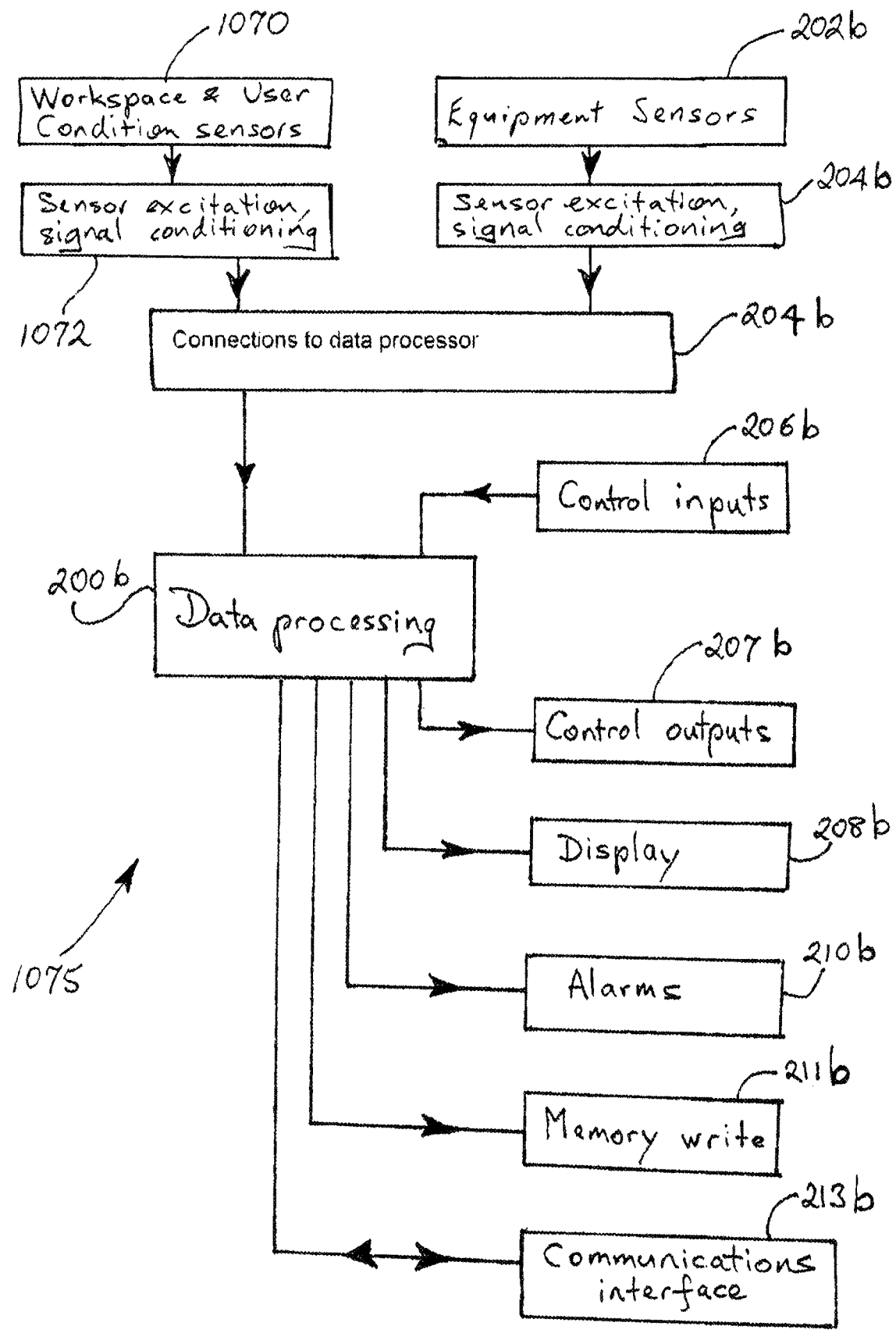
FIG. 41 is a schematic block diagram of an instrumentation, data processing and communication system of an embodiment.

FIG. 41 shows an extended version 1075 of the instrumentation and data processing arrangement shown in FIG. 3 and is representative of the instrumentation system of system 999. Items having the suffix "b" in FIG. 41 directly correspond to items with the same item number but no "b" suffix and so need not be described again, except to the extent that the extended arrangement of FIG. 41 alters them. Thus, for example display 208*b* essentially is as described above for display 208.

Instrumentation and data processing system 1075 has provision for two groups of sensors, the first being equipment sensors 202*b* that sense operating parameters as described above.

The second set of sensors 1070 comprises one or more sensors (not individually shown) for sensing parameters that relate to the condition of the workspace in which a user of the system shown in FIG. 2 works and/or to the condition of the user him- or herself. For example, workspace-related sensors include in some embodiments an air quality sensor, such as a particulate level sensor or a temperature sensor. User-related sensors may include for example a temperature sensor that directly senses temperature inside an item of protective clothing.

The significance of workplace- and user-related sensors is that it is important in industry today to ensure that working conditions are reasonable and can be proven to be so, particularly where substances that are inherently toxic or harmful in certain concentrations or particle sizes are being dealt with. A further issue may be pollution by harmful substances. Therefore, system 1075 in some embodiments provides for sensing, recording (at item 211*b*) and transmission (at 213*b*) of data on workplace- and user-related parameters alongside equipment-related parameters. Further, system 1075 provides for the alarm, control and display functions 210*b*, 207*b* and 208*b* to reflect the importance of workspace and user-related parameters.

In some embodiments, item 1070 includes a particulate sensor (not shown) located in a workspace of a user but away from Station K, the blower 46 outlet (FIG. 2).

This particulate sensor senses particulate levels independently of the system shown in FIG. 2. As an example, a suitable sensor for some applications could be an HPM-Series laser particulate sensor available from Honeywell, Inc. This has its own fan for continuous sampling of air and sensing of particulate levels using a laser light scattering method to detect and count particles in the sampled air flow. In some embodiments, the sensor is powered from the same power supply as that used by the other items in system 1075 (at block 1072). The sensor may be connected to data processing unit 200*b* (at block 204*b*) either by cable or wirelessly using any suitable protocol.

The sensed particulate levels in some embodiments are recorded alongside equipment-related quantities such as particulate concentration at Station F (FIG. 2), so that a record is obtained of the particulate levels experienced by the user during a cleaning operation.

Further, data processing unit 200*b* may provide for alarms to be made drawing the user's attention to particulate levels in his or her workspace that are becoming excessive, display of the workspace particulate level, and, if particulate levels rise to a predetermined unsafe level actual shutdown of the equipment via control outputs (block 207*b*).

As described herein the system shown in FIG. 2 may be operated to achieve cleaning of an enclosed space by either blowing gas into, and sucking it out of, the enclosed space or simply extraction by suction alone. In either case sensing of workspace- and user-related quantities may be used.

Additional Embodiments—Flexible Cover Assemblies

The cover assemblies 310, 310*a*, 310*b*, 310*c*, 310*d* described above are rigid or substantially rigid. However, it is possible to provide cover assembles that are formed using flexible materials. Such cover assembles can offer the advantage of being easier to store, when not in use, and easier to transport to and from a worksite. Further, an advantage may be avoidance of danger from breakage. Acrylic sheet such as that sold under such trade names as "Plexiglass" or "Perspex" may break under stress, with broken pieces potentially causing injury.

As an example of a suitable material for cover assemblies that are flexible, PVC material is available in the form of sheets that are transparent and flexible, being supplied in rolls. Note that the word "transparent" is here not intended to necessarily imply the degree of transparency of a pane of glass, but rather to imply sufficient transparency that a user of the invention can see inside an enclosure being cleaned sufficiently well to be able to assess the progress of cleaning and manipulate a cleaning lance (such as lance 12) adequately.

Figure 42:
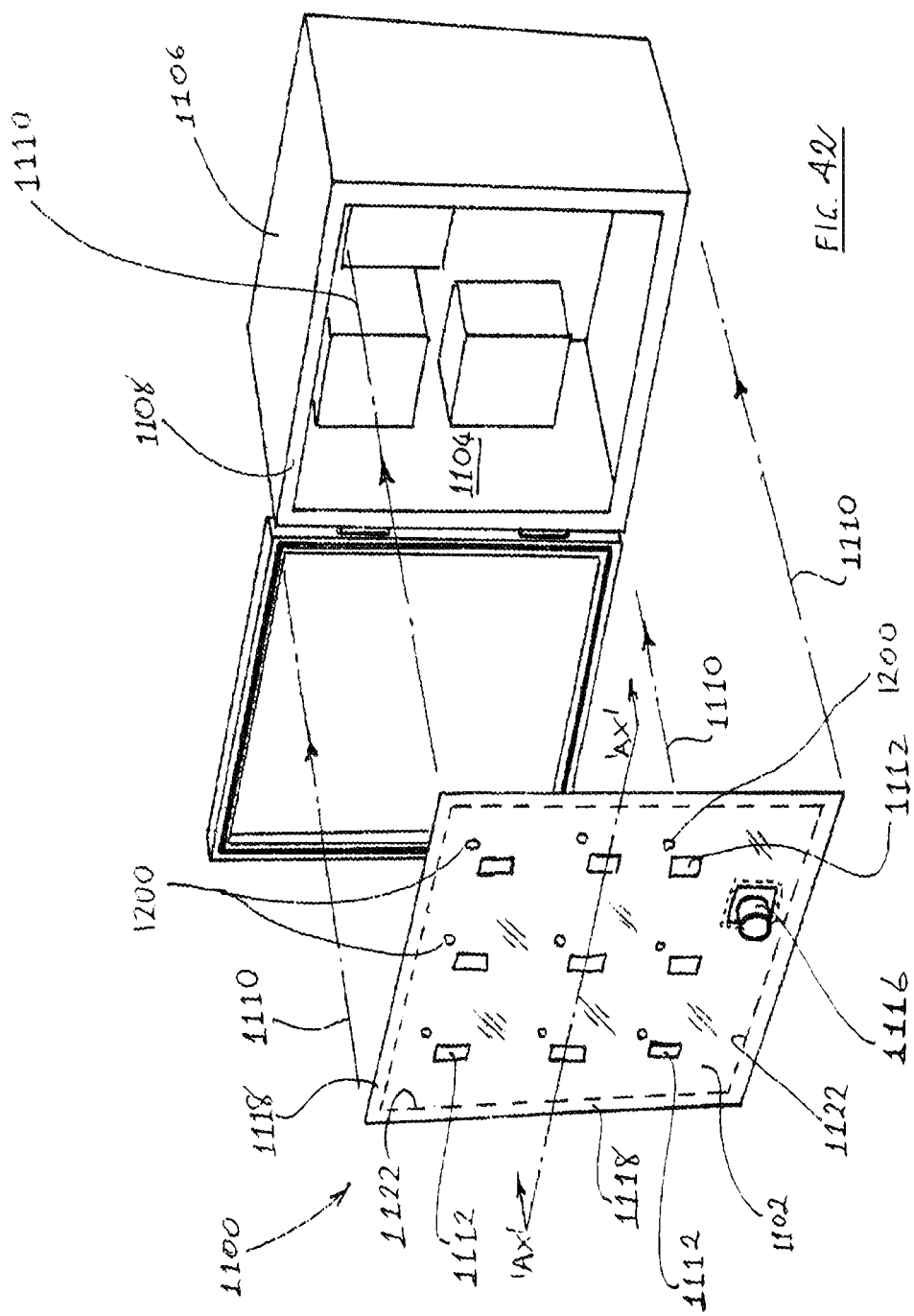
FIG. 42 is a perspective view of a further cover assembly and an enclosure, the cover assembly being shown positioned for placement on an opening of the enclosure.

FIG. 42 shows a cover assembly 1100 formed in part from a sheet 1102 of flexible transparent plastics sheet material such as a suitable PVC material, positioned for fitment against an opening 1104 of an enclosure 1106 of ferromagnetic material whose interior is to be cleaned according to the invention. Cover assembly 1100 is shaped and sized to be able to abut a peripheral flange 1108 of enclosure 1106 and to span and close off the opening 1104 defined by flange 1108. This is indicated in FIG. 42 by the chain-dotted lines 1110. Cover assembly 1100 has covers 1112 (described below) for ports 1114 allowing insertion of a cleaning lance (such as lance 12 or the lance 1160 described below) and an outlet port assembly 1116 for connection of an outlet duct (not shown) for removal of the cleaning gas and entrained particulate matter.

Figure 43:
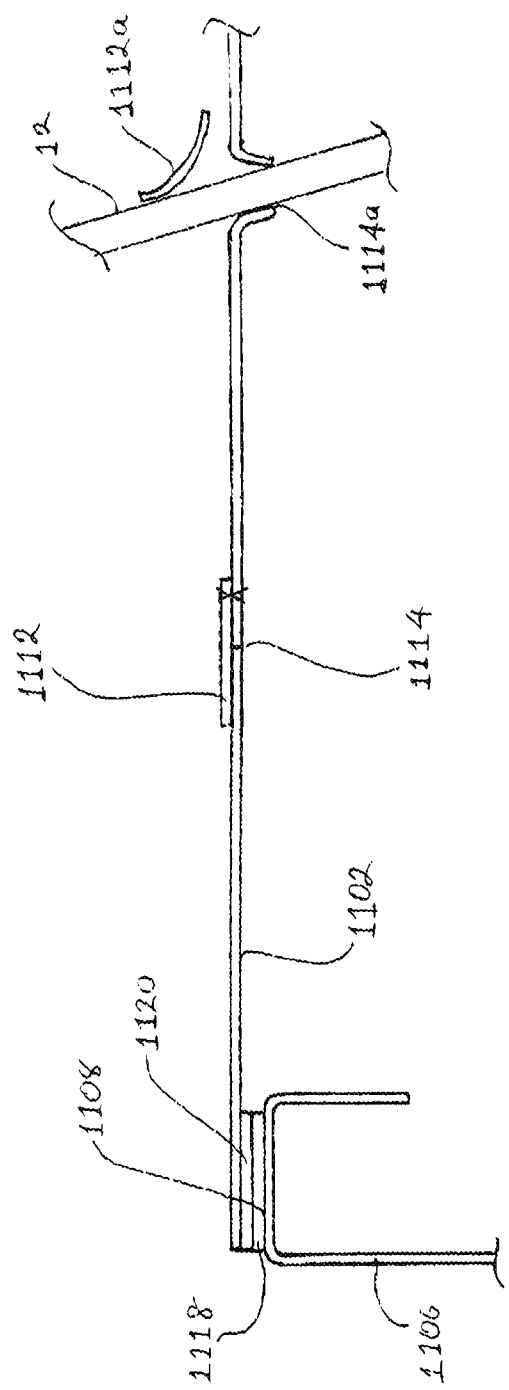
FIG. 43 is a partial cross-section of the cover assembly of FIG. 42, the section taken at station "AX-AX"

FIG. 43 is a cross-sectional view of a portion of cover assembly 1100 taken at station "AX-AX" showing two only of the ports 1114, with one of them 1114*a* shown in use for insertion of a cleaning lance such as lance 12. To secure cover assembly 1100 against gas leakage around its edge, cover assembly 1100 is provided with a flexible magnetic strip 1118 around its periphery that holds cover assembly 1100 against flange 1108 of the enclosure 1106. Magnetic strip 1118 and the sheet 1102 are held together by a double-sided adhesive tape 1120 having a plastics foam between its two faces (as known in the adhesive tape art), also extending peripherally around the sheet 1102. Tape 1118 and magnetic strip 1120 are shown in FIG. 42 by dotted lines 1122. Note that if required, cover assembly 1100 can be secured in place more reliably by the use of suitable adhesive tape (for example so-called duct tape) if required.

With a suitable choice of magnetic strip 1118, cover assembly 1100 has been found practicable in many applications because the necessary difference between pressures inside and outside the enclosure 1106 can be not large enough for cover assembly to be sucked off flange 1108 and into enclosure 1106.

The outlet port assembly 1116 is secured gas-sealingly to sheet 1102 by a suitable adhesive or by heat or solvent welding and/or by stapling or stitching.

Figure 44:
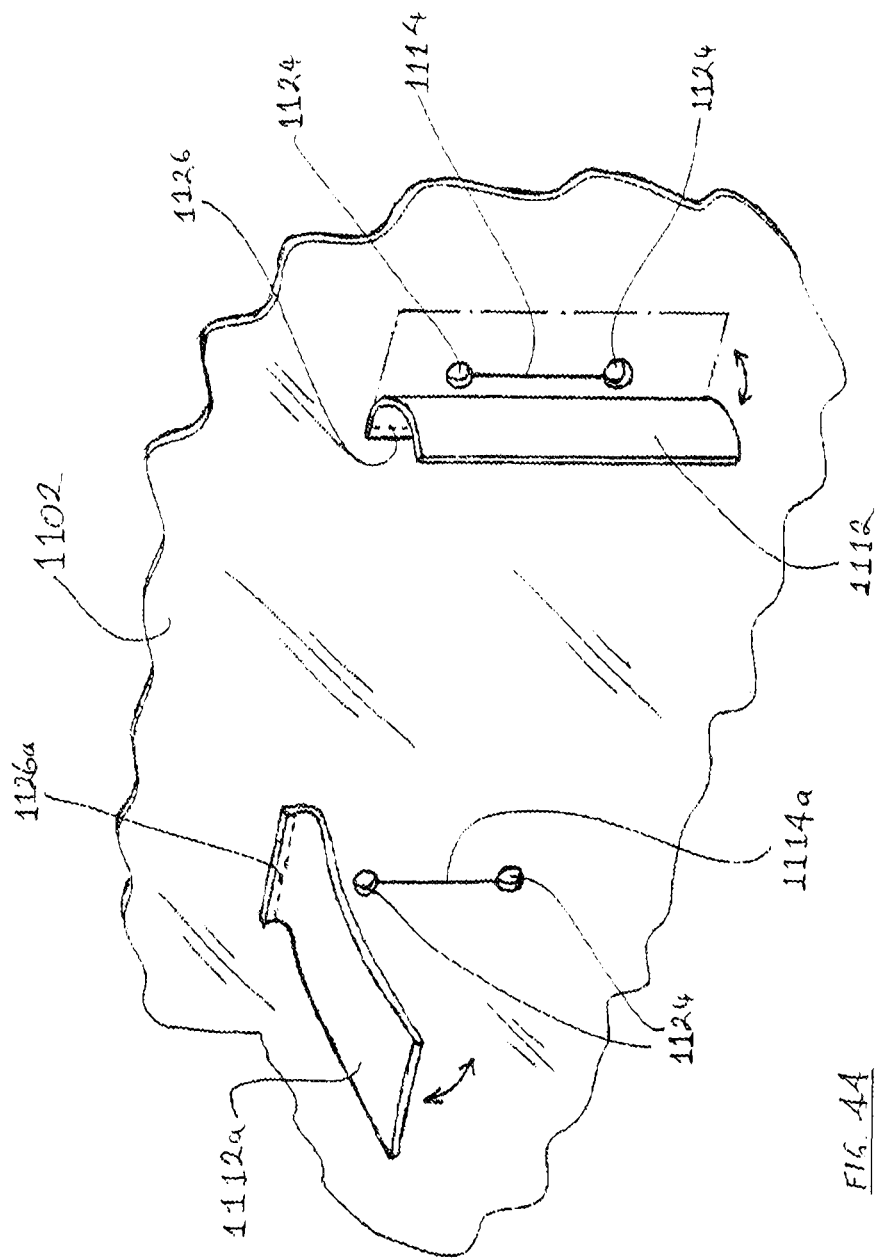
FIG. 44 is a perspective view of an exterior portion of the cover assembly shown in FIG. 42.

FIG. 44 shows two only of the ports 1114, 1144*a* and associated port covers 1112, 1112*a* of two different types. Ports 1114, 1114*a* comprise slits formed in the sheet 1102 and preferably provided with holes 1124 at each end to prevent tearing of sheet 1102. To limit flow of cleaning gas through ports 1114 when they are not in use, flexible port covers 1112 are provided that when their associated ports 1114 are not in use abut sheet 1102. Chain dotted lines in FIG. 44 show the positions of covers 1112, 1112a when they abut sheet 1102. Covers 1112 and 1112a can be swung aside as shown for insertion of a cleaning lance such as 12 or 1160. This can be done in two ways. Cover 1112 is secured to sheet 1102 along a vertical edge 1126 and cover 1112a is secured to sheet 1102 along a horizontal (as drawn) edge 1126a. The covers 1112, 1112a may optionally be of the same type of material as the sheet 1102 and secured thereto by adhesive, solvent welding stitching or any other suitable method. As desired, the covers 1112 of cover assembly 1100 may be all of the type shown as 1112, all of the type shown as 1112a, or a mixture of both.

However, it has been found that in many applications pressure differences between an internal space being cleaned and the workspace outside are and can be maintained small enough that there is no significant leakage of particulate material through ports such as 1114 and 1114a even if the flaps 1112 and 1112a are omitted altogether. Accordingly, any of the flexible covers described in this specification may for suitable applications be provided with ports for cleaning lance insertion that comprise simply a slit (such as 1114 or 1114a) with anti-tearing holes at each end (such as the holes 1124). It is preferred that where such ports are provided, the slit extends in at least approximately an upright direction in covers intended to be used on vertical openings. Such ports are particularly convenient where they can be used, as they do not hamper folding or rolling up of flexible cover assemblies when not in use.

Figure 45:
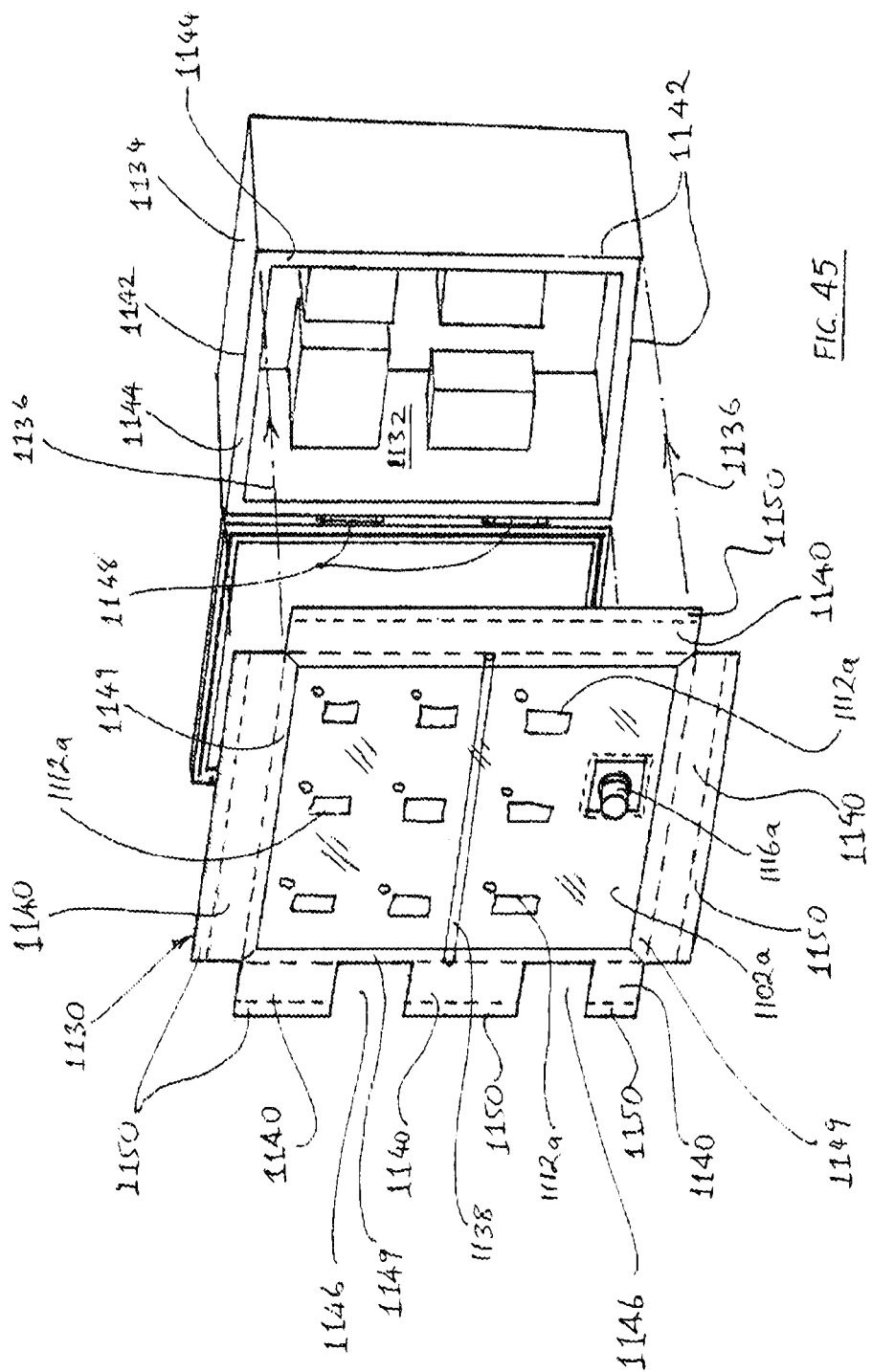
FIG. 45 is a perspective view of a still further cover assembly and an enclosure, the cover assembly being shown positioned for placement on an opening of the enclosure.

FIG. 45 shows a further flexible enclosure cover assembly 1130 positioned (as indicated by chain-dotted lines 1136) ready to be secured over an opening 1132 of an enclosure 1134. Cover assembly 1130 is the same as cover assembly 1100 as described above save for two modifications. Elements of cover assembly 1130 that are the same as corresponding ones of cover assembly 1100 are numbered the same as in FIG. 42, save for a suffix "a". The first modification is that an elongate stiffener 1138 is secured to and extends across the outer side of the cover assembly 1130, for example by adhesive or heat- or solvent-welding or retention in a pocket. The purpose of stiffener 1138 is to prevent that part of cover assembly 1130 that extends over the opening 1132 from deflecting excessively into enclosure 1134 due to the pressure difference maintained across the cover assembly 1130 in use. Only one stiffener 1138 is shown, but in other embodiments several are provided where required.

The second difference between cover assembly 1130 and cover assembly 1100 is that cover assembly 1130 has peripheral flaps 1140 that in use are wrapped around corner edges 1142 of a peripheral flange 1144 around opening 1132. Gaps 1146 are left between flaps 1140 where necessary to clear obstacles such as hinges 1148. Flaps 1140 may be of a different material from plastics sheet 1102a, for example of a suitable textile material with or without a plastics or rubberlike coating, for ease of bending around corners 1142, and need not be transparent.

The portion 1149 of cover 1130 that abuts flange 1144 may be provided with double-sided tape and magnetic strip as shown in FIG. 43 for cover 1100 or with a suitable sealing material only. Magnetic strip or individual magnets are provided at 1150 on flaps 1140. Cover 1130 can provide a more secure connection to an enclosure (such as 1106 or 1134) than cover 1100.

Both covers 1100 and 1130 can be rolled up for convenient storage and transport, due to the use of flexible material in their construction.

In other embodiments, flexible cover assemblies (not shown) can be provided with both stiffener(s) such as 1138 and flaps such as 1140 or only one of those features, as required.

A possible difficulty associated with flexible cover assemblies 1100 and 1130 is illustrated by the presence of outlet port assemblies 1116 (in cover assembly 1100) and 1116a (in cover assembly 1130). When ducts are connected to components, 1116 and 1116a, they place stress on them which may significantly deflect the surrounding flexible material (1102 or 1102a respectively). This can risk separation of the cover assembly from the structure whose internal space is to be cleaned of particulates, and associated leakage of particulate material.

Figure 62:
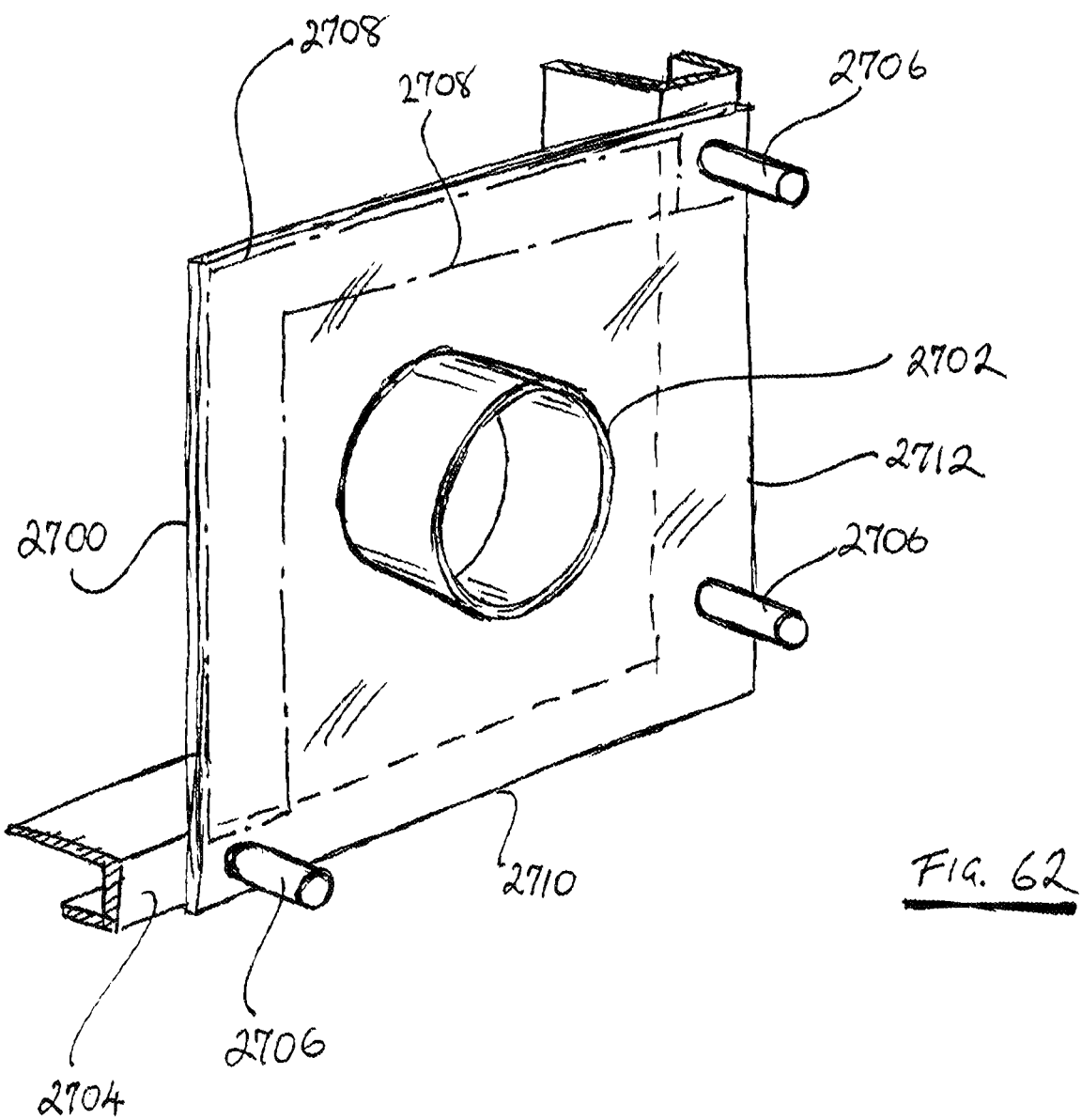
FIG. 62 is a perspective view of a duct connection assembly for use with a flexible cover assembly, secured to a structure.

One solution is shown in FIG. 62. A plate 2700 of steel having a duct connection 2702 is secured to a structure 2704 whose interior is to be cleaned of particulates in a suitable position for connection of the duct (not shown) to connection 2704. This may be done using any suitable form of fasteners, such as spring pins 2706 or screws (not shown) in holes provided in structure 2704 for the purpose or even by strong magnets. The flexible cover assembly (not shown) is then secured to plate 2700 by its magnetic tape as previously described. Thus, stress on the flexible cover assembly due to the duct connection is avoided.

Chain dotted outline 2708 shows one possible location for the magnetic tape to contact plate 2700. However, the flexible cover assembly could extend to outer edges 2710 and 2712 of plate 2700 and be provided with cutouts to clear connection 2702 and fasteners 2706, which would provide even more security against separation of the flexible cover from structure 2704.

Figure 65:
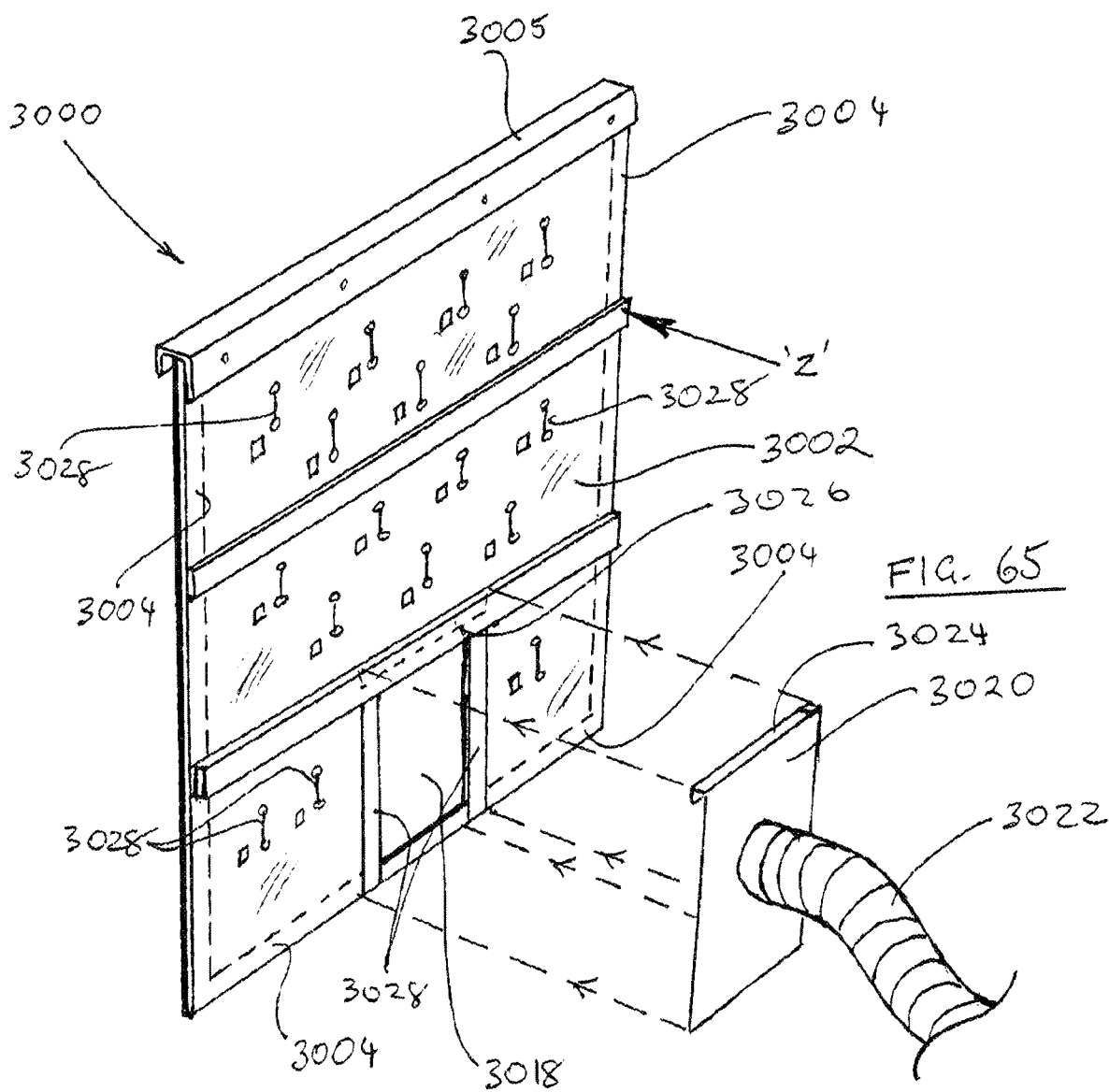
FIG. 65 is a perspective exploded view of a yet further cover assembly according to the invention.
Figure 66:
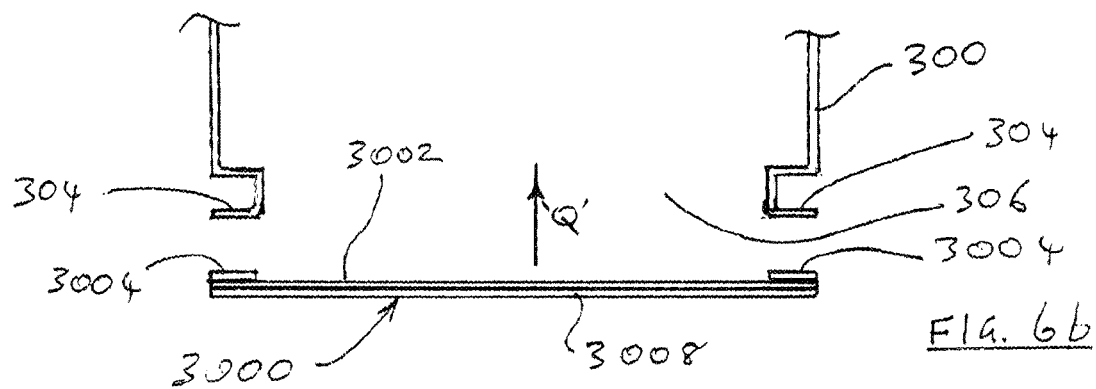
FIG. 66 is a horizontal cross-section of the cover assembly as shown in FIG. 65 in position for placement over an opening of a cabinet, the section being taken at the position of arrow "Z" in FIG. 65.

FIGS. 65 and 66 show yet another cover assembly 3000 for closing an opening in a container and for use in practice of the invention. Cover assembly 3000 is adapted to be placed against a surface surrounding an opening in a container to be cleaned, such as for example the cabinet 300 shown in FIG. 16, which has an opening 306 into an internal space 302, the opening surrounded by a flange 304. Such a container will be used here as one example for purposes of explaining cover assembly 3000.

Cover assembly comprises a sheet 3002 of a flexible material that is translucent or (preferably) transparent and flexible, such as certain types of PVC. Secured to the edges of sheet 3002 around its periphery (and facing the inner side of cover 3000) are flexible magnetic strips 3004, which in use of cover assembly 3000 hold sheet 3002 against flange 304. An elongate element 3005 is secured along a top edge of sheet 3002 and is adapted to hook over an upper portion of flange 304, for additional support of the weight of cover assembly 3000, both in use and when it is being positioned on flange 304 for use.

Figure 67:
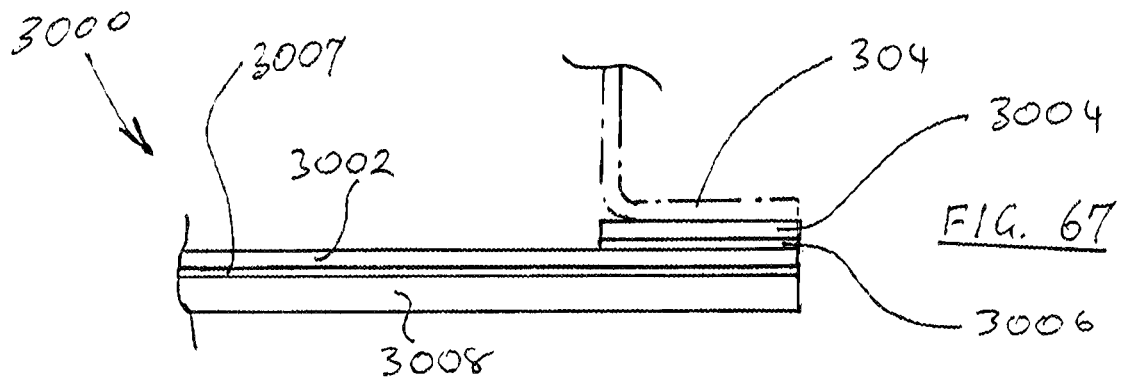
FIG. 67 is a partial horizontal cross-section of the cover assembly as shown in FIG. 65, the section being taken at the position of arrow "Z" in FIG. 65.

FIG. 67 is a partial cross-sectional view on a plane normal to sheet 3002 at location "Z" on cover assembly 3000, shown in position on flange 304, and shows that the magnetic strip is secured to sheet 3002 by double sided adhesive tape 3006. Suitable tapes for use with flexible transparent PVC sheet can be selected from among a range of tapes available from the Industrial Adhesives and Tapes Division of 3M (3M Center, St Paul, MN 55144-1000, USA), and are characterized in that they resist migration of plasticizer from the PVC into the adhesive, leading to weakening of bond strength. Transfer Tape 3M transfer tape F9465PC is one example of this class of tape. The same arrangement as in FIG. 67 is used at each end of each of battens 3008.

To limit bulging of sheet 3002 into opening 306 in use, cover assembly 3000 is stiffened by battens 3008 extending parallel to each other and to element 3005. Battens 3008 are preferably made of a plastics material of suitably less flexibility than sheet 3002. For example, in many industrial applications, battens 3008 may be made of the plastic or glass-reinforced plastic used in battens for stiffening sails of small sailboats. Battens 3008 can also be secured to sheet 3002 using double sided tape 3007 of suitable type, from the class mentioned above, although other suitable methods of securing may be used if required.

FIG. 66 is a horizontal cross-sectional view of the cover assembly 3000 in position ready to be moved in the direction of arrow "Q" to close opening 306 of cabinet 300.

Figure 68:
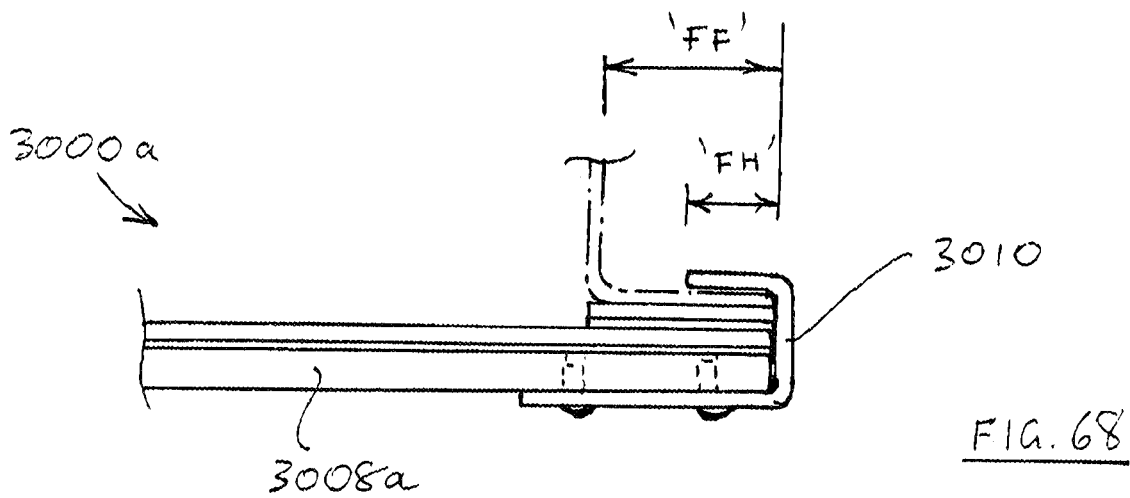
FIG. 68 is a partial horizontal cross-section of a modified form of the cover assembly as shown in FIG. 65, the section being taken at the position of arrow "Z" in FIG. 65.

A modified cover assembly 3000a can provide extra security of positioning and retention on flange 304. Cover assembly 3000a is identical to cover assembly 3000 except that battens 3008 are replaced by battens 3008a the same as battens 3008 but with ends adapted to hook onto flange 304. FIG. 68 shows one end of a batten 3008a of which each end has a hook 3010. If, at each end of batten 3008a, the dimension marked "FH" in FIG. 68) of each hook 3010 is not more than about half of the flange 304 dimension marked "FF", it is found that with some sideways movements and/or a little bending of battens 3008a both hooks 3010 can be made to hook over the flange 304 on opposite sides of opening 306.

Figure 69:
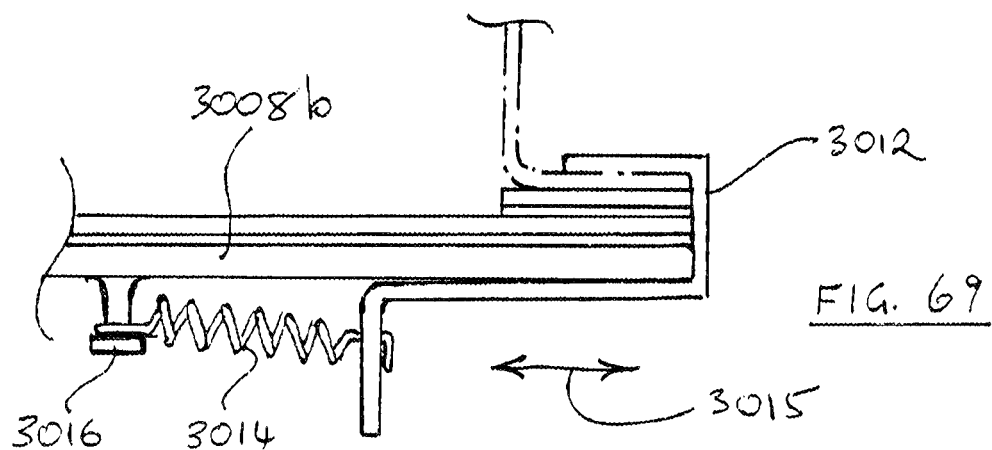
FIG. 69 is a partial horizontal cross-section of a further modified form of the cover assembly as shown in FIG. 65, the section being taken at the position of arrow "Z" in FIG. 65.

As an alternative to the arrangement shown in FIG. 68, one or both hooks 3010 of batten 3008a can be replaced by a slidingly movable hook 3012 as shown in FIG. 69. A spring 3014 is attached at one end to an anchor 3016 on a batten 3008b, otherwise similar to battens 3008 or 3008a, and at its other end to hook 3012. Spring 3014 holds hook 3012 in position on flange 304 as shown in FIG. 69 but allows hook 3012 to be moved sideways in the direction shown by arrow 3015, for convenience during installation on the cabinet 300.

Cover assembly 3000 (or versions with the any of the hooking arrangements mentioned above) is provided with a hole 3018 to which can be secured a rigid ferromagnetic plate 3020 having an exhaust duct 3022 thereon. Plate 3020 is formed on one edge 3024 to be able to hook over one of the battens 3008 (or 3008a or 3008b as applicable) which is taped to sheet 3002 only over part of the batten's width along a portion 3026 of its length. Magnetic strips 3028 are secured by double sided adhesive tape along sides of hole 3018 to hold plate 3020 onto sheet 30012 in use.

Ports 3028 for cleaning lance insertion are provided on cover assembly. These are shown as being of the type described elsewhere herein as having an elongate slit with anti-tearing holes at each end. However, it is to be understood that other suitable ones of the various port arrangements for flexible cover assemblies described herein may also be used instead if desired.

Cover assembly 3000 and its described variants are convenient to use and to store, as they can be folded or even rolled up, for easy carrying and storage after use.

Figure 70:
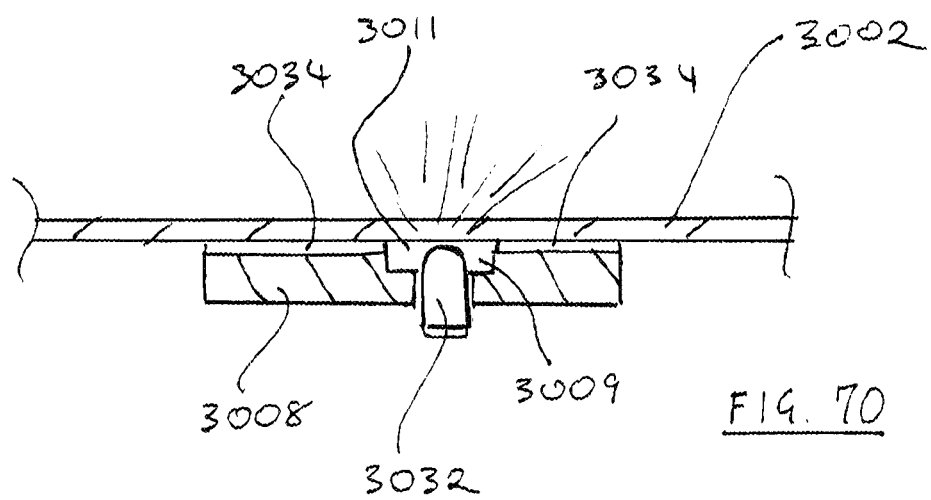
FIG. 70 is a partial horizontal cross-section of a yet further modified form of the cover assembly as shown in FIG. 65, the section being taken at the position of arrow "Z" in FIG. 65.

A further feature of cover assembly 3000 and its described variants is that lighting of the space being covered can be provided by installing one or more LEDs or other lighting devices in the battens 3008, or 3008a or 3008b. FIG. 70 shows a cross-section of a portion of cover 3000 at a batten 3008 provided with a recess 3009 in the batten 3008 for an LED 3032. Double sided tape 3034 has a hole 3011 near the recess 3030 to allow light from LED 3032 to pass through sheet 3002. The forms and refinements of lighting referred to in this specification by reference to FIGS. 38-40 may optionally be applied to lighting provided in this manner if required, the battens such as 3008, 3008a, 3008b in effect providing support for their elements in the same way that non-flexible cover assemblies of FIGS. 38-40 do.

Further flexible cover assemblies are described below by reference to FIGS. 49 to 55.

Additional Embodiments—Cleaning Lances

There will now be described further embodiments of cleaning lances that are alternatives to cleaning lance 12.

Figure 46:
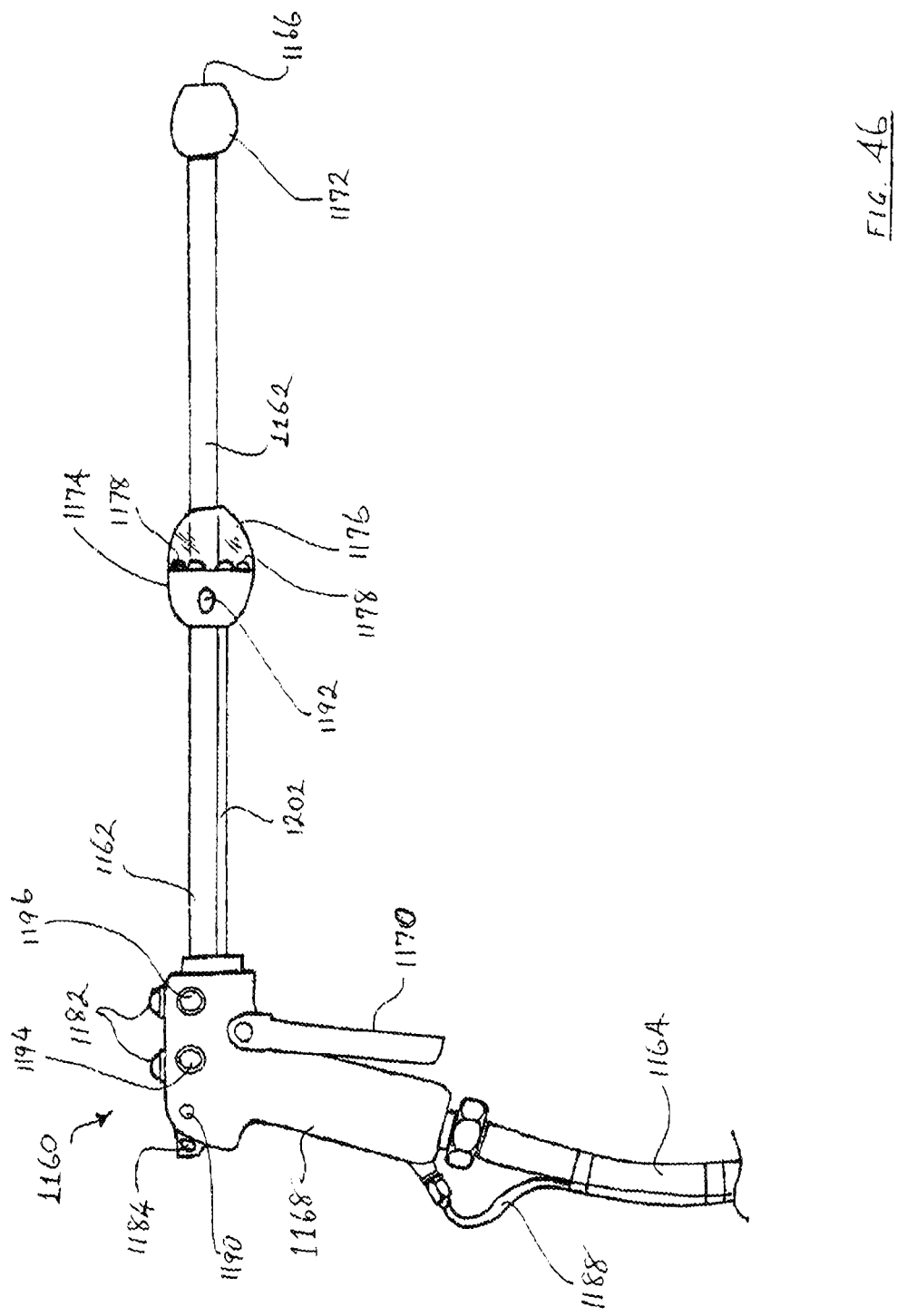
FIG. 46 is a side elevation of a cleaning lance according to the invention.

In some embodiments, a cleaning lance with more functionality than cleaning lance 12 may be provided. FIG. 46 shows a cleaning lance 1160 with additional functionality and features. In addition to providing an outlet for a jet of cleaning gas (for example air) cleaning lance 1160 has the following additional functions:

1. Provision of lighting inside an enclosure being cleaned using lance 1160 rather than or additional to lighting comprised in a cover assembly;
2. Provision of an inlet port for air to be sampled for the presence of particulate matter in the workspace where the lance 1160 is in use, but outside the enclosure being cleaned;
3. Provision of sensor(s) for continuous determination of a difference in pressure between the work area outside, and the interior of, the enclosure being cleaned using lance 1160;
4. Provision for sensing which of the available port assemblies is in use at a given time (i.e. which port assembly has cleaning lance 1160 inserted into it); and
5. Provision of alarms well-located to warn a user of a system condition or malfunction.

While items 1 and 3 may be provided in the enclosure cover being used (as described above in relation to covers 310, 310a, 310b, 310c for example) their incorporation in lance 1160 instead can simplify the design of enclosure covers with which it is used. This is particularly advantageous in the case of the flexible enclosure covers (including 1100 and 1130) as described above.

While lance 1160 as described below incorporates all of the items 1 to 5, it is possible and within the scope of the invention to provide embodiments that are lances (not shown) comprising or adapted to provide only one or more of them.

Lance 1160 comprises a duct 1162 for direction of cleaning gas (eg air) from an inlet hose 1164 to an outlet 1166 that in use of lance 1160 is positioned within an enclosure being cleaned in the same way as described above in relation to lance 12. A valve (not shown) controlled by a movable element on a handle assembly 1168 such as a trigger 1170 is provided to enable control of gas supply.

A rounded formation 1172 is secured on duct 1162 adjacent to outlet 1166 and is sufficiently soft and resilient to reduce any tendency of the outlet end of lance 1160 to damage componentry in an enclosure being cleaned. (This feature could optionally also be incorporated in lance 12.) Formation 1172 may be formed from a suitable resilient plastic or rubber or rubberlike material, for example.

Figure 47:
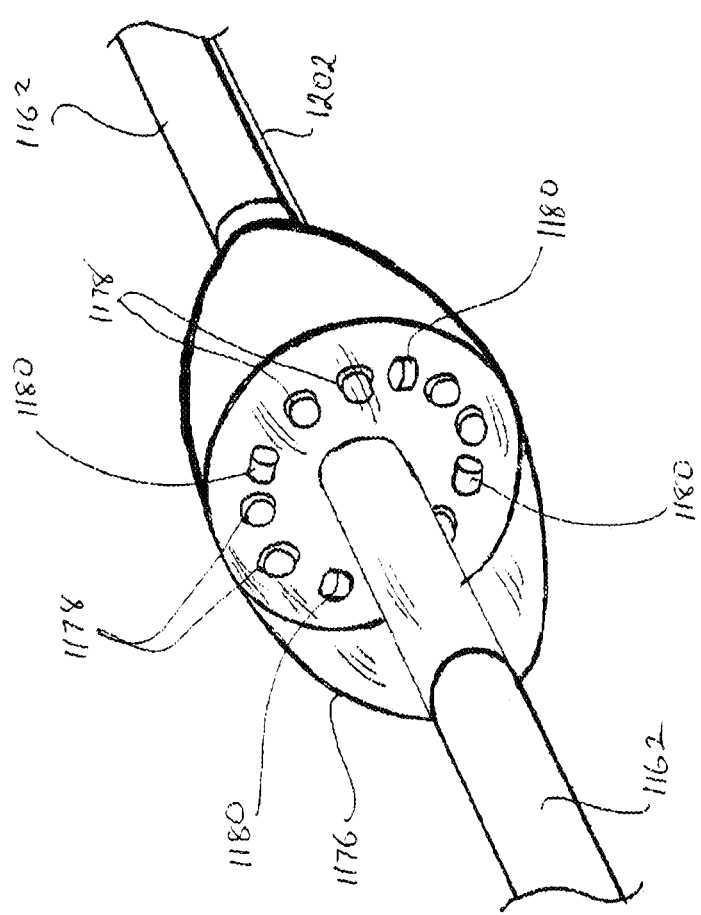
FIG. 47 is a perspective view of a portion of the cleaning lance as shown in FIG. 46.

Also secured on duct 1162 is a rounded formation (called herein an "olive") 1174 that contains, in a portion having a clear plastics cover 1176, lighting elements 1178 positioned to provide light close to the area in which the outlet 1166 is positioned. Olive 1174 is so positioned along duct 1162 as to be, in use, within the enclosure being cleaned. Lighting elements 1178 in some embodiments are light emitting diodes (LEDs). Optionally, as best seen in FIG. 47, additional lighting elements 1180 comprise lenses that in the same way as discussed by reference to FIG. 39 provide lighting only in flat "sheets", to help a user assess visually the quantity of particulates present near outlet 1166 using the Tyndall effect. Switches 1182 (or a multi-position switch, not shown) on handle assembly 1168 can enable a user to switch between lighting elements 1180 and lighting elements 1178 as required.

Cleaning lance 1160 further comprises sensor(s) (not shown) for sensing the pressure difference between the interior of the enclosure being cleaned and its exterior, i.e the workspace. This quantity is important because if the interior is not held at a pressure sufficiently lower than the exterior uncontrolled leakage of particulates may result. In one embodiment ports 1190 and 1192, respectively at the handle assembly 1168 and olive 1174, are provided and in fluid communication with a differential pressure sensor (not shown) within handle assembly 1168 or olive 1174 for sensing the pressure difference. In another embodiment, separate absolute pressure sensors are provided, one connected to port 1190 and the other connected to port 1192.

Figure 48:
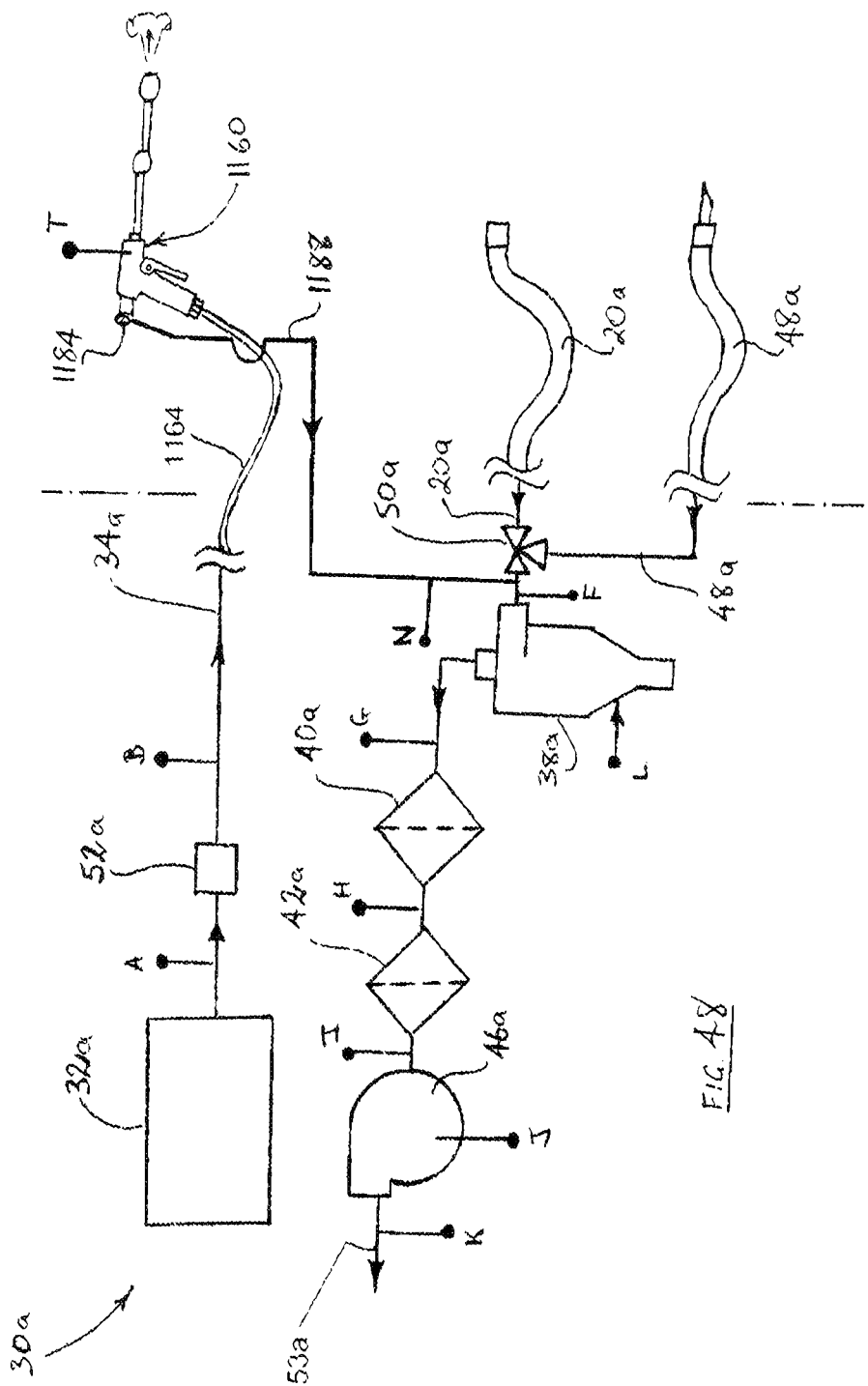
FIG. 48 is a schematic diagram showing components of a further cleaning system according to the invention.

For sensing of particulate concentration where a user is working, the lance 1160 is provided with a port 1184 for sampling the atmosphere at the end of lance 1160 opposite outlet 1166, i.e. outside the enclosure being cleaned. A duct 1188 is provided from port 1184 through which air is drawn from the workspace through a particulate concentration sensor (not shown). FIG. 48 shows schematically a system 30*a* that is a modified version of the system 30 (FIG. 2), the modification being inclusion of duct 1188 connecting port 1184 to the inlet of cyclone 38*a* so that workspace air is sucked through port 1184 and that air's particulate concentration sensed by a suitable sensor (not shown) at a station "N". Duct 1188 is shown in FIG. 48 as joining the stream of cleaning gas and entrained particulates from duct 20*a* or duct 48*a* upstream of station "F" but may instead be downstream of station "F". Station "N" and the workspace particulate concentration sensor may be within in an enclosure containing some or all of the components shown to the left of the chain-dotted line in FIG. 48.

The particulate concentration at the lance 1160 is thus sensed along with the other sensed quantities mentioned above, and may be logged along with those quantities. (In FIG. 48, to avoid repetition of the description of system 30, components having corresponding functions to components of system 30 are for simplicity numbered the same as those components of system 30.) Station "T" in FIG. 48 is where the pressure difference between the interior of the enclosure being cleaned and the surrounding workspace is sensed. (In embodiments where the function of measuring pressure difference is not included in lance 1160, it can be sensed by a differential pressure sensor having ports inside and outside the enclosure being cleaned, for example at a location such as station "C" in FIG. 2.)

In an alternative cleaning lance embodiment (not shown), a particulate concentration sensor (not shown) may instead be provided directly on lance 1160, for example in handle assembly 1168. Duct 1188 is then not required.

In other alternative embodiments (not shown), particulate concentration sensing in the user workspace is not incorporated in the cleaning lance but provided by a sensor (not shown) simply placed at a suitable location in the workspace. Where an enclosure is provided (for example a backpack) for major components such as blower 46 or 46*a*, cyclone 38 or 38*a* for example, the workspace particulate concentration sensor may be located in that enclosure with an inlet port on the exterior of the enclosure. Duct 1188 is then not required.

Warning lights 1194, 1196 are provided on handle assembly 1168 (i.e. at positions outside the enclosure being cleaned) where they are difficult not to notice. These can warn of malfunctions or indicate the status of other quantities. In one embodiment, lights 1194 and 1196 warn respectively of (a) an inadequate pressure differential between the interior of the enclosure being cleaned and the atmosphere in the workspace and (b) any one of the other sensed quantities being outside specified limits—for example, a full load of collected particulate matter (for example in container 1042) sensed at Station "L" in system 30*a*, or excessive particulate concentration in the workspace (as sensed at Station "N"). Lights 1194, 1196 are shown on one side of handle assembly 1168 but may be provided on both sides thereof for convenience of users who may be either left- or right-handed. The warning lights 1194, 1196 are driven by the data processor (See block 200*b*, FIG. 41) via the "alarm" outputs (block 210*b*).

Cleaning lance 1160 may be used with enclosure covers that do not have the feature, mentioned above, of sensors that identify which port assembly is in use. Cleaning lance 1160 may optionally include means for doing this. This can be explained using cover assembly 1100 as an example. It is possible to provide, adjacent to each cover port or port assembly, a passive RFID (Radio Frequency Identification) or passive NFC (Near Field Communication) tag identifying the particular port or port assembly, and to provide in olive 1174 or handle assembly 1168 a reader (not shown) for the tags. Thus, passive NFC tags 1200 are shown near port covers 1112 on cover assembly 1100. NFC-type technology is the preferred form of RFID because of its short range. As the lance 1160 is inserted into a port 1114, or as it is withdrawn, the reader can sense (read) the particular tag associated with that port and identify it to the data processor 200*b*. This may be logged along with the various sensed quantities, so that when a record of a period of cleaning is examined, it can be verified, for example, that every port was used. In other embodiments a tag may be provided adjacent each port or port assembly that bears a visual symbol such as a linear-type or circular barcode or QR code, and a suitable reader may be provided in olive 1174 or handle assembly 1168, again to identify the port in use. A circular barcode may be used. Being able to avoid provision on an enclosure cover of port-identifying sensors is convenient in the case of flexible enclosure covers such as 1100, 1130.

To enhance the reliability of port identification, lance 1160 may be provided with multiple NFC tag readers spaced along its length. For example, in addition to a reader in olive 1174, there may be another reader in the formation 1172. As lance 1160 is entered into a port with an associated passive NFC tag, the reader in formation 1172 first detects the tag, and as olive 1174 passes inwardly through the port, its reader detects the tag. The reverse occurs as lance 1160 is withdrawn from the port. Thus, two readers detect the tag, and the order in which they are detected allows both insertion and withdrawal to be distinguished.

In some embodiments, the gas supply valve (for example valve 32*a* of system 30*a*) is prevented by the data processor 200*b* from allowing cleaning gas to flow to the lance 1160 if sensors or readers comprised in the enclosure cover (as previously described) or comprised in lance 1160 do not indicate that a port has been opened (and, if the refinement of the previous paragraph is included, that lance 1160 has been inserted). This avoids the potential safety hazard of escape of cleaning gas outside the enclosure being cleaned.

Wiring (not shown) for lighting elements 1178 and 1180, and in applicable embodiments for any pressure sensor or tag reader comprised in olive 1174, and a small-bore tube in embodiments where port 1192 in olive 1174 is connected to a pressure sensor in handle assembly 1168, extends in a conduit 1202 from olive 1174 to handle 1168.

Between lance 1160 and the remainder of the system 30*a*, there extends the hose 1164 for cleaning gas, wiring for lighting elements 1178, 1180 and sensors or readers (not shown) in cleaning lance 1160, and in applicable embodiments duct 1188. These may be held together for at least part of their length or contained in a single flexible conduit, for safety and convenience of use.

Figure 61:
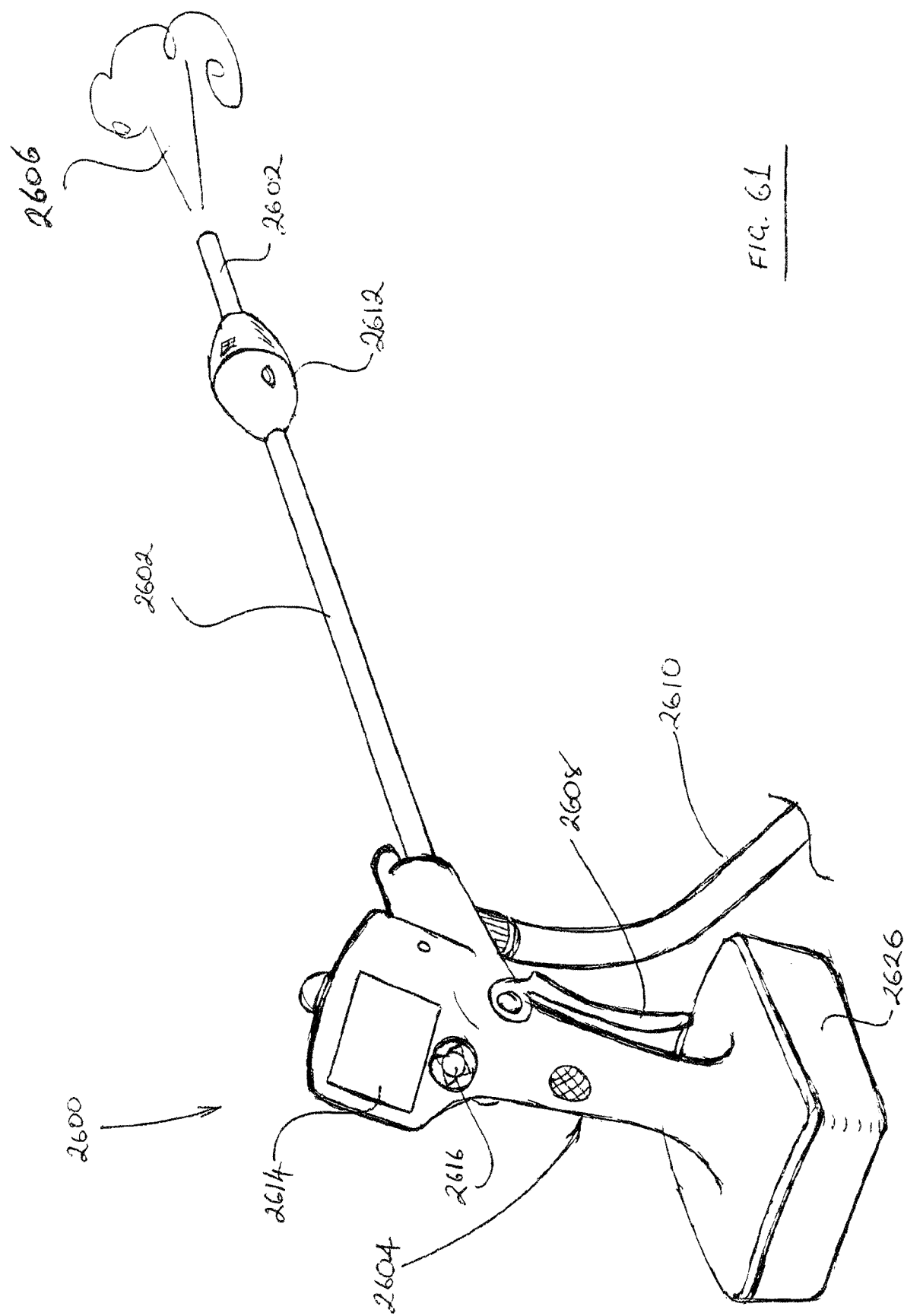
FIG. 61 is a perspective view of a further cleaning lance according to the invention.

Still other possible features may be provided a cleaning lance. Thus, FIG. 61 shows another cleaning lance 2600 that is an alternative to lances 12 and 1160. Lance 2600 has a duct 2602 for directing gas into an enclosed space to be cleaned and a handle assembly 2604 for manipulation of lance 2600 by a user. Lance 2600 has an "olive" 2612 essentially the same as olive 1174 of lance 1160, except as described below. (Lance 2600 does not have a formation corresponding to formation 1172 of lance 1160, but may be provided with one if required.)

Lance 2600 has the same sensing capabilities as described above for lance 1160, namely sensing:
- pressure difference between the portion (eg olive 2612) inside the space being cleaned;
- particulate concentration in the workspace (more particularly at the lance 2600 itself);
- whether a port assembly is in use and if so, which one, using for example an on-lance barcode or other optical reader or an NFC or other reader.

There may also be provided a GPS capability on the lance 2600. Location of the lance is a useful quantity to record as a part of the process of independently verifying cleaning work, but also for other purposes as set out below.

Lance 2600, instead of a wired connection to other parts of the system in which it is comprised (as in lance 1160) communicates through a wireless link using a suitable digital protocol such as Bluetooth, Bluetooth Low Energy or even (where longer range is required) the LORA protocol. Power is provided by a rechargeable battery 2626, for example a Lithium-Ion type. By this means sensor data from lance 2600 is sent to the data processing system (eg system 1075 of FIG. 41) and alarms, warnings and desired computed sensor outputs are sent back to the lance 2600.

A digital alphanumeric screen 2614 is provided on lance 2600 for display of warning and alarm information and of sensor outputs. This includes in particular at least the key quantities required by a user during the cleaning operation. In particular, screen 2614 may display particulate concentration from the workspace particulate concentration sensor so that the user can monitor it for his or her own safety, and the concentration of particulate matter in air leaving the space being cleaned, a key parameter in establishing successful completion of cleaning. The electronics associated with receiving data for display and driving the screen are also energized by the battery.

Screen 2614 may be for example of LED, OLED, LCD or so called "e-ink" type, the latter providing good visibility in high ambient light conditions.

Screen 2614 may be touch sensitive so that selection of options (see discussion of options below) can be by touching the screen 2614. Alternatively, a separate control 2616 may be provided.

The following are additional features that make lance 2600 differ from lances 12 and 1160, and the reasons for them.

Pulsating Flow Capability

Control of gas flow through (and from) the cleaning lance (eg 12 or 1160) by means of a user-operable valve on the lance itself (for example item 16 on lance 12 or 1170 on lance 1160) and a gas supply control valve (eg 52, 52*a*) provides "on/off" control and steady or slowly variable flow when gas is flowing. However, lance 2600 is adapted to make gas stream 2606 pulsating, either at all times when that gas stream is turned "on" (by trigger 2608) or when the user makes a deliberate selection of pulsating flow instead of steady flow. Gas is supplied to lance 2600 through flexible hose 2610.) Pulsating flow in duct 2602 can be provided by a solenoid-operated valve member (not shown) within the lance 2600 with time-varying current being supplied to the solenoid. When non-pulsating flow is required, the solenoid is caused to move the valve member to a position in which gas flows directly and without interruption from hose 2610 to duct 2602. In an alternative way of providing pulsating flow, energy in the gas supply itself can be used to move a valve member (not shown) cyclically, by use of the principle of a pneumatic hammer or riveter, as known in the art. Providing pulsating flow either at all times or when selected has several advantages. One is the potential for more effective cleaning in at least some circumstances, and the other is the potential for reduced cleaning gas flow. In some embodiments and applications, the latter advantage means that an adequate cleaning gas supply for some tasks may practicably be provided by a simple pressure vessel (eg a lightweight carbon-fibre reinforced plastics pressure vessel. Where a solenoid-operated valve is used to provide pulsating flow, the solenoid can be operated from the battery located at 2626.

"Before and After" Image Capturing Capability

The availability of very small video cameras based on charge-coupled devices (CCDs), as known for example in the mobile telephone art, enables a further enhancement of the cleaning lance. Lance 2600 is provided not only with lighting that is close to the point where cleaning is actually taking place, as described above in relation to olive 1174 of lance 1160, but with a video camera (not shown) located for example within the olive 2612. Such a camera can be controlled by the system 1075 to take "before and after" images of an area being cleaned when there is detection (by the NFC method or barcode reading as described above) of lance 1160 being entered into a new port assembly and being withdrawn, the images being stored along with sensor data to further enhance verification that cleaning has been adequate.

Lighting

Where lance 1160 provides for two types of lighting within olive 1174, lance 2600 further enables adjustment by a user of the intensity and/or the colour of the lighting provided. It is found that visibility in a dusty environment can sometimes be enhanced by varying these quantities.

Multiple Alarm/Warning Methods

Instead of or in addition to the warning lights 1194, 1196 of lance 1160, cleaning lance 1160 may be enabled to provide warning or alarm signals to a user by provision of onboard sound transducer(s) (not shown) for example of piezoelectric type, and/or handle vibration transducer(s) 2614 so that a user is unlikely to fail to notice such conditions. Further, an LED, OLED or LCD (or other digitally operated) screen may be provided on the lance itself to display nominated sensed values, for example particle concentration outside the space being cleaned and at the lance.

Particulate Sampling at the Lance

Lance 2600 may be provided with a particulate sampling capability in the same way as described above in relation to lance 1160 (using a sensor remote from lance 1160 and a sampling tube 1188) or alternatively, a particulate concentration sensor may be provided on lance 2600 itself, also operated from the battery 2626. It is not necessary that the on-lance particulate sensor be of the same type as the particulate concentration detectors. In fact, having readings from different types of sensors can be useful as they may be affected differently by particular environmental conditions, particulate size distributions and the like and any significant difference in readings can be a useful indicator of a need for investigation and or action. System 1075 can be adapted to flag such a situation with a warning or alarm.

Figure 71:
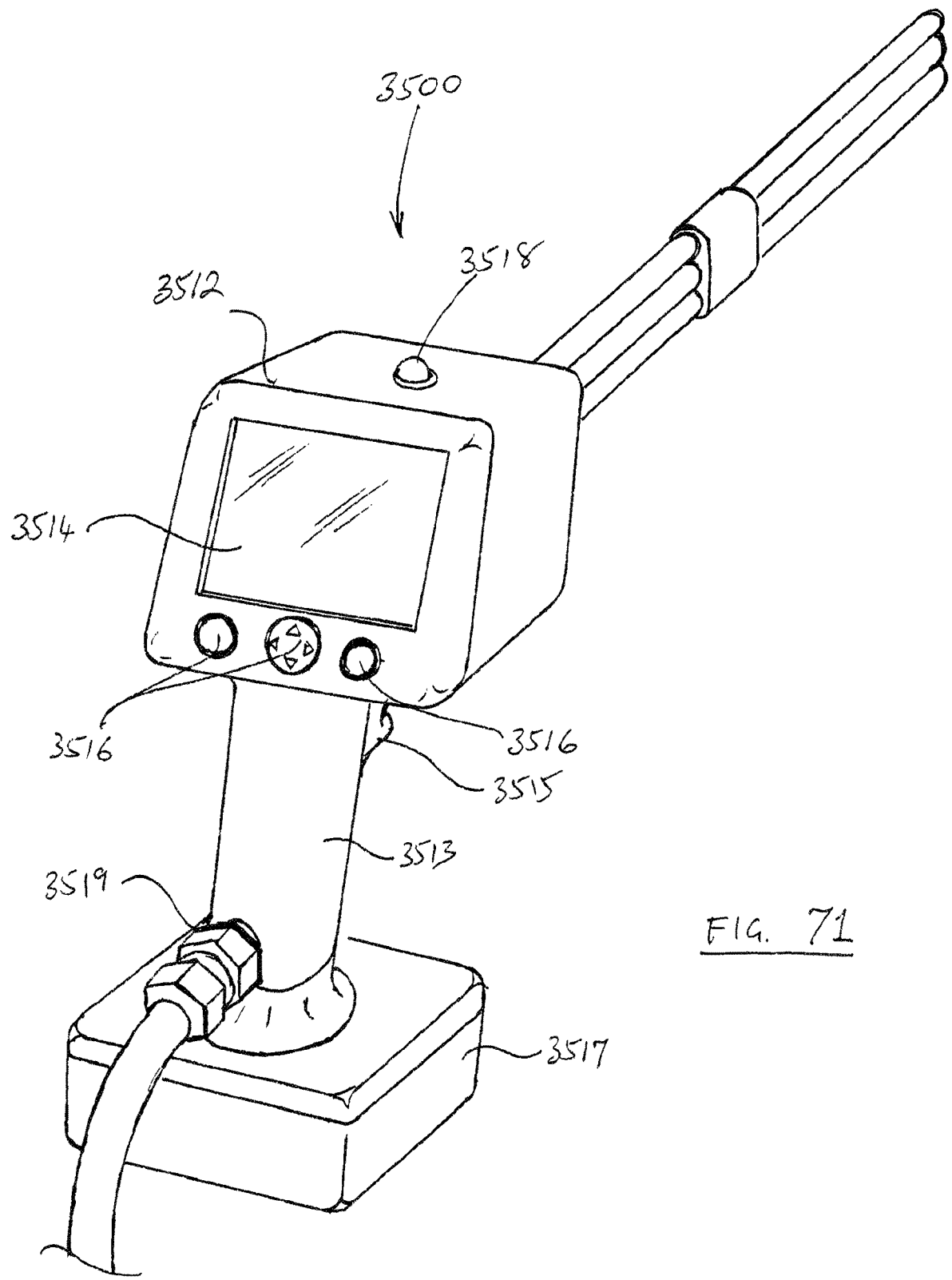
FIG. 71 is a perspective view of a yet further cleaning lance according to the invention.
Figure 72:
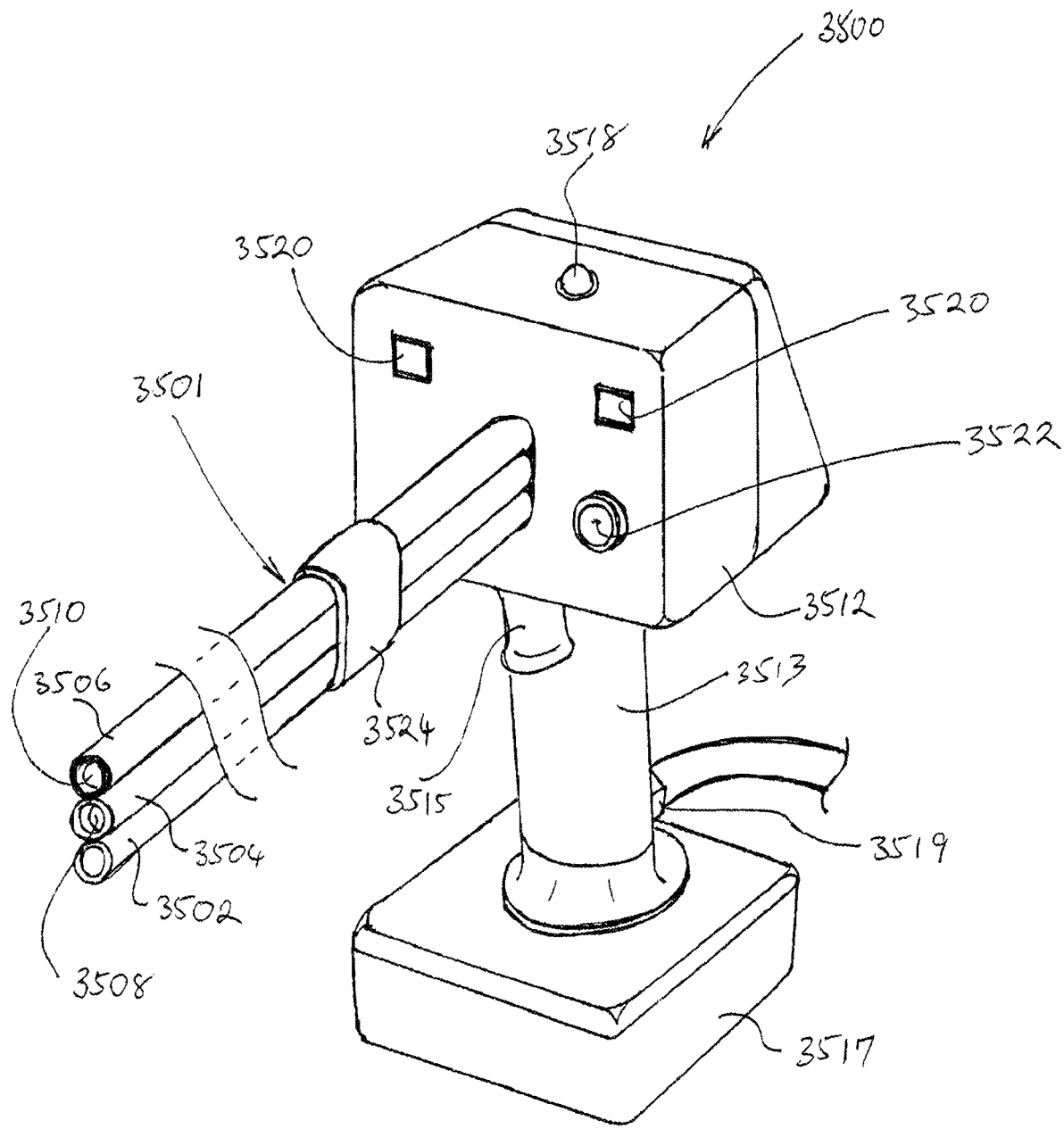
FIG. 72, is a further perspective view of the cleaning lance shown in FIG. 71.

A still further cleaning lance 3500 will now be described, by reference to FIGS. 71, 72 and 73. Lance 3500 includes certain additional differences from cleaning lance 1160 and 2600 shown in FIGS. 46 and 47 and FIG. 61 respectively. Cleaning lance 3500 has a main body 3512, a handle 3513, a trigger-type switch 3515 for control of cleaning gas flow, a detachable rechargeable battery pack 3517 for powering all its electronic and electric onboard functions, and a cleaning gas inlet hose connection 3519.

Instead of the "olive" 1174 of lance 1160 (and 2612 of lance 2600) cleaning lance has a group of three separate conduits 3502, 3504 and 3506 that enter a space to be cleaned through a port such as port 1114 for example, these conduits being held closely adjacent to each other along their length, and there is no formation corresponding to formation 1172 of lance 1160. The intent is to ensure that the cross-section of that portion 3501 of the lance 3500 that actually enters a space to be cleaned is of more nearly constant cross-section than olives 1174, 2612 and formation 1172 allow. It has been found that this is preferable where flexible cover assemblies such as cover assembly 300 for example, with slit-type ports such as ports 3028 are in use. Lance insertion and manipulation is easier and there is less chance of damage to such a cover assembly.

Duct 3502 is for the cleaning gas (eg air). Duct 3504 has at its free end a small digital video camera 3508 corresponding to the camera of lance 2600. Duct 3506 has at its free end a light source such as an LED 3510, to provide illumination of the area to which cleaning gas is being directed. Wiring to the camera 3508 and light source 3510 extends along ducts 3504 and 3506 back to main body 3512 of cleaning lance 3500. Light source 3510 may be for example a "white" LED whose light colour is controllable, and the colour used may be made variable by a user to enhance the ease of recognition of dust for a particular application.

Instead of the alphanumeric screen 2614 of cleaning lance 2600 there is installed in main body 3512 a screen 3514 capable of showing video from the camera 3508. Screen 3514 is able also to show alarm signals, and menus of available operational choices that a user may make. The system is adapted to enable not only the capture of "before and after" images of areas subject to cleaning (as in lance 2600) but to provide an aid for aiming and positioning the lance as required. Screen 3514 also of course is able to display all parameters able to be displayed by the scree 2614 of lance 2600.

Simple pushbutton or other suitable controls 3516 are provided for selection of the various functions of the lance 3500 as required.

In addition to the potential to show alarm conditions on the screen 3514 a warning light 3518 is provided to alert a user to any condition requiring action.

Optionally, accelerometers and a GPS-based position-determining capability (not shown) may also be provided in the main body 3512 of cleaning lance 3500. The intent is that accelerometers can detect large values consistent with dropping or abuse of the lance 3500 that risks damage and that the positioning capability allows location—and lack of movement—to be detected and logged.

The pulsating flow capability of lance 2600 is also provided via a valve (not shown, but preferably in main body 3512) controlled by (for example) a pulse-width modulated signal to turn flow off and on. The frequency and mark-space ration of valve operation may be made variable or selectable by a user to suit a particular application.

Also in common with lance 2600 is provision of one, and preferably two, airborne dust monitoring sensors (not shown, but having inlet ports 3520) for monitoring and logging of workspace air quality, and the provision of an alarm in the event of excessive dust in the workspace. Suitable gas detecting sensors include for example the laser-based type sold by Honeywell, including type HPMA11550-XXX. These are very small and have their own fan. Particulate capability as small as PM2.5 are available as is PM10 capability. The provision of two dust sensors provides reliable operation and some insurance against one of them losing correct calibration.

Excessive disagreement between their readings may itself be made an alarm condition. It is possible instead of two identical dust sensors to use two different types, so as to further enhance confidence in their readings.

Pressure sensors (not shown) may be provided in lance 3500, as for lance 2600.

A barcode or QR code reader 3522 is provided also, to identify both the equipment being cleaned and the particular port being used, from for example stickers applied to the particular cover assembly in use adjacent to their ports. Other port identifiers, readers and protocols may be used as desired, for example, such as NFC technology.

It is desirable to ensure that there is positive verification of actual insertion of the lance 3500 into all required ports, and to this end sensors are provided on lance portion 3501. In one embodiment, a set of several miniature Hall Effect sensors are provided in a housing 3524 close-fittingly wrapped around the ducts 3502, 35104 and 3506. These can be triggered (i.e. change state) as they pass small magnets (not shown, but which may be short lengths of magnetic strip) secured on the cover assembly in use closely adjacent to each port. These sensors are positioned at a range of positions along and (preferably also) around the lance portion 3501 so that their triggering can allow the instrumentation software (running in block 200$b$ of FIG. 41) to determine that insertion has happened, and when and, to a degree governed by the number of sensors, the extent or depth of insertion.

In some embodiments, Hall Effect sensors can be placed at a range of positions along ducts 3504 and/or 3506 provided the material of those ducts is chosen so as not to interfere with their operation.

Figure 73:
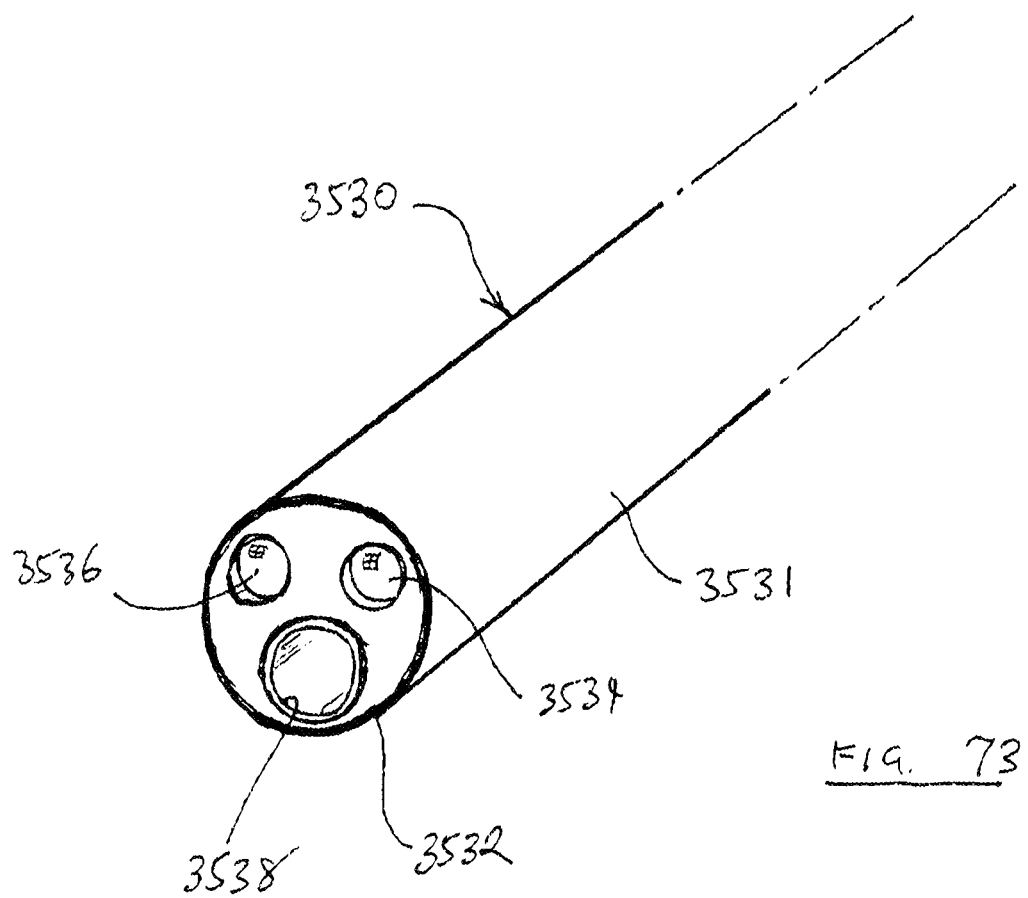
FIG. 73 is a perspective view of a cleaning lance portion according to the invention.

FIG. 73 shows another arrangement for a portion 3530 of a lance (not shown, but otherwise functionally similar to lance portion 3501) that enters a space to be cleaned. Lance portion 3530 comprises a single duct 3531 that contains at its free end 3532 a camera 3534 and light source 3536 that do what camera 3508 and light source 3510 of lance 3500 do. A duct for cleaning gas runs inside duct 3531 and has an outlet 3538. This arrangement can be more readily twisted about its own longitudinal axis than lance portion 3501 when in use.

It is to be understood that in the design of a system according to the invention, a selection of the various features described herein for lances 12, 1160, 2600 and 3500 can be made. Some features may be incorporated and some may not. Not all applications would for example require the comparative sophistication of cleaning lance 3500. For example, although in some applications sensing the pressure differential between a space being cleaned and the workspace outside it is very important, in others, it can be quite unimportant, so that no sensor for the space being cleaned need be provided.

Application of Ventilation or Vacuum Cleaning Alone

It is to be noted that there are many applications in industry where extraction of air or gases, in each case with or without particulates, is achieved by mechanical suction means alone. Accordingly, a further inventive concept using a system as shown in FIG. 3 or 41 above, is provision of a mechanical ventilation system where both equipment-related sensors and workspace- and/or user-related sensors are provided, and wherein signals from specific ones of the sensors (workspace-, user-, or equipment-related) are used to provide any or all of alarms (or warnings), display the parameter value(s) of concern and if desired or necessary shut down or otherwise control either the ventilation system or the equipment being ventilated. A very wide range of sensors is available today, for sensing not only of particulate levels, but also of potentially harmful gases (eg Hydrogen Sulphide) and suitable ones of these may be selected and used.

Some industrial processes require different levels of ventilation according to how a the process is being carried out or the stage it has reached, and it is desirable to be able to adjust ventilation to suit—either to provide adequate ventilation or to limit wastage of energy when a particular level of ventilation is not required. Therefore, instead of, or in addition to, alarms, warnings and shutdown commands, it is possible to provide for automatic control of the ventilation system to maintain effectiveness and save energy in a range of conditions.

The systems and embodiments described above amount to examples of the further inventive concept introduced in the previous paragraph. Further examples of potential application areas include grinding equipment and saws (eg for cutting stone kitchen benchtops, a known area of particulate problems). Both mobile and fixed types of equipment can provide other potential applications.

The apparatus and methods described herein may be adapted to removal of particulate matter from various entities, with various geometries. Referring to FIG. 28, (a) represents schematically applications of the type disclosed above, showing in section a cover 700 (corresponding to cover 310 for example) is fitted over an opening 702 of a cavity 704 in an object 706. Item 708 is a cleaning lance (similar to lance 12), items 710 are ports (similar to ports 340), item 712 is an outlet duct (similar to duct 20), and item 714 is a seal (similar to seals 318 or 321).

Diagram (b) of FIG. 28 represents schematically an application to removal of particulate matter from a surface 716. Hood 718 (shown in section) is positioned to abut surface 716 with a seal 728 extending around the area of surface 716 covered by hood 718. Cleaning lance 722 extends through one of several ports 720 in hood 718. 726 is an enclosed space defined between surface 716 and hood 718. An outlet duct 724 is provided for removal of gas and particulate matter.

Diagram (c) of FIG. 28 represents schematically an application where an object 730 is to have particulate matter received and is covered for the purpose by a cover 734 that abuts a surface 732. Cleaning lances 736 extend through ports 738 and are moved as required. Seal 740 limits or prevents leakage between cover 734 and surface 732.

Although examples (a), (b) and (c) all show covers (700, 718, 734) that can abut a flat surface, this is not essential. Where an application requires it, the boundary between cover and the entity it abuts in use need not be planar.

Note also that the object 730 could be an object, or surface 732 could be a surface, on which some particulate-generating process is being carried out, for example sanding, grinding or "scabbling". Although not shown, the apparatus and methods described may be adapted to contain, and enable removal of, particulates in such cases also, for example by providing an extra access port in the cover for equipment used in the process or for the arm of an operator reaching into the cover.

Covers according to the invention need not necessarily be shaped to cover a flat surface (such as a flange around an opening of an electrical cabinet). Covers for performing the invention (in the same way as covers 310, 310*a*, 310*b* and 310*c*) may be contoured to suit other enclosure geometries. For example, large electric motors (not shown) s may have openings for access to brushes and commutators, and these are components that may need to be cleaned. It is possible to make a cover similar for example to cover 310*b* (FIG. 33) save that it is arcuately shaped to cover such an opening during cleaning. In this case, however, ports such as ports 1012 and port assemblies 340 are unsuitable. However, port assemblies of the type shown in FIG. 4 can be used, with at least one slit disc (the same as disc 94) having its slit (corresponding to slit 96) parallel to the motor shaft.

Application to Cleaning of Sets of Electrical Machines

A particular example of an application where covers that do not seal against a flat surface will now be described.

Figure 49:
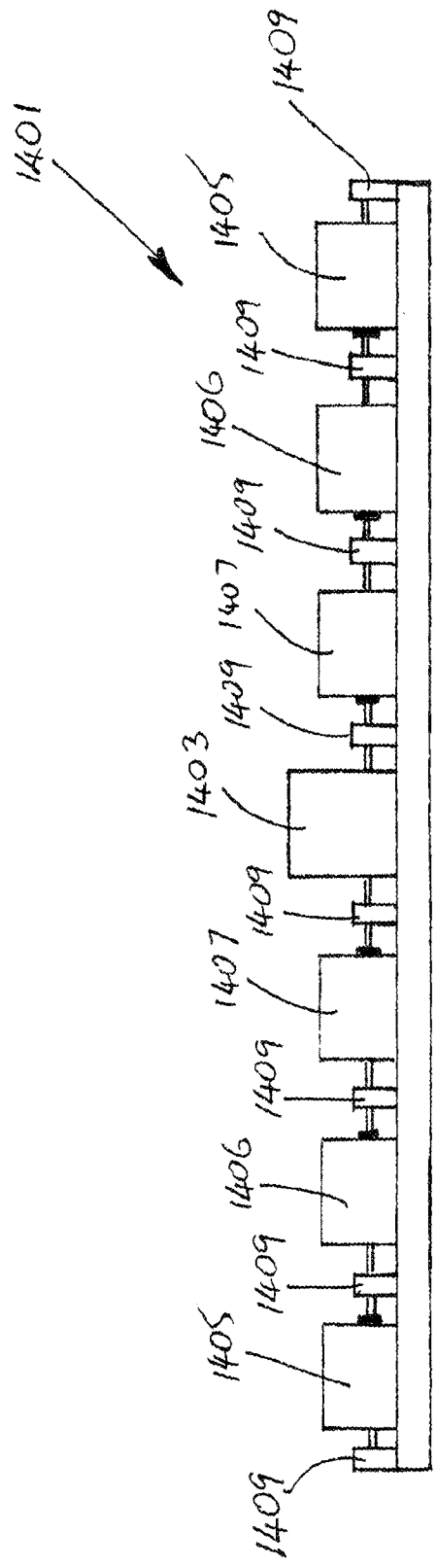
FIG. 49 is a schematic elevation of a motor-generator set.

FIG. 49 shows an arrangement 1401 (known as a motor-generator set or MG set) of electric machines that can present a cleaning problem. MG set 1401 comprises a synchronous AC electric motor 1403 that drives a number of DC generators 1405, 1406 1407 simultaneously, these and the motor 1403 having their shafts connected to each other in a chain-like manner to rotate as a unit. Bearing blocks 1409 are typically provided between adjacent pairs of the machines 1403-1407 in this arrangement and at the endmost generators 1405. MG sets of this type can be found in some electric walking draglines, as found in surface coal mining operations, where the generators provide power to DC motors (not shown) that in turn drive bucket hoisting, bucket dragging and swinging functions of the draglines. Variation of the motors' field strengths provides speed control for these functions. MG sets as described here are not found in all draglines but are still common.)

Cleaning of commutator/brush assemblies of the generators and of particulate matter that accumulates between and also within the individual machines 3-7 is generally time-consuming, hence expensive in terms of machine downtime, and can present difficulties through exposure of personnel to hazardous particulate matter.

Figure 50:
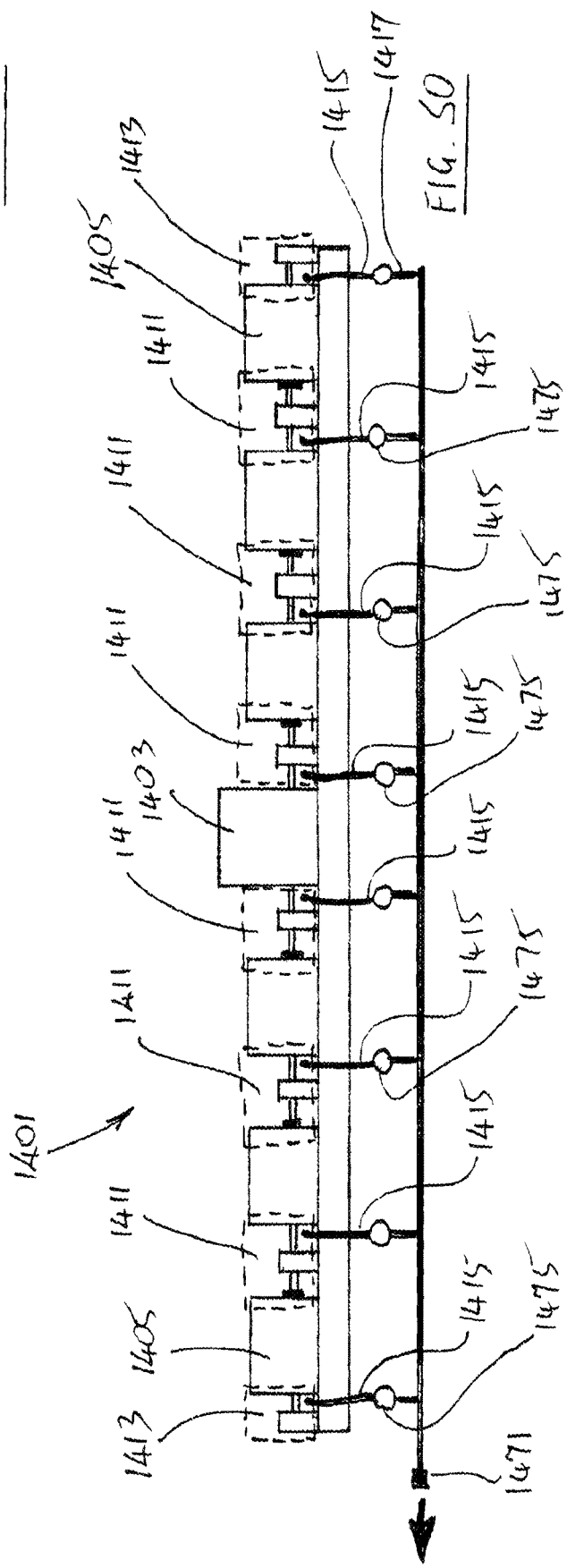
FIG. 50 is a schematic elevation of the motor generator set of FIG. 49, now showing by dotted lines spaces in which the invention may be applied.

FIG. 50 shows in a schematic manner how embodiments of the present invention may be applied to such cleaning. Spaces 1411 between each pair of machines 1403-1407, are temporarily enclosed as described below, in part using cover assemblies described below. Also, spaces 1413 at the outer ends of the endmost generators 1405, including in typical cases the outboard bearing blocks 1409 there, are enclosed, also as described below. The cover assembles for spaces 1411 and 1413 are shown in FIG. 50 schematically only, by dotted lines.

During cleaning, some or all of spaces 1411 and 1413 are maintained at a pressure below atmospheric pressure by drawing gas (for example, air) out through ducts 1415 that carry air and particulate matter entrained in that gas. The particulate matter within each of spaces 1411 and 1413 is dislodged by blowing gas (for example air) into them using cleaning laces as described above, such as lance 12 or lance 1160. In FIG. 50, ducts 1415 are shown as parts of a manifold 1417, with an outlet 1471 to a system (not shown) such as has been described above by reference to FIG. 2 or FIG. 48. However, individual spaces 1411 or 1413 may be ventilated individually or in smaller groups, in alternative embodiments.

Thus, it can be seen that the cleaning method is essentially as described earlier herein. This can extend further to direct vacuum cleaning of parts in spaces 1411, 1413 once gas drawn therefrom is found to have satisfactorily low particulate content. Instrumentation, control and cleaning gas supply arrangements may be in accord with any of the arrangements for these described for other embodiments above.

Note that when the spaces 1411 and 1413 are enclosed, they are connected to each other by the gaps between stators and armatures of the machines, and flow of air (or other gas) and entrained particulate matter through these gaps must be taken account of in the cleaning process. This is described below.

Figure 51:
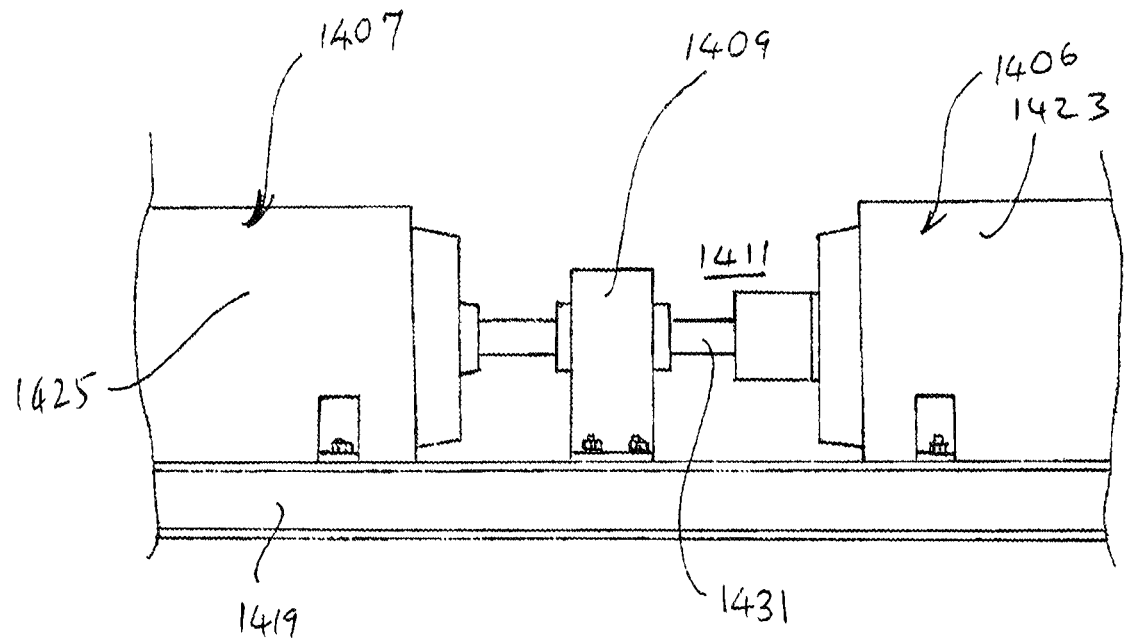
FIG. 51 is a side elevation of a portion of the motor generator set as shown in FIG. 49.
Figure 52:
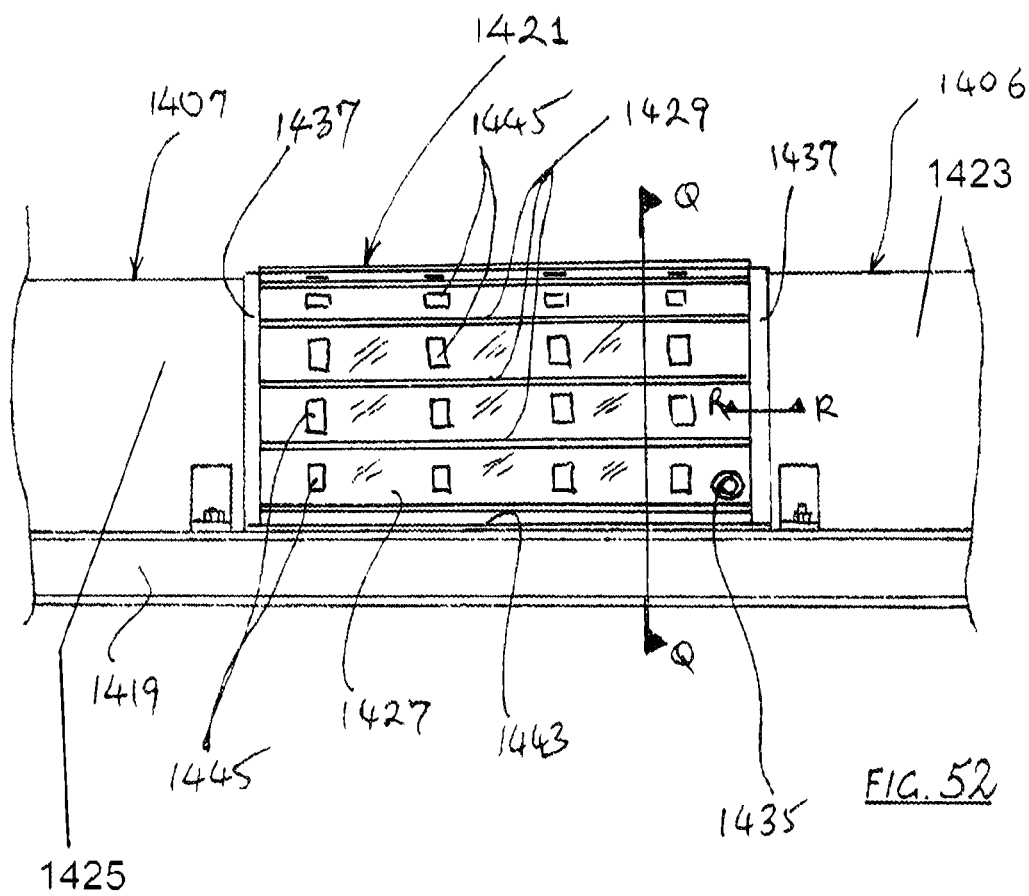
FIG. 52 is aside elevation the same as FIG. 52, save for the addition of a cover assembly according to the invention.
Figure 53:
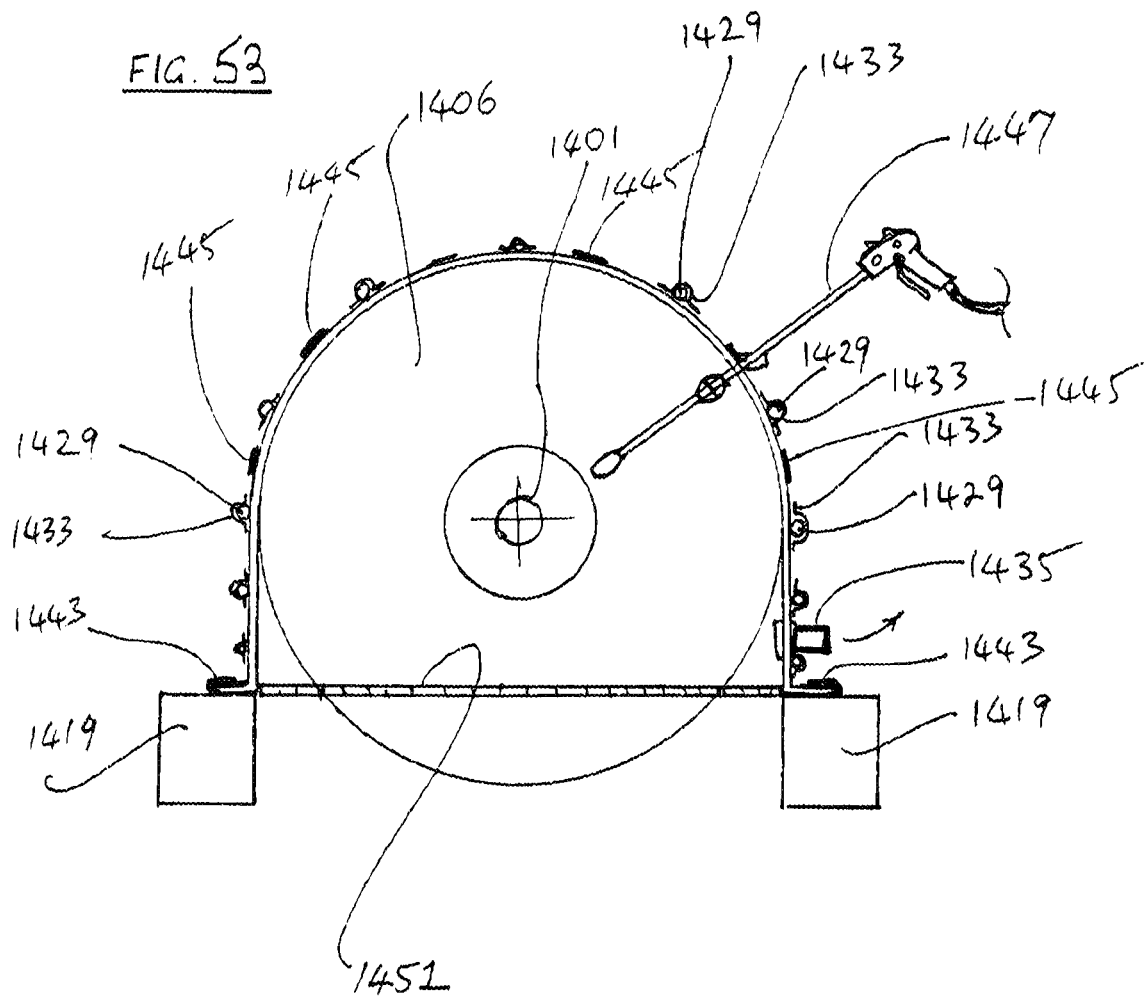
FIG. 53 is a cross-section taken at station "Q-Q" of FIG. 52.
Figure 54:
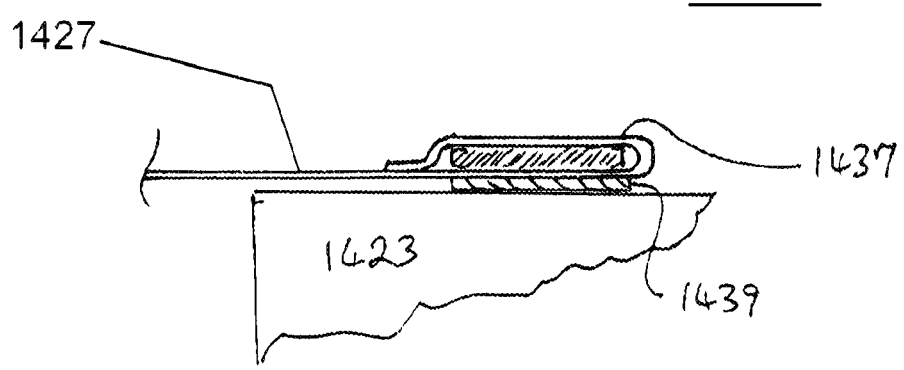
FIG. 54 is a cross-sectional view of a cover assembly portion, the section being taken at station "R-R" of FIG. 52.

FIG. 51 shows a side view of a pair of generators 1406 and 1407 of MG Set 1401, mounted (along with the other parts of the MG Set 1401) on bearers 1419. FIG. 52 shows the same components (and from the same viewpoint) as FIG. 51, with the space 1411 between generators 1406 and 1407 now closed in part by cover assembly 1421. FIG. 53 shows these components in section, at station "Q-Q" shown in FIG. 52.

Cover assembly 1421 is flexible and able to be draped over the two adjacent generators 1406 and 1407, being temporarily secured to their casings 1423 and 1425.

Cover assembly 1421 comprises a sheet 1427 of flexible airtight (or substantially airtight) material that is flexible to enable draping over generators 1406 and 1407 from above. To support sheet 1427 over the space 1411, stiffening rods 1429 extending parallel to each other and generator shaft 1431, are provided. These rods 1429 are received in longitudinal pockets formed on the sheet 1427, as shown. (However, any suitable alternative arrangement for providing stiffening rods 1429 may be used, for example by use of a suitable adhesive to stick them to sheet 1427.) The stiffening rods extend far enough longitudinally along sheet 1427 to in use bear directly or through their pockets 1433 and sheet 1427 on the casings 1423 and 1425 of generators 1406 and 1407. Stiffening rods 1429 do not only support the weight of sheet 1427 but prevent excessive inward deflection of sheet 1427 due to the lower-than atmospheric pressure maintained in space 1411 in use. Cover assembly 1421 is provided with a fitting 1435 for its duct 1415 for removal of gas and particulate matter from space 14112.

To hold cover assembly in place on casings 1423 and 1425, pockets 1437 are formed along its end edges, these pockets 1437 containing continuous lengths of magnetic strip 1441 (or, not shown, magnetic strip segments or individual (for example "button"-shaped) magnets). Also provided adjacent to each pocket 1437 are suitable elongate flexible seals 1439.

Similarly, pockets 1443 with magnets, or magnetic strip or magnetic strip segments therein and seals (not shown) similar to seals 1439 are formed along its longitudinal edges so that the cover assembly 1421 can be secured sealingly to the bearers (or other structure) on which generators 1406 and 1407 are mounted.

As an alternative or adjunct to the magnetic method of attachment described in the previous two paragraphs, adhesive tape may be used to secure cover 1421 to bearers 1419 and generator casings 1423 and 1425.

Sheet 1427 is shown as formed from a sheet of flexible but transparent or translucent material such as PVC (as described above in relation to cover assembly 1130), so that a user can see what he or she is doing when cleaning space 1411. However, alternatively, other materials may be used such as textile material with a elastomeric and gas-sealing coating as is known in the art. Where an alternative material is not transparent, window segments (not shown) of transparent material may be provided at suitable locations in sheet 1427 to allow space 1411 to be seen into.

The sheet 1427 is provided with multiple port covers 1445 in appropriate positions so that a cleaning lance 1447 can be inserted and used to dislodge particulate matter in space 1411. Lance 1447 may be similar to (or the same as) lance 12 or lance 1160 described above, and connected to a system the same in its functionality as the system 30a (FIG. 48). Lighting of space 1411 may be provided by lighting on a lance such as lance 1160 or on cover assembly 1421 itself in essentially any of the ways described above in relation to other cover assemblies. Similarly instrumentation may be provided in essentially the same ways as described above, including sensors (not shown) secured on cover assembly 1421 or on lance 1447 or both.

In FIGS. 52 and 53 port covers 1445 of either of the types shown in FIGS. 42-46 are shown. However, other port arrangements as described earlier above may be used if required. Those port arrangements which require a fixed portion (eg such as component 812) simply require that the fixed portion be secured to the flexible sheet 1427.

Cover assembly 1421 has been described by reference to generators 1406 and 1407 but is equally applicable to any of the spaces 1411 shown in FIG. 50. Where a space 1411 adjacent to motor 1403 is to be covered, it may be necessary to provide a temporary or permanently attached flange (not shown) on motor 1403 to enable use of a cover assembly 1421.

It will be appreciated that cover assembly 1421 can be simply rolled up when not in use, for ease of transport and storage, similarly to cover 1100.

To enable maintenance of below-atmospheric pressure in spaces 1411, it is generally necessary to seal areas below the cover assembly 1421 such as gaps between the generator casings and bearers 1419 or floor structures (not shown). It has been found in tests that this can usually be done easily and adequately by using suitably-shaped pieces of sheet material (exemplified as 1451) placed in gaps and if necessary taped in place. A very suitable sheet material is of the kind formed by extrusion having twin parallel walls separated by elongate flutes or ribs therebetween, for example as sold under such names as "Corflute". This is easy to cut to shape and reasonably robust for multiple uses, and has a degree of stiffness for resisting pressure differences.

Figure 55:
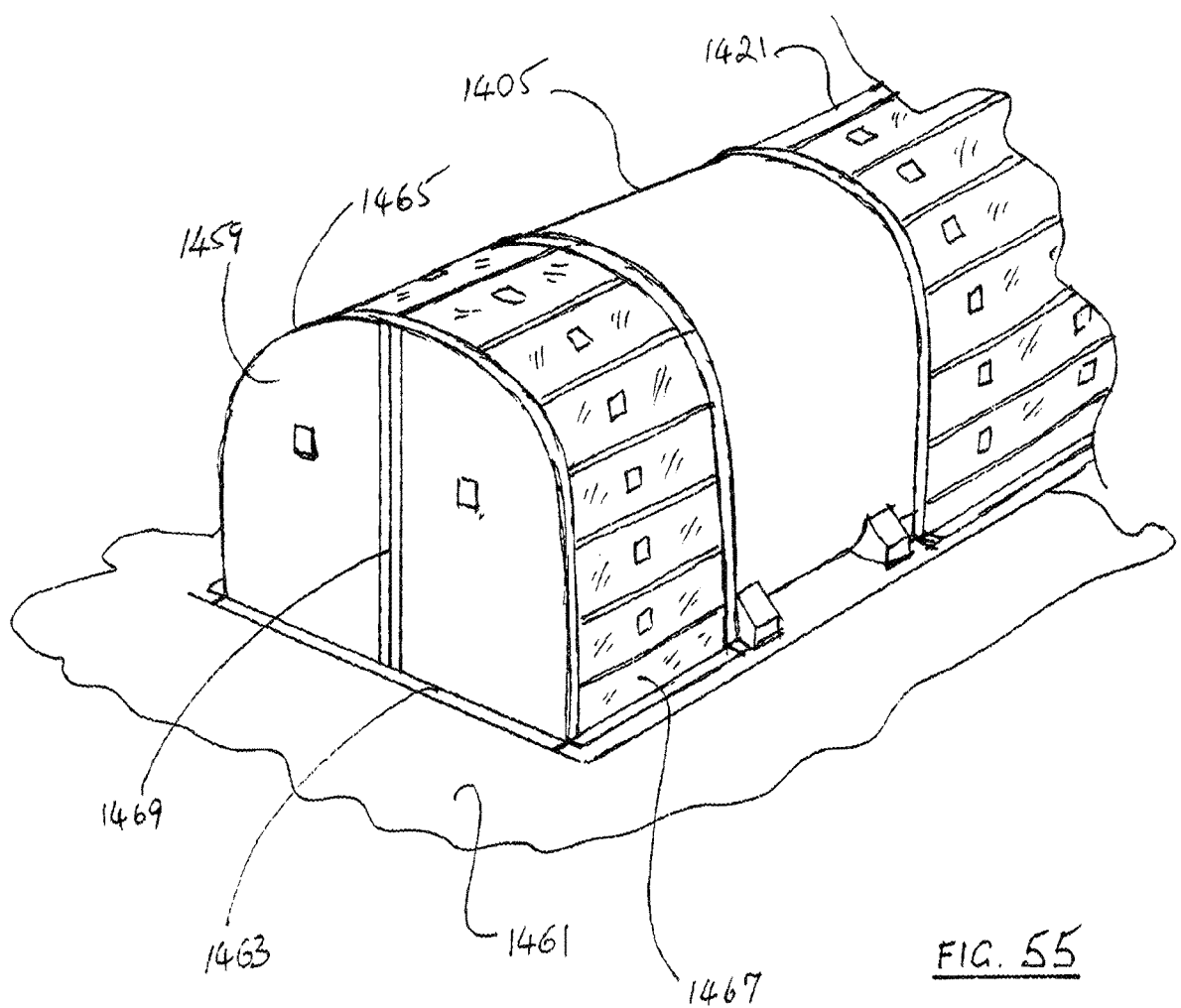
FIG. 55 is a perspective view of an end portion of the motor generator set of FIG. 49, now fitted with cover assemblies according to the invention.

A slightly different arrangement is required for spaces 1413 at ends of the MG set 1401. FIG. 55 shows a temporary bulkhead 1459 that is stiff enough to withstand the pressure difference associated with cleaning and that can be sealingly attached to floor structure 1461 using adhesive tape (not shown) and/or magnets or magnetic strip or strip elements in pockets 1463. A flange (not visible) on its periphery 1465 is provided for attachment of a cover assembly 1467 similar in its construction as cover assembly 1421 to enclose space 1413. Bulkhead 1459 may be secured to a bearing block 1409 at the outer end of generator 1405. Bulkhead 1459 may be provided with a hinge for compact folding when not in use. As for cover assembly 1421, additional sealing sheets (similar to sheet 1451) may be provided below cover assembly 1467 as required.

During cleaning of each of the spaces 1411 and 1413, it is desirable that dislodged particulate matter not be simply blown into the gap between stator and armature of the motor or generator(s) adjacent to the space 1411 or 1413, or even blown through into a neighbouring gap 1411 or 1413 communicating with the one in which a cleaning lance is in use. A simple approach is to connect only the space being cleaned to the gas-and-entrained-particulates inlet of system 30a (for example).

However, it is also possible to draw gas and particulates simultaneously from several or all of the spaces 1411 or 1413, and to this end some embodiments provide that each duct 1415 is connectable to manifold 1417 (formed in practice using flexible hose) via a valve 1475 that can be operated together or individually under control of the data processing system (eg element 204b of FIG. 41) so as to control the pressure in each of spaces 1411 or 1413. For example, it is possible to provide for the space 1411 or 1413 in which lance 1447 is being used to be held at the lowest pressure of all those spaces, with progressively increasing (but sub-atmospheric) pressures being maintained in the spaces on either side of the space so that flow in the armature/stator gaps tends always to be towards the space 1411 or 1413 in which the lance is operating.

It will be appreciated that the method described here for cleaning sets of electrical machines can be applied to other equipment where gaps lend themselves to the use of flexible cover assemblies or can be made to do so by for example provision of components having surfaces suitable for flexible cover assemblies to attach themselves to.

Ventilating and Vacuuming Embodiments

As mentioned above, it is possible to remove particulates from a space by dislodging the particulates using gas expelled from a cleaning lance (for example lance 12) and drawing the gas and entrained particulates out through a duct (such as 24) using a vacuum source (for example blower 46 or by direct vacuum cleaning, without the use of a cleaning lance, as shown in FIG. 1(b). For cleaning a particular space, both approaches may be used.

In some embodiments of the system 30 shown in FIG. 2 and the system 30a shown in FIG. 48, the instrumentation and control system (199 or 1075) provides to a user the ability to select multiple modes of operation to facilitate use of both modes as required. For ease of description, this will be described by reference to system 30a and instrumentation and control system 1075.

The control inputs (block 206b in FIG. 41) may include a mode selection input wherein a user can select either a "blowing mode" wherein supply of cleaning gas through valve 52a is enabled, for operation of a cleaning lance such as lance 1160, or a "ventilation/vacuum mode" wherein valve 52a is closed so that cleaning lance operation is not possible. In "ventilation/vacuuming mode", system 30a becomes an instrumented system for drawing gas and entrained particulates out of a space through duct 20a or duct 48a.

In addition to controlling valve 52a to allow or suppress flow through valve 52a according the selected operation mode, data processing unit 200b may also:

enable and monitor the sensors at the stations appropriate to the selected mode, so that for example sensors at stations A, B, T are not enabled or monitored in "ventilation/vacuum mode";

control lighting of the space being cleaned, for example by not powering lighting on lance 1160 in "ventilation/vacuum mode";

control display (block 208b), alarms (block 210b) to operate according to the selected mode, for example not providing for alarms relating to pressure differential measured at station "T" in ventilation/vacuum mode";

where data is to be logged during cleaning, ensuring that data applicable to the selected mode is appropriately formatted in generated files and transmitted, for example not recording a cleaning lance port in use (in embodiments where that facility is sensed) in "ventilation/vacuum mode".

In further embodiments, valve 50a may be subject to control by data processing unit 200b so that a user may select (at block 206b), after selecting "ventilation/vacuum mode", which of ducts 20a or 48a is to be used in "ventilation/vacuum mode". Alternatively, there may instead simply be provided three possible modes—"blowing mode" (flow permitted through valve 52a and duct 20a), "ventilation mode" (no flow through valve 52a, flow permitted in duct 20a) and "vacuum mode" (no flow through valve 52a, flow permitted in duct 48a). All three of these combinations may operate best with different flow rates through blower 46a, and data processing unit 200b may automatically adjust this according to the ode selected.

It is also possible for blower 46a to be provided instead or additionally with a manual speed control if required.

Figure 56:
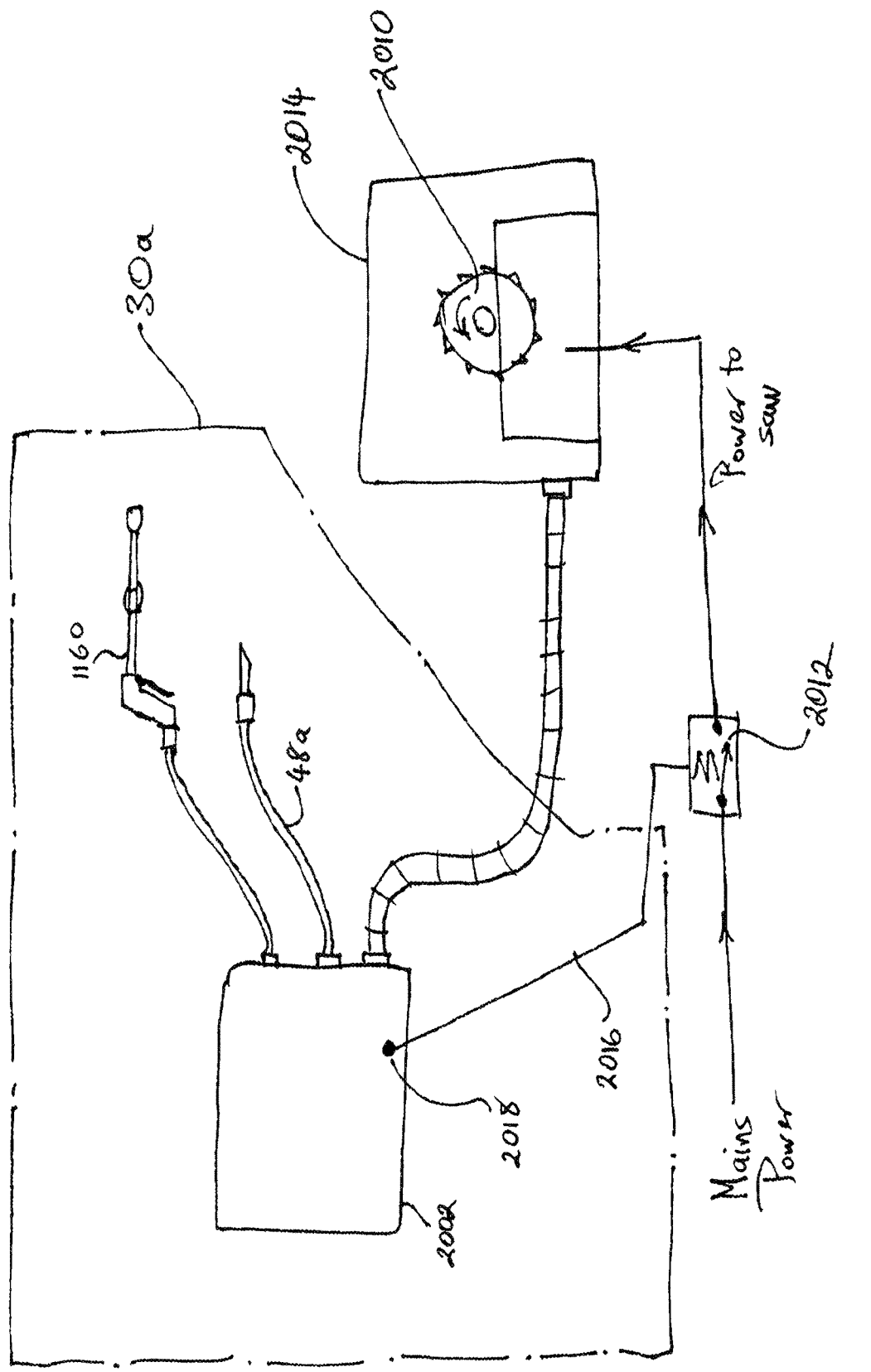
FIG. 56 is a schematic view of an arrangement in which a dust hood is ventilated and may be cleaned according to the invention.

Some embodiments that enable selection of a "ventilation/vacuum mode" or of either "ventilation mode" or "vacuum mode" have a yet further enhancement. This is provision of a control output for one or more devices external to the system. For example only, a system such as system 30a may be employed to ventilate, and later clean particulate matter from, a space in which a power tool is used. FIG. 56 shows schematically an arrangement in which system 30a is shown as a block and is used to ventilate (through duct 20a) later and clean a dust hood 2014 in which a power saw 2010 is being used to cut a material generating particulates. Power for saw 2010 passes from a mains supply through a relay 2012 that can switch that power on and off. Data processing unit 200b may be programmed to enable generation of a signal at block 207b (FIG. 41) that operates relay 2012 to interrupt power supply to saw 2010 if a chosen sensed quantity (for example particulate concentration in ventilating duct 20a, sensed at station "F") exceeds a specified value. Relay 2012 may be a separate device, connected by a cable 2016 to an output location 2018 on enclosure 2002 of the major components of system 30a, or may be incorporated in system 30a.

In some applications, it may not be appropriate to cut off power to a device in this way without warning. An enhancement may therefore be provided whereby detection of excess particulates first activates an audible and/or visible alarm and then, if after a specified time particulate concentration does not fall to a satisfactory value, interrupts power to saw

2010. Any other quantity sensed by system 30a may be specified to operate relay 2012.

When cleaning of dust hood 2014 is required, the operating mode of system 30a can be changed to enable operation of cleaning lance 1160 with drawing out of particulates and gas through duct 20a or vacuuming through duct 48a as required.

Note that it is possible to apply system 30a to ventilation and/or vacuuming of spaces that are not enclosed, for example a dust hood (not shown) on or near a power tool.

A system such as system 30a may be employed as an instrumentation system only when not in use for cleaning purposes. An example is testing of a centralized industrial ventilation system (not shown) in which multiple dust hoods are connected by ducting to a central particulate collecting installation. Points in such a system may have flow rates much higher than are necessary for cleaning of individual spaces or pieces of equipment, and provided by blower 46a. For periodic testing of the operation of such a centralized system, system 30a may be used with duct 20a acting as a sampling tube taking air and particulates from the centralized system's ducting. At the same time, a workplace particulate sensor, where included in system 30a would also be able to indicate whether the workplace around the ducting is safe. That is, a cleaning system according to the invention such as system 30a can have additional uses.

Pretreatment of Particulate-Laden Gas

The relative proportions of fine and coarse particles to be dealt with will vary from application to application, in some cases to the point where correct operation is compromised. This can be a particular problem where the proportion of relatively coarse particles is high. Taking system 999 (FIG. 34) as an example, large amounts of coarse particulates may require emptying of the container 1042 more often than is desirable, may cause fouling of the fine-fraction bag and HEPA filters in casing 1040, and cause inaccuracies in operation of the various sensors.

Figure 57:
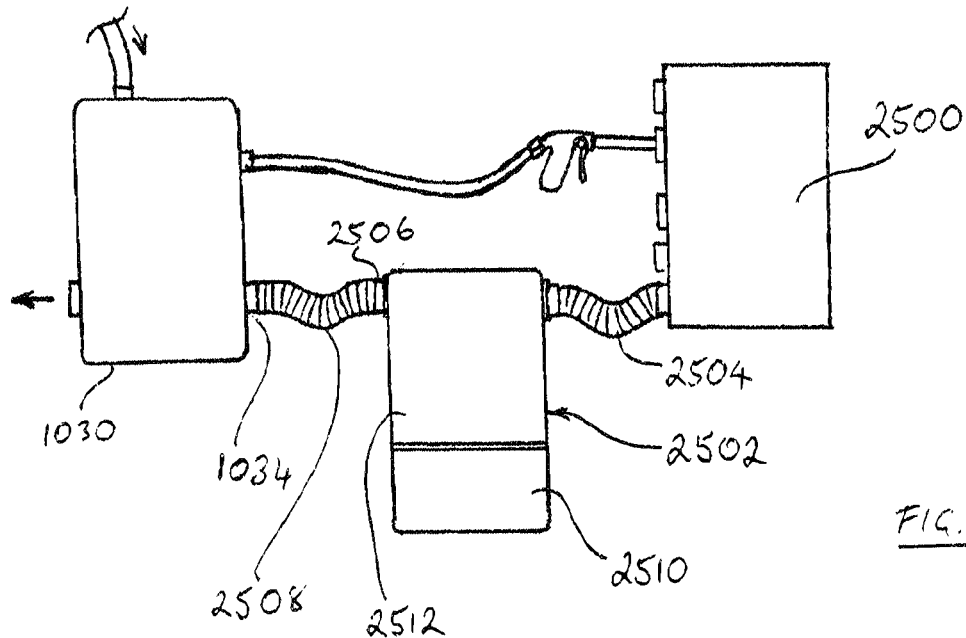
FIG. 57 is a view of a particulate cleaning and ventilation system according to the invention comprising the system as shown in FIG. 34 in combination with a pre-treatment system.
Figure 58:
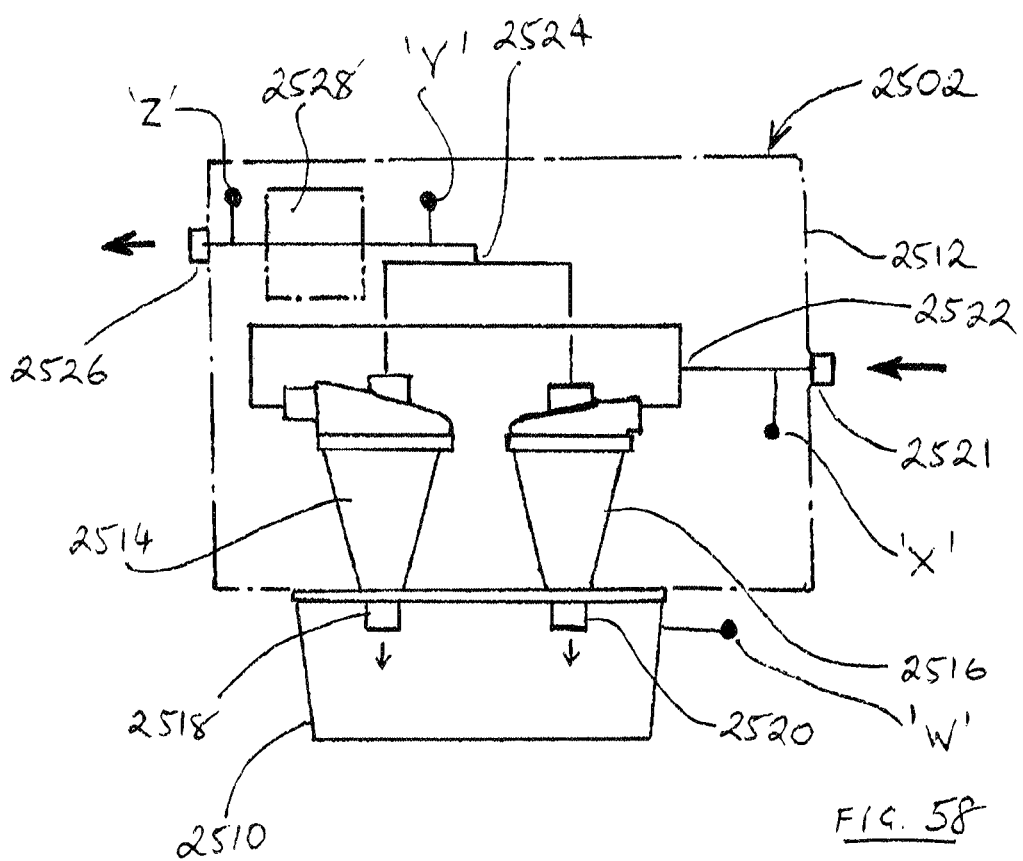
FIG. 58 is a schematic of the pre-treatment system as shown in FIG. 57.

FIGS. 57 and 58 show a way of dealing with this, again using system 999 as an example. Between a container 2500 whose interior is to be cleaned and the system as described above in its enclosure 1030, there is provided a pre-treatment system 2502. Dust laden gas (eg air) is drawn from container 2500 through a duct 2504 as before, but instead of entering enclosure 1030 via inlet 1034, passes into pre-treatment system 2502. System 2502 is adapted to remove all or a large proportion of relatively coarse particulate material from this incoming gas. The gas with the unremoved portion of the particulates, then passes from an outlet 2506 through a duct 2508 and into enclosure 1030.

Pre-treatment system 2502 includes an emptiable receptacle 2510 for receipt of particulates removed by system 2502.

System 2502 may be designed in various ways. For example, it may simply comprise one or more woven or non-woven textile bag filters or one or more cyclone separators or any other known particulate separation device or combinations of these.

FIG. 58 shows in schematic form a particular realization of system 2502 that applicants have found useful and suitable for use with system 999. Within an enclosure 2512 (represented in FIG. 58 by chain-dotted lines) are provided two cyclone separators 2514 and 2516 whose particulate outlet ducts 2518 and 2520 direct separated particulates into receptacle 2510. Gas entering the enclosure 2512 at inlet 2521 is split (at 2522) into two streams that enter cyclone separators 2514 and 2516. Relative to receptacle 2510, the flows in cyclone separators 2514 and 2516 are contra-rotating. This has been found useful in at least limiting movement of particulates within receptacle 2510 during use. It has also been found useful to assist in limiting movement of particulates in receptacle 2510 to extend the particulate outlet ducts 2518 and 2520 partway into receptacle 2510. Suitable lengths for this extension will depend on design of the receptacle 2510, and can be found by straightforward experiment or by the use of computerized fluid dynamic (CFD) methods without any need for inventive effort.

Outlet gas streams from separators 2514 and 2516 are combined at 2524 and directed to an outlet 2526. From outlet 2526, the combined gas stream passes to enclosure 1030.

The use of the two separators 2514 and 2516, instead of one, can provide better utilization of space within enclosure 2512. Further, although FIG. 58 shows separators 2514 and 2516 connected in parallel, it is also possible (not shown) for them to be connected in series. Moreover, it is also possible to provide multiple separators (not shown) that are differently sized and/or proportioned so as to better deal with a range of particle sizes.

Depending on expected particulate concentrations and cyclone separator (or other separation device) characteristics, it may be necessary or desirable to provide in system 2502 a dedicated fan or blower 2528 as shown in FIG. 58.

Instrumentation may also be provided in system 2502. By way of example only, FIG. 58 shows four possible stations labelled X, Y Z and W. Particulate concentration sensors may be provided at stations X and Z, with a suitable sensor for degree of filling of receptacle 2510 at station W. Where a fan or blower 2528 is provided, pressure difference between stations Y and Z may also be sensed.

Outputs from the instrumentation are preferably directed to, and treated as part of, the instrumentation and control system 1075 as shown in FIG. 41. This enables recording and display of pre-treatment instrumentation outputs and generation of alarms. Communication between the sensors of system 2502 and the remaining part of instrumentation system 1075 may be by cable or may be wireless, using any suitable digital protocol, for example Bluetooth or the like.

Figure 59:
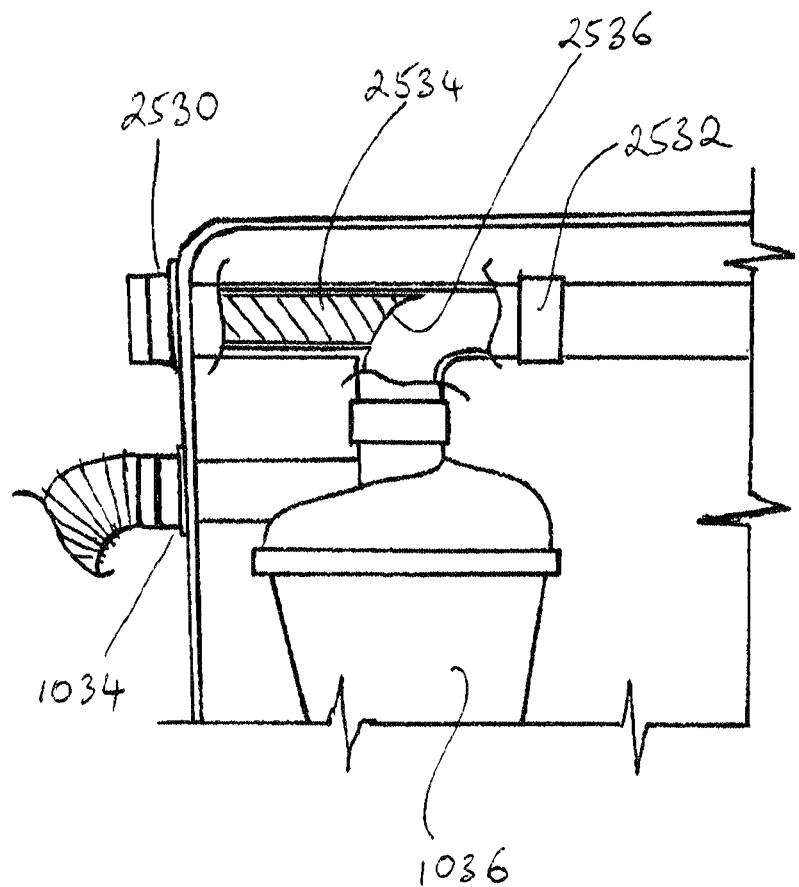
FIG. 59 is a partial view of a modified version of the system as shown in FIG. 34, in use and with a portion of its ductwork shown in section.
Figure 60:
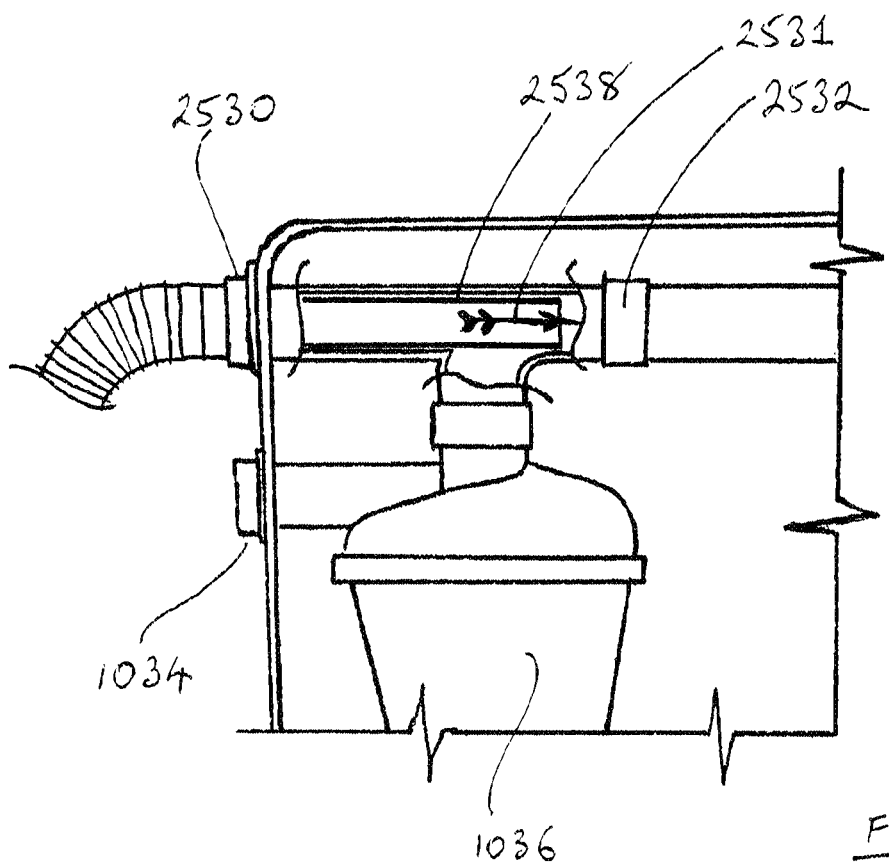
FIG. 60 is the same view as in FIG. 59 of the system shown in FIG. 59 in use and with a portion of its ductwork shown in section.

Where, as shown in FIG. 57, a pre-treatment system such as 2502 is used in conjunction with a main system having its own coarse particulate separation device(s) such as system 999, the coarse particulate separation devices of the main system may or may not be used, as appropriate to their design and/or the application. FIGS. 59 and 60 show one way in which, for system 999, these alternatives may conveniently be handled, with a slight modification of duct 1038. In addition to the gas inlet 1034, there is provided a separate inlet 2530. This inlet communicates with a duct 2532 that can receive gas from either the cyclone separator 1036 or inlet 2530. FIG. 59 shows gas from the system 2502 entering enclosure 1030 at inlet 1034 so as to pass through cyclone separator 1036. A plug 2534 is placed in inlet 2530 and is shaped (as shown at 2536) to allow gas leaving separator 1036 to flow efficiently in duct 2532.

Alternatively, as shown in FIG. 60, separator 1036 can be bypassed, with gas from pre-treatment system 2502 entering at inlet 2530. Instead of plug 2534, an adaptor tube 2538 is now located in inlet 2530, seals off the outlet of separator 1036 and allows gas to flow past the outlet of separator 1036, as shown by arrow 2531.

Data Analysis and Reporting

As described above, a wide range of information can be sensed, displayed locally and/or recorded, and/or transmitted to remote locations—either within a user's enterprise or even further afield. Thus it is possible, at one level, to provide a high level of assurance to an actual user of equipment according to the invention that his or her cleaning activity is working effectively and safely or has reached a defined state of completion and safety. The user can see that the workplace is not being contaminated by fine particulates and also see that a specified degree of cleanliness is being or has been achieved—and can record proof of this.

At an enterprise level, management can be assured of the same things for multiple sites, machines or activities, and can store and access extensive data to enable monitoring of the time and costs involved, manage potential liability and industrial issues associated with cleaning and maintenance generally. Troublesome activities, machines or sites can be pinpointed and corrective action taken.

Moreover, scheduling of cleaning activities can be improved by undertaking analysis of data logged during a sequence of such activities to determine intervals between cleans that contain overall costs to a desired level.

Where cleaning activities are contracted to non-employees, it is possible to verify that the work is being done properly and cost-effectively.

Data can be transmitted beyond the enterprise so that independent verification of work done and its standards may be carried out.

The actual efficiency and effectiveness of different cleaning practices can be monitored using sensed data and used to identify improvements applicable not only to the particular place or activity from which the data came but to similar activities elsewhere. For example, for cleaning of a particular device or space, the required time, the best sequence for insertion of lances into port assemblies and the like can be determined and used to generate instructions (and/or computer programs where applicable) for similar activities elsewhere in the enterprise.

Many enterprises do not have the capability to maintain sensitive equipment and instrumentation adequately. Anomalies in data can be watched for and where these are potentially attributable to the equipment itself, corrective action sought from the equipment supplier.

Every system according to the invention has the capability to sample gas containing particulate material. It is possible to provide for inclusion of such system, or multiple such systems, into a data network so that such data is obtained and made available via that network whenever it is used, or remotely or automatically activate such system when it is not actually in use for the same purpose. When multiple sources of data at multiple locations (located by GPS data included in the sensed data) are provided over a data network, it can become possible through analysis to, for example, pinpoint sources of excessive particulate generation or predict where particulate matter is likely to be taken by wind.

All of the above activities can to some degree be automated—for example through the generation of reports by appropriate computer applications, and doing so is a part of the invention. In particular, the analysis at one location of cleaning activities from data transmitted in digital form from the actual site of the cleaning activity is a part of the invention, as is the computerized use of accumulated data over time to refine and even automate future activities.

Cleaning in Zones of an Enclosed Space

The use of gas jets to dislodge particulate matter in an enclosed space can have the effect that, after some cleaning has been done, application of a gas jet to a particular location in the space may disturb large quantities of particulates, so that locations already cleaned may be to some extent recontaminated by a cloud of particulate matter.

To limit this effect, it is possible to isolate, at least in part, multiple zones within the enclosed space against recontamination.

Figure 63:
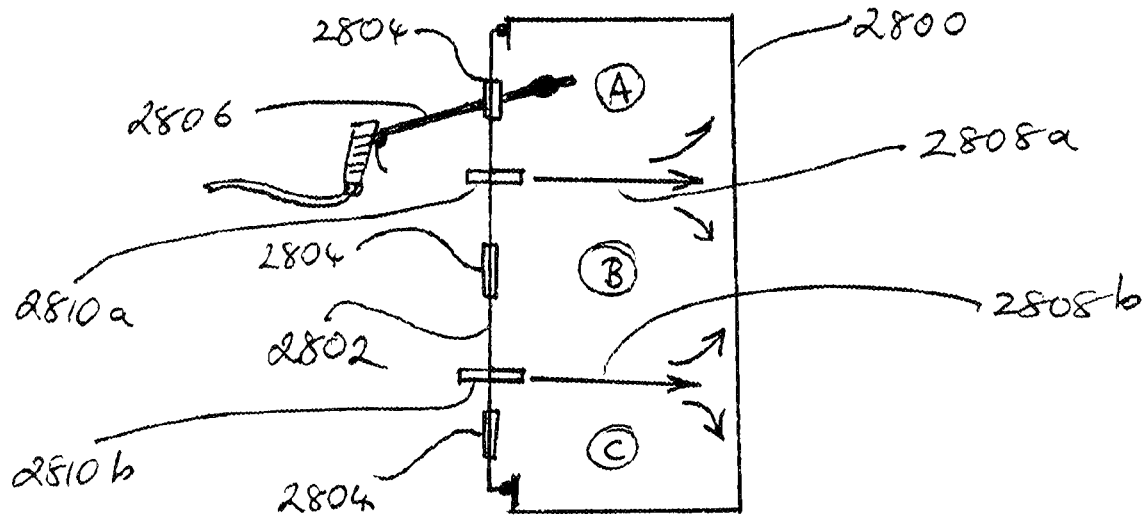
FIG. 63 is a schematic view of an enclosure being cleaned in accordance with an aspect of the invention.

FIG. 63 shows schematically a section of an enclosure 2800 whose interior is to be cleaned according to the invention, using air as a cleaning medium (although the principle is applicable also where other gases are to be used). A cover 2802 sealingly covers an opening in the enclosure 2800 and is provided with port assemblies 2804 for insertion of a cleaning lance 2806 (eg any of lances 12, 1160 or 2600). Once a zone "A" in enclosure 2800 has received at least an initial cleaning using lance 2806, an "air curtain" 2808*a* is introduced through a nozzle 2810*a*, the nozzle being elongate in a direction normal to the plane of the drawing, in known manner. Air for the air curtain 2808*a* may be obtained from the atmosphere using a dedicated blower, or the same air supply used by the equipment of the invention, or air recirculated from the air being expelled from the enclosure 2800. Air curtain 2808*a* isolates to some degree zone "A" while cleaning proceeds in zones "B" and "C". The process is repeated when zone "B" has been dealt with, by establishing a second air curtain 2808*b* through nozzle 2810*b*. Finally, zone "C" is cleaned.

Depending on the particular enclosure 2800, the particulate load therein, cleaning technique used, and the like, it may be desirable to complete the cleaning process with further use of he lance 2806 in all three zones, with or without switching off of the air curtains 2808*a* and 2808*b*.

Figure 64:
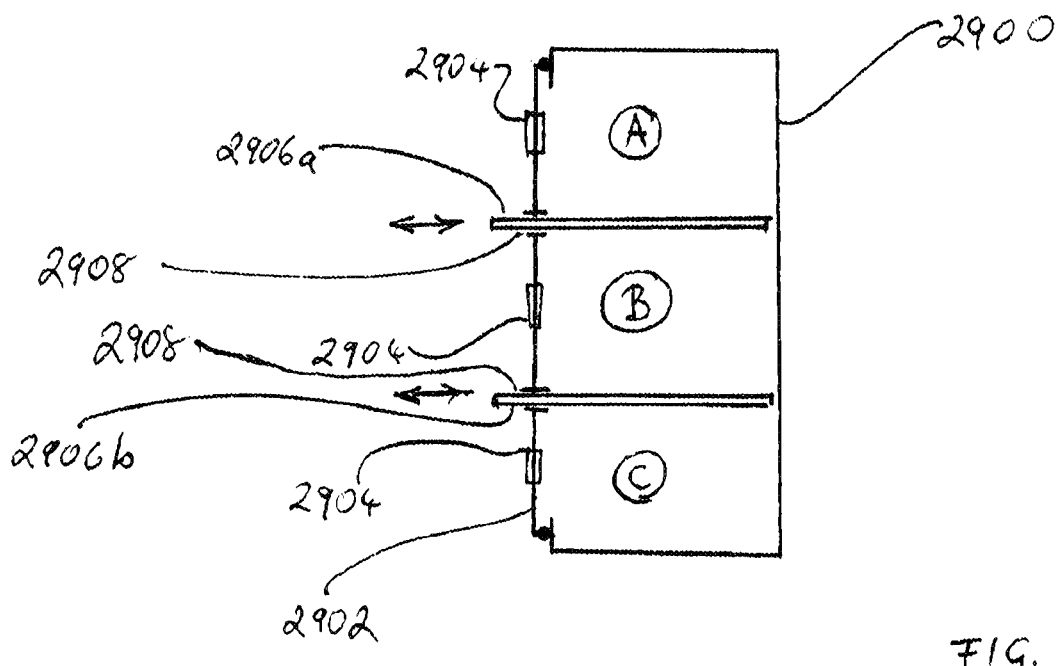
FIG. 64 is a schematic view of an enclosure being cleaned in accordance with an additional aspect of the invention.

FIG. 64 shows a variation on the above approach, in which an enclosure 2900 is to be cleaned. Enclosure 2900 is fitted sealingly with a cover 2902, having port assembles 2904 for insertion of a lance (not shown) such as lance 2806. The procedure is similar to that described in relation to enclosure 2800, save that instead of actuating air curtains to at least partially isolate zones "A", "B" and "C" the cover is provided with physical partitions 2906*a* and 2906*b* that can be slid inwardly and outwardly as required, through slots 2908 in cover 2902 and partitions 2906*a* and 2906*b* are slid inwardly to at least partially isolate the zones above them.

Additional Information on Software

There will now be provided a summary of software functionality adapted for cleaning applications of the invention where sophisticated control of pressure in a space being cleaned is not necessary, and not provided, and where a lance with onboard software functions such as lance 3500 is used.

First, the software run by a microcontroller of block 200*b* (FIG. 41), consists of a start-up, a main loop and a series of interrupt driven events. On start-up, the software performs a scan of the 'stack' in which it is connected to determine what other layers of hardware are present. It uses this scan to enable/disable relevant sections of code accordingly. During the start up the software also uses the connected communication devices to search for and attempt to connect to other system peripherals so that they may communicate and share data. This pairing may occur in several ways, for instance, pressing a button on each device at the same time or may be set in software to automatically connect to a certain device with a given identification, if it is available. Should a connection not be established or a layer not found in the stack, the functions in the code relevant to those pieces of hardware are disabled.

Furthermore, with regards to enabling or disabling functionality in the code, a configuration file may be used on the SD card to determine what functions are available. Should a functionality need to be disabled or enabled for any reason outside of the relevant hardware being present on the stack, it may be done so here. Sensor ranges, set points and thresholds, as well as the unique identification of the hardware may also be found in this configuration file which is read in the start up of the device each time. This allows the same software to be loaded onto other systems according to the invention and having the functionality determined by the configuration file on the SD card which is inserted into the SD card slot on the motherboard. Authentication keys or certificates for secure transfer of data may also be stored and read from this configuration file.

After start up the device enters a loop. This begins by first sampling each sensor it finds on the stack sequentially. Some sensors may be sampled many times while other sensors may be sampled less frequently, depending on the importance and how rapidly the sensor may be changing. These values are then compared against set points or threshold values which determine whether the system may be operating in a failure mode, under which conditions the software shuts off the compressed air and/or motor in order to prevent operator exposure or unsafe operating conditions. A wide range of communication protocols are used to interface with the sensors. These include analogue, digital, 4-20 mA, I2C/TWI, SPI, UART, USART and USB. After sampling the values are, if required, passed through a filter to reduce noise, typically this is done through the use of a moving point average. This is used to reduce noise of data shown on displays (reducing flickering of traffic light display). The data is then logged on a SD card, if an SD card is inserted. The data may also be uploaded via 4G/WiFi using HTTP or MQTT protocols (or similar secure protocols) to a remote server if those layers of stack are included.

Any time during this loop, interrupt routines may occur, these are used for detecting important safety controls and button presses. For instance, the lance is able to send an interrupt if it detects a failure mode to quickly shut down the motor or the compressed air in the case of a dust leak. Accelerometers are used to detect falling or sudden impacts which may also necessitate a shut down, or, depending on magnitude of the accelerometer reading, be an indicator for mistreatment of the device. Interrupts may also be used for a microswitch which is trigged by opening the lid of the enclosure containing the main components of the system If this switch is trigged, the software on the microcontroller switches off power to prevent potentially dangerous voltages being exposed. When this interrupt is triggered, it also sounds an alarm to indicate the hazard is present and bring the users attention to the fact that power has not been disconnected properly.

The software also has functionality to calculate current in and out of a battery should one be attached, allowing for the battery or charge status to be estimated and displayed, recorded or transmitted to other devices.

The software may also communicate with a GPS if it is found on the hardware stack. With this sensor, a 'Geo-Fence' may be implemented with boundaries set in the configuration file found on the SD card.

Second, a cleaning lance such as lance 3500 may be capable of operating independently of the running software described above but also be able to communicate back and forth when paired with a system ("main system") such as that represented with FIGS. 41 and 48. The lance may be used to display data from, such as, filter status or dust concentrations as well as allowing the operator to remotely control the main system, for instance, shutting down the motor in the main system from the lance. Communications may be performed using several communication protocols. These include radio (915 MHz), Bluetooth, Bluetooth LE, WiFi etc. These devices would also be found on the block 200*b* hardware stack.

The software on the lance is capable of producing a PWM signal of a given frequency which drives the compressed air valve. This allows for the 'pulsed' compressed air cleaning.

The air quality sensors on the lance, which detect particulate matter may be to detect whether satisfactory sealing of the area being cleaned has been achieved. If high levels of dust are detected, this is a shutdown condition. The lance software first sends an electrical signal to the valve to stop the compressed air and also uses one of the connected communication devices to send a message to the main system indicating that a shutdown is required.

The lance is able to capture and process images from a camera at the tip of lance. These images may be displayed on the screen for the user to view immediately, or stored on an SD so that the images may be viewed later, perhaps to evaluate state of targeted area before and after cleaning. The software may perform some image processing on these captures.

The lance is also able to automatically scan barcodes during use which indicate what is being cleaned at this time. This may be recorded so that any data logged at this time can be associated with the relevant truck/cabinet/motor etc.

Similarly, to the lance implementation, the main system may also communicate to other peripherals, such as a compressed air quality measurement unit which may send messages to both the lance and main system which may be used to shut off the compressed air should the quality be insufficient The lance may similarly have accelerometers to detect dropping or sudden impacts, similarly to as described with the main system.

In most applications, it is expected that data logged in use of the inventive system will be transmitted to a server remote from the space being cleaned and that may itself part of the system. The data may be received using various protocols (HTTP, MQTT as examples). The data may be processed and analysed to determine filter status and device status. The software running on this server is also capable of generating CSV files. This allows the data to be viewed in widely used software packages such as Excel. The analysis and processing software on the server may also be used to generate reports indicating cleaning performance and details of the cleans performed over a given timespan. This may be generated in the form of a PDF document. This report generation may be performed automatically at a given time or a manually executed process.

The implementation of this software is also open, allowing for the software to be easily deployed on a physical or cloud-based server if desired.

COMBINATIONS OF FEATURES

In the above description very many of the components, features of components, system arrangements, modes of operation and the like that have been stated to have alternatives that can be used in particular applications, or added optionally or not used or implemented. Where such alternatives are described, it is intended that they may be used in combinations other than the specific combinations described, where that is practicable, and where suited to a particular application.

For example only, different port assemblies have been described and different cover assemblies have been described, but a port assembly described in association with a particular cover assembly may be used with another cover assembly if that is practicable.

The invention claimed is:

1. An apparatus for removing particulate matter from an enclosure having an internal space and an opening into the internal space, comprising:
a cover positionable adjacent the opening so that the cover covers the opening;
a gas source external to the internal space;
an inlet conduit that, when in use, extends through a specific first port in the cover and is adapted to direct gas from the gas source to at least one gas outlet within the internal space whereby particulate matter within the internal space is dislodged and entrained in gas within the internal space; and
a blower that draws gas and particulate matter entrained therein from the internal space through a second port opening into the enclosure then successively through an outlet conduit, a particulate matter separation and collection means comprising at least one filter, and into an inlet of the blower;
wherein:
the specific first port is one of a plurality of first ports in the cover;
the inlet conduit comprises an elongate lance having a first portion that includes the gas outlet and that a user in a workspace outside the enclosure can insert through the specific first port in the cover so that the gas outlet enters the internal space, the lance further having a second portion that then remains outside the internal space and is configured for manipulation by the user to move the gas outlet among locations within the internal space and to withdraw the lance from the specific first port for insertion into a further one of the plurality of first ports;
the apparatus further comprises a first sensor for sensing concentration of particulate matter in gas leaving the internal space;
the apparatus further comprises a second sensor that is on the second portion of the lance for sensing concentration of particulate matter in air at a location in the workspace outside the internal space; and
a visual display on the second portion of the lance;
and wherein:
the visual display is configured to display to the user in real time a concentration of particulate matter leaving the internal space sensed by the first sensor and is configured to display in real time a concentration of particulate matter in the workplace sensed by the second sensor while the apparatus is in use to alert the user in response to a detected excess value of particulate concentration in the workspace outside of the internal space while the lance is inserted into the internal space; and
wherein the visual display is configured to display to the user, in real time, information on functioning of the apparatus derived from additional sensors comprised in the apparatus.

2. The apparatus according to claim 1, wherein the apparatus is automatically shut down if concentration of particulate matter sensed by the second sensor exceeds a specified level.

3. The apparatus according to claim 1, wherein alarm conditions indicating excessive particulate concentration sensed by the second sensor are signaled to the user by a warning light on the second portion of the lance or by the visual display.

4. The apparatus according to claim 1, wherein the visual display comprises a screen on the second portion of the lance.

5. The apparatus according to claim 1, wherein air from the workplace is drawn to the second sensor through an opening on the second portion of the lance.

6. The apparatus according to claim 5, wherein the second sensor is positioned on the second portion of the lance.

7. The apparatus according to claim 1, further comprising one or more pressure sensors on the lance configured to sense a difference in pressure between air in the workplace and gas at an opening in the first portion of the lance.

8. The apparatus according to claim 7, wherein gas flow from the gas outlet is automatically interrupted if gas pressure at the opening in the first portion of the lance exceeds the atmospheric pressure in the workspace.

9. The apparatus according to claim 1, wherein a light emitting device is positioned on the first portion of the lance for illumination of the internal space.

10. The apparatus according to claim 1, wherein the lance comprises a lance insertion sensor that detects insertion of the first portion of the lance into one of the plurality of first ports in the cover by sensing the presence of an element on the cover adjacent the said one of the plurality of first ports when the first portion is received therein.

11. The apparatus according to claim 10, wherein the element is one of a plurality of elements each of which is adjacent to one of the plurality of first ports and different from the elements adjacent to other ports of the plurality of first ports and wherein the lance insertion sensor that detects insertion of the first portion of the lance into a particular first port is configured to distinguish the particular element and accordingly a particular first port into which the first portion of the lance has been inserted.

12. The apparatus according to claim 1, wherein the inlet conduit comprises a valve configured when in use to interrupt gas flow in the inlet conduit periodically so that flow from the gas outlet is pulsatory.

13. The apparatus according to claim 1, further comprising a microprocessor configured to write to memory information derived from at least the first and second sensors.

14. The apparatus according to claim 13, configured to transmit information derived from at least the first and second sensors to a location remote from the apparatus under control of the microprocessor.

15. The apparatus according to claim 1, wherein the outlet conduit in use draws gas through an opening in the cover.

16. The apparatus according to claim 1, wherein at least a portion of the gas leaving the blower is included in the gas supplied to the lance.

17. The apparatus according to claim 1, wherein the cover comprises a sheet of transparent flexible material whereby the user can see into the internal space during use of the apparatus, and wherein the cover can be rolled up into a roll after use for storage.

18. The apparatus according to claim 17, wherein the cover comprises at least one elongate stiffener that when the cover is in use extends from one side of the opening of the enclosure to an opposite side thereof whereby to limit bulging of the cover into the internal space.

19. The apparatus according to claim 17, wherein the specific first port in the cover comprises a slit formed in the transparent flexible material.

20. The apparatus according to claim 1, wherein the cover is held in place on the enclosure by one of: magnetic strip; adhesive tape; and individual magnets.

21. A method for removing particulate matter from an enclosure having an internal space and an opening into the internal space, comprising the steps of:

positioning a cover adjacent the opening so that the cover covers the opening;

providing a gas source external to the internal space;

providing an inlet conduit that comprises an elongate lance having a first portion with a gas outlet and that directs gas from the gas source to the gas outlet;

by a user in a workspace outside the enclosure, inserting the first portion of the lance through a specific first port in the cover that is one of a plurality of first ports in the cover so that the gas outlet is within the internal space and particulate matter within the internal space is dislodged and entrained in gas within the internal space;

by a blower, drawing gas and particulate matter entrained therein from the internal space firstly through a second port opening into the enclosure then successively through an outlet conduit, a particulate matter separation and collection means comprising at least one filter, and into an inlet of the blower;

by the user manipulating a second portion of the lance that in use remains outside the enclosure, moving the gas outlet among positions within the internal space and relocating the lance among the plurality of first ports comprised in the cover;

sensing concentration of particulate matter in gas leaving the internal space by a first sensor;

sensing concentration of particulate matter in air at a location in the workspace outside the enclosure by a second sensor that is on the second portion of the lance; and displaying information derived from the first and second sensors to the user in real time by a visual display on the lance, and continuing operation of the apparatus while concentration of particulate matter in the workspace is below an unsafe level and until a satisfactory value of particulate concentration in gas leaving the internal space is achieved; and further displaying, by the visual display to the user in real time, information on functioning of the apparatus derived from additional sensors comprised in the apparatus.

22. The apparatus according to claim 1, further comprising means for wireless communication between the lance and portions of the apparatus separate from the lance for exchange of signals relating to sensor outputs, alarms, control inputs, and the visual display.

23. The apparatus according to claim 6, wherein the second sensor is one of two particulate concentration sensors on the lance.

24. The apparatus according to claim 1, wherein the second port is positioned on in the cover.

* * * * *